United States Patent
Chu et al.

(10) Patent No.: US 12,108,330 B2
(45) Date of Patent: Oct. 1, 2024

(54) TRANSMITTING TRAFFIC STREAMS VIA MULTIPLE WLAN COMMUNICATION LINKS

(71) Applicant: Marvell Asia Pte Ltd, Singapore (SG)

(72) Inventors: Liwen Chu, San Ramon, CA (US);
Hongyuan Zhang, Fremont, CA (US);
Hui-Ling Lou, Sunnyvale, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 17/977,844

(22) Filed: Oct. 31, 2022

(65) Prior Publication Data

US 2023/0047401 A1 Feb. 16, 2023

Related U.S. Application Data

(62) Division of application No. 16/884,013, filed on May 26, 2020, now Pat. No. 11,751,134.

(Continued)

(51) Int. Cl.
*H04W 52/02* (2009.01)
*H04L 1/1607* (2023.01)
(Continued)

(52) U.S. Cl.
CPC ....... *H04W 52/0219* (2013.01); *H04L 1/1642* (2013.01); *H04W 28/082* (2023.05);
(Continued)

(58) Field of Classification Search
CPC ........... H04W 52/0219; H04W 28/082; H04W 28/20; H04W 40/244; H04W 48/18;
(Continued)

(56) References Cited

U.S. PATENT DOCUMENTS

| 7,539,492 B2 | 5/2009 | Jagadeesan |
| 7,787,390 B1 | 8/2010 | Orr |

(Continued)

FOREIGN PATENT DOCUMENTS

| CA | 2644637 A1 | 9/2007 |
| CN | 101189888 A | 5/2008 |

(Continued)

OTHER PUBLICATIONS

Non-Final Office Action for U.S. Appl. No. 17/977,841, mailed Sep. 28, 2023. (13 pages).

(Continued)

*Primary Examiner* — Shailendra Kumar

(57) ABSTRACT

A first communication device determines whether a second communication device is in a power save mode with respect to a first communication link among a plurality of communication links that correspond to respective frequency segments, and determines whether the second communication device is in a power save mode with respect to a second communication link among the plurality of communication links. The second communication device is permitted to be in the power save mode with respect to the second communication link when the second communication device is not in the power save mode with respect to the first communication link, and vice versa. The first communication device communicates with the second communication device in accordance with the power save modes of the second communication device with respect to the first and second communication links.

21 Claims, 21 Drawing Sheets

Related U.S. Application Data

(60) Provisional application No. 62/897,155, filed on Sep. 6, 2019, provisional application No. 62/888,950, filed on Aug. 19, 2019, provisional application No. 62/886,812, filed on Aug. 14, 2019, provisional application No. 62/879,801, filed on Jul. 29, 2019, provisional application No. 62/852,612, filed on May 24, 2019.

(51) Int. Cl.
  *H04W 28/082* (2023.01)
  *H04W 28/20* (2009.01)
  *H04W 40/24* (2009.01)
  *H04W 48/18* (2009.01)
  *H04W 84/12* (2009.01)

(52) U.S. Cl.
  CPC ......... *H04W 28/20* (2013.01); *H04W 40/244* (2013.01); *H04W 48/18* (2013.01); *H04W 52/0251* (2013.01); *H04W 84/12* (2013.01)

(58) Field of Classification Search
  CPC ............. H04W 52/0251; H04W 84/12; H04W 52/0216; H04W 76/15; H04W 76/28; H04W 52/0248; H04L 1/1642; Y02D 30/70
  See application file for complete search history.

(56) References Cited

U.S. PATENT DOCUMENTS

| | | |
|---|---|---|
| 8,045,491 B1 | 10/2011 | Bishara et al. |
| 8,391,852 B2 | 3/2013 | Tachikawa |
| 9,232,554 B2 | 1/2016 | Convertino et al. |
| 10,009,736 B1 | 6/2018 | Chu et al. |
| 10,111,146 B2 | 10/2018 | Kim et al. |
| 10,257,806 B2 | 4/2019 | Chu et al. |
| 10,349,413 B2 | 7/2019 | Zhang et al. |
| 11,690,011 B2 | 6/2023 | Chu et al. |
| 2002/0052965 A1 | 5/2002 | Dowling |
| 2003/0231608 A1 | 12/2003 | Wentink |
| 2005/0099943 A1 | 5/2005 | Naghian et al. |
| 2005/0135302 A1 | 6/2005 | Wang et al. |
| 2005/0243755 A1 | 11/2005 | Stephens |
| 2005/0249227 A1 | 11/2005 | Wang et al. |
| 2007/0258397 A1 | 11/2007 | Ho et al. |
| 2008/0049744 A1 | 2/2008 | Kim et al. |
| 2008/0112350 A1 | 5/2008 | Meylan et al. |
| 2010/0056126 A1* | 3/2010 | Tachikawa ............ H04W 76/28 455/418 |
| 2011/0065440 A1 | 3/2011 | Kakani |
| 2011/0249659 A1 | 10/2011 | Fontaine et al. |
| 2012/0188949 A1 | 7/2012 | Salkintzis et al. |
| 2012/0236778 A1 | 9/2012 | Erdmann et al. |
| 2012/0314696 A1 | 12/2012 | Liu |
| 2012/0320924 A1 | 12/2012 | Baliga et al. |
| 2013/0136117 A1 | 5/2013 | Schrum et al. |
| 2013/0229930 A1 | 9/2013 | Akay et al. |
| 2013/0272196 A1 | 10/2013 | Davydov et al. |
| 2014/0079007 A1 | 3/2014 | Li et al. |
| 2014/0307602 A1 | 10/2014 | Seok |
| 2015/0036573 A1 | 2/2015 | Malik et al. |
| 2015/0124808 A1 | 5/2015 | Tatsumi |
| 2015/0312131 A1 | 10/2015 | Ganu et al. |
| 2016/0212748 A1 | 7/2016 | Yang et al. |
| 2016/0219510 A1 | 7/2016 | Asterjadhi et al. |
| 2016/0337904 A1 | 11/2016 | Hsu et al. |
| 2017/0071022 A1 | 3/2017 | Sampath et al. |
| 2017/0105208 A1 | 4/2017 | Hedayat |
| 2017/0149547 A1 | 5/2017 | Kim et al. |
| 2017/0171878 A1 | 6/2017 | Chun et al. |
| 2017/0181136 A1 | 6/2017 | Bharadwaj et al. |
| 2017/0280460 A1 | 9/2017 | Emmanuel et al. |
| 2017/0311204 A1 | 10/2017 | Cariou et al. |
| 2017/0325178 A1 | 11/2017 | Verma et al. |
| 2017/0332422 A1 | 11/2017 | Ohta |
| 2017/0366329 A1 | 12/2017 | Cao et al. |
| 2018/0014297 A1 | 1/2018 | Kang et al. |
| 2018/0049129 A1 | 2/2018 | Li et al. |
| 2018/0054847 A1 | 2/2018 | Cariou et al. |
| 2018/0083793 A1 | 3/2018 | Kim et al. |
| 2018/0092039 A1* | 3/2018 | Cariou .................. H04W 52/34 |
| 2018/0109298 A1 | 4/2018 | Elsherif et al. |
| 2018/0115403 A1 | 4/2018 | Sakai et al. |
| 2018/0184374 A1* | 6/2018 | Yang ................. H04W 52/0216 |
| 2018/0206190 A1 | 7/2018 | Cherian et al. |
| 2018/0302858 A1 | 10/2018 | Son et al. |
| 2019/0045438 A1 | 2/2019 | Cariou et al. |
| 2019/0116555 A1* | 4/2019 | Kristem ............. H04L 27/2605 |
| 2019/0123863 A1 | 4/2019 | Zhang et al. |
| 2019/0150214 A1 | 5/2019 | Zhou et al. |
| 2019/0158413 A1 | 5/2019 | Patil et al. |
| 2019/0182714 A1 | 6/2019 | Chu et al. |
| 2019/0182863 A1 | 6/2019 | Chu et al. |
| 2019/0200220 A1 | 6/2019 | Ouzieli et al. |
| 2019/0215729 A1 | 7/2019 | Oyman et al. |
| 2019/0215884 A1 | 7/2019 | Patil et al. |
| 2019/0238259 A1 | 8/2019 | Huang et al. |
| 2019/0349232 A1 | 11/2019 | Cariou et al. |
| 2019/0349930 A1 | 11/2019 | Chu et al. |
| 2020/0077417 A1 | 3/2020 | Seok et al. |
| 2020/0280950 A1 | 9/2020 | Bhanage et al. |
| 2020/0344690 A1 | 10/2020 | Kim et al. |
| 2020/0359327 A1 | 11/2020 | Bhanage et al. |
| 2020/0374754 A1 | 11/2020 | Chu et al. |
| 2020/0374801 A1 | 11/2020 | Chu et al. |
| 2020/0374802 A1 | 11/2020 | Chu et al. |
| 2020/0396568 A1 | 12/2020 | Huang et al. |
| 2021/0022154 A1 | 1/2021 | Cavalcanti et al. |
| 2021/0050999 A1 | 2/2021 | Huang et al. |
| 2021/0058862 A1 | 2/2021 | Choo et al. |
| 2021/0099955 A1 | 4/2021 | Kim et al. |
| 2021/0127273 A1 | 4/2021 | Ouzieli et al. |
| 2021/0153125 A1 | 5/2021 | Cariou |

FOREIGN PATENT DOCUMENTS

| | | |
|---|---|---|
| CN | 102388581 A | 3/2012 |
| CN | 103534985 A | 1/2014 |
| CN | 104040973 A | 9/2014 |
| EP | 1720292 A2 | 11/2006 |
| EP | 2028809 A2 | 2/2009 |
| EP | 2999252 A1 | 3/2016 |
| GB | 2501898 A | 11/2013 |
| JP | 2008245235 A | 10/2006 |
| WO | 2005039134 A1 | 4/2005 |
| WO | 2005086422 A1 | 9/2005 |
| WO | 2006000955 A1 | 1/2006 |
| WO | 2012026779 A2 | 3/2012 |
| WO | 2014008106 A1 | 1/2014 |
| WO | 2014074919 A1 | 5/2014 |
| WO | 2015099803 A1 | 7/2015 |
| WO | 2016114943 A1 | 7/2016 |
| WO | 2017026937 A1 | 2/2017 |
| WO | 2017111567 A2 | 6/2017 |
| WO | 2017119759 A1 | 7/2017 |
| WO | 2017164901 A1 | 9/2017 |

OTHER PUBLICATIONS

Notice of Allowance for U.S. Appl. No. 17/977,841, mailed Jan. 22, 2024. (8 pages).

Ex parte Quayle Office Action for U.S. Appl. No. 16/884,013, mailed Aug. 19, 2021.

Fischer et al., "IEEE P802.11—Wireless LANs—Disallowed Sub channels," doc. No. IEEE 802.11-18/00496r3, The Institute of Electrical and Electronics En.oineers, DD. 1-11 (May 2018).

IEEE P802.11 ax™/D5.0, "Draft Standard for Information technology— Telecommunications and information exchange between systems Local and metropolitan area networks—Specific Requirements, Part 11: Wireless LAN Medium Access Control (MAC) and Physical

(56) References Cited

OTHER PUBLICATIONS

Layer (PHY) Specifications, Amendment 1: Enhancements for High Efficiency WLAN," IEEE Computer Society, 772 pages (Oct. 2019).
IEEE P802.11 ax™/D4.O, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).
IEEE Std 8O2.11-REVmc™/D8.O. "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).
International Search Report and Written Opinion in International Patent Application No. PCT/US2020/034599, mailed Oct. 8, 2020 (23 pages).
Invitation to Pay Additional Fees and Partial International Search Report in International Patent Application No. PCT/ US2020/034599, mailed Aug. 17, 2020.
Notice of Allowance for U.S. Appl. No. 16/884,013, mailed on Dec. 7, 2021. (7 pages).
Notice of Allowance for U.S. Appl. No. 16/884,013, mailed on Dec. 7, 2022. (7 pages).
Notice of Allowance for U.S. Appl. No. 16/884,013, mailed on Jul. 19, 2022. (7 pages).
Notice of Allowance for U.S. Appl. No. 16/884,013, mailed on Jun. 24, 2022. (12 pages).
Notice of Allowance for U.S. Appl. No. 16/884,013, mailed on Mar. 1, 2022. (12 pages).
Notice of Allowance for U.S. Appl. No. 16/888,436, mailed on Apr. 18, 2022. (9 pages).
Notice of Allowance for U.S. Appl. No. 16/884,425, mailed on Jul. 18, 2022. (8 pages).
Notice of Allowance for U.S. Appl. No. 16/884,425, mailed on Mar. 7, 2022. (8 pages).
Notice of Allowance for U.S. Appl. No. 16/884,425, mailed on Oct. 6, 2021. (8 pages).
Notice of Allowance for U.S. Appl. No. 16/888,425, mailed on Feb. 7, 2023. (8 pages).
Notice of Allowance for U.S. Appl. No. 16/888,436 mailed on Jul. 20, 2022. (10 pages).
Notice of Allowance for U.S. Appl. No. 16/888,436 mailed on Nov. 16, 2022. (9 pages).
Notice of Allowance in U.S. Appl. No. 16/888,436, dated Feb. 2, 2022, 12 pages.
Notice of Allowance in U.S. Appl. No. 16/888,436, mailed Sep. 2, 2021 (18 pages).
Notice of Allowance for U.S. Appl. No. 16/884,425, mailed on Oct. 19, 2022. (8 pages).
Orfanos et al., "A New Distributed Coordination Function for W-LANs with Multiple Channel Structure," Proceedings of the 14th 1st Mobile and Wireless Communications Summit; Dresden, Germany, 5 pages (Jun. 19, 2005).
U.S. Appl. No. 16/884,013, Chu et al., "Power Save and Group-Addressed Frames in WLAN Usina Multiple Communication Links," filed May 26, 2020.
U.S. Appl. No. 16/888,436, Chu et al., "Group-Addressed Frames Tranmitted via Multiple WLAN Communication Links," filed May 29, 2020.
U.S. Appl. No. 16/889,798, Chu et al., "Data Unit Aggregation in a Wireless Network With Multiple Channel Segments," filed Jun. 1, 2020.
U.S. Appl. No. 62/866,480, Chu et al., "Multi-Band Operation: Band Sharing Methods," filed Jun. 25, 2019.
U.S. Appl. No. 62/870,455, Chu et al., "Multi-Band Operation: Band Sharing Methods," filed on Jul. 3, 2019.
U.S. Appl. No. 62/886,826, Chu et al., "Multi-Band Operation: Beaconing, Capability and Basic Service Set (BSS) Parameter Announcement," filed Aug. 14, 2019.
U.S. Appl. No. 62/892,451, Chu et al., "Multi-Band Operation: Beaconing, Capability and Basic Service Set (Bss) Parameter Announcement," filed Aug. 27, 2019.
Zhang et al., "EHT Technology Candidate Discussions," doc: IEEE 802.11-18/1161rO, The Institute of Electrical and Electronics En.oineers, Inc., DD. 1-10 Jul. 8, 2018.
Notice of Reasons for Refusal for U.S. Japanese Patent Application No. 2021-569930, mailed Jul. 13, 2023. (7 pages).
Notice of Reasons for Refusal for Japanese Application No. 2021-569930 dated Dec. 20, 2022 (7 pages).
Decision of Rejection for Japanese Application No. 2021-569930, dated Mar. 5, 2024. (2 pages).
Decision to Reject Amendment for Japanese Application No. 2021-569930, dated Mar. 5, 2024. (7 pages).
First Office Action in Chinese Application No. 202080053027.0, dated Jan. 23, 2024. (12 pages).
Search Report in Chinese Application No. 202080053027.0, dated Jan. 23, 2024. (2 pages).
Communication pursuant to Rule 164(2)(b) and Article 94(3) EPC for European Patent Application No. 20733111.7, mailed Jun. 20, 2024. (11 pages).

\* cited by examiner

TRANSMITTING TRAFFIC STREAMS VIA MULTIPLE WLAN COMMUNICATION LINKS

CROSS REFERENCES TO RELATED APPLICATIONS

The present application is a divisional of U.S. application Ser. No. 16/884,013, filed on May 26, 2020, entitled "POWER SAVE AND GROUP-ADDRESSED FRAMES IN WLAN USING MULTIPLE COMMUNICATION LINKS," which claims the benefit of U.S. Provisional Patent Application No. 62/852,612, entitled "Basic Service Set (BSS) with Band Aggregation—Power Save and TWT," filed on May 24, 2019, U.S. Provisional Patent Application No. 62/879,801, entitled "Basic Service Set (BSS) with Band Aggregation—Power Save and TWT," filed on Jul. 29, 2019, U.S. Provisional Patent Application No. 62/886,812, entitled "Basic Service Set (BSS) with Band Aggregation—Power Save and TWT," filed on Aug. 14, 2019, U.S. Provisional Patent Application No. 62/888,950, entitled "Basic Service Set (BSS) with Band Aggregation—Power Save and TWT," filed on Aug. 19, 2019, U.S. Provisional Patent Application No. 62/897,155, entitled "Basic Service Set (BSS) with Band Aggregation—Power Save and TWT," filed on Sep. 6, 2019. All of the applications referenced above are incorporated herein by reference in their entireties.

FIELD OF TECHNOLOGY

The present disclosure relates generally to wireless communication systems, and more particularly to transmission of packets and power save operations in a wireless local area network (WLAN) with multiple communication links in respective frequency segments.

BACKGROUND

Wireless local area networks (WLANs) have evolved rapidly over the past two decades, and development of WLAN standards such as the Institute for Electrical and Electronics Engineers (IEEE) 802.11 Standard family has improved single-user peak data rates. One way in which data rates have been increased is by increasing the frequency bandwidth of communication channels used in WLANs. For example, the IEEE 802.11n Standard permits aggregation of two 20 MHz sub-channels to form a 40 MHz aggregate communication channel, whereas the more recent IEEE 802.11ax Standard permits aggregation of up to eight 20 MHz sub-channels to form up to 160 MHz aggregate communication channels. Work has now begun on a new iteration of the IEEE 802.11 Standard, which is referred to as the IEEE 802.11be Standard, or Extremely High Throughput (EHT) WLAN. The IEEE 802.11be Standard may permit aggregation of as many as sixteen 20 MHz sub-channels (or perhaps even more) to form up to 320 MHz aggregate communication channels (or perhaps even wider aggregate communication channels). Additionally, the IEEE 802.11be Standard may permit aggregation of 20 MHz sub-channels in different frequency segments (for example, separated by a gap in frequency) to form respective communication links. Further, the IEEE 802.11be Standard may permit aggregation 20 MHz sub-channels in different radio frequency (RF) bands to form a single aggregate channel, or may permit aggregation of 20 MHz sub-channels in the different RF bands to form respective communication links.

The current IEEE 802.11 Standard (referred to herein as "the IEEE 802.11 Standard" for simplicity) provides for a first communication device to transmit packets to a second communication device via a single communication channel. The IEEE 802.11 Standard also provides mechanisms for devices to go into a power save mode, and to receive packets via a single communication channel while in the power save mode.

SUMMARY

In one embodiment, a method is for communicating in a wireless local area network (WLAN) that utilizes a plurality of WLAN communication links in respective frequency segments. The method comprising: determining, at a first communication device, whether a second communication device is in a power save mode with respect to a first WLAN communication link among the plurality of WLAN communication links, wherein the power save mode with respect to the first WLAN communication includes a wake state and a doze state; determining, at the first communication device, whether the second communication device is in a power save mode with respect to a second WLAN communication link among the plurality of WLAN communication links, wherein the power save mode with respect to the second WLAN communication includes a wake state and a doze state, wherein the second communication device is permitted to be in the power save mode with respect to the second WLAN communication link when the second communication device is not in the power save mode with respect to the first WLAN communication link, and wherein the second communication device is permitted to be in the power save mode with respect to the first WLAN communication link when the second communication device is not in the power save mode with respect to the second WLAN communication link; and communicating, by the first communication device, with the second communication device with at least one of i) the first WLAN communication link and ii) the second WLAN communication link, including communicating with the second communication device accordance with i) determining whether the second communication device is in the power save mode with respect to the first WLAN communication link, and ii) determining whether the second communication device is in the power save mode with respect to the second WLAN communication link.

In another embodiment, a first communication device comprises: a wireless network interface device that is configured to communicate via a plurality of WLAN communication links in respective frequency segments. The wireless network interface device includes one or more integrated circuit (IC) devices configured to: determine whether a second communication device is in a power save mode with respect to a first WLAN communication link among the plurality of WLAN communication links, wherein the power save mode with respect to the first WLAN communication includes a wake state and a doze state; determine whether the second communication device is in a power save mode with respect to a second WLAN communication link among the plurality of WLAN communication links, wherein the power save mode with respect to the second WLAN communication includes a wake state and a doze state, wherein whether the second communication device is in the power save mode with respect to the second WLAN communication link is independent of whether the second communication device is in the power save mode with respect to the first WLAN communication link; and communicate with the second communication device with at least one of i) the first WLAN communication link and ii) the second WLAN communication link, including communicating with the second communication device accordance with i) determining whether the second communication device is in the power save mode with respect to the first WLAN communication link, and ii) determining whether the second communication device is in the power save mode with respect to the second WLAN communication link.

In yet another embodiment, a method is for communicating in a WLAN that utilizes a plurality of WLAN communication links in respective frequency segments. The method includes: negotiating, by a first communication device, a first target wake time (TWT) agreement with a second communication device, including negotiating i) a first time period of TWT service periods (SPs) of the first TWT agreement and ii) a first time duration of each TWT SP of first TWT agreement, the first TWT agreement for a first WLAN communication link among the plurality of WLAN communication links, wherein the TWT SPs of the first TWT agreement corresponds time segments during which the second communication device is to be in a wake state in connection with the first WLAN communication link; negotiating, by the first communication device, a second TWT agreement with the second communication device, including negotiating i) a second time period of TWT SPs of the second TWT agreement and ii) a second time duration of each TWT SP of second TWT agreement, the second TWT agreement for a second WLAN communication link, wherein the TWT SPs of the second TWT agreement corresponds time segments during which the second communication device is to be in a wake state in connection with the second WLAN communication link, and wherein at least one of i) the first time period is permitted to be different than the second time period, and ii) the first time duration is permitted to be different than the second time duration; communicating, by the first communication device, with the second communication device via the first WLAN communication link in accordance with the first TWT agreement; and communicating, by the first communication device, with the second communication device via the second WLAN communication link in accordance with the second TWT agreement.

In still another embodiment, a first communication device comprises: a wireless network interface device that is configured to communicate via a plurality of WLAN communication links in respective frequency segments. The wireless network interface device includes one or more IC devices configured to: negotiate a first TWT agreement with a second communication device, including negotiating i) a first time period of TWT SPs of the first TWT agreement and ii) a first time duration of each TWT SP of first TWT agreement, the first TWT agreement for a first WLAN communication link among the plurality of WLAN communication links, wherein the TWT SPs of the first TWT agreement corresponds time segments during which the second communication device is to be in a wake state in connection with the first WLAN communication link; negotiate a second TWT agreement with the second communication device, including negotiating i) a second time period of TWT SPs of the second TWT agreement and ii) a second time duration of each TWT SP of second TWT agreement, the second TWT agreement for a second WLAN communication link, wherein the TWT SPs of the second TWT agreement corresponds time segments during which the second communication device is to be in a wake state in connection with the second WLAN communication link, and wherein at least one of i) the first time period is permitted to be different than the second time period, and ii) the first time duration is permitted to be different than the second time duration; communicate with the second communication device via the first WLAN communication link in accordance with the first TWT agreement; and communicate with the second communication device via the second WLAN communication link in accordance with the second TWT agreement.

In another embodiment, a method is for transmitting traffic streams in a WLAN that utilizes a plurality of WLAN communication links in respective frequency segments. The method includes: determining, at a first communication device, whether a specific WLAN communication link has been negotiated with a second communication device for a first traffic stream; in response to determining that the specific WLAN communication link has been negotiated for the first traffic stream, transmitting, by the first communication device, packets in the first traffic stream only via the specific WLAN communication link; and in response to determining that no WLAN communication link has been negotiated with the second communication device for the first traffic stream, transmitting, by the first communication device, packets in the first traffic stream via multiple WLAN communication links.

In still another embodiment, a first communication device comprises: a wireless network interface device that is configured to communicate via a plurality of WLAN communication links in respective frequency segments. The wireless network interface device includes one or more IC devices configured to: determine whether a specific WLAN communication link has been negotiated with a second communication device for a first traffic stream; in response to determining that the specific WLAN communication link has been negotiated for the first traffic stream, transmitting packets in the first traffic stream only via the specific WLAN communication link; and in response to determining that no WLAN communication link has been negotiated with the second communication device for the first traffic stream, transmitting packets in the first traffic stream via multiple WLAN communication links.

In yet another embodiment, a method is for transmitting a group-addressed frame in a WLAN that utilizes a plurality of WLAN communication links in respective frequency segments. The method comprises: determining, at a first communication device, whether the group-addressed frame is to be transmitted via multiple WLAN communication links among the plurality of WLAN communication links, the group addressed frame intended for a plurality of second communication devices in the WLAN; in response to determining that the group-addressed frame is to be transmitted via the multiple WLAN communication links, transmitting, by the first communication device, multiple instances of the group-addressed frame via respective WLAN communication links among the multiple WLAN communication links, including: transmitting a first instance of the group-addressed frame via a first WLAN communication link among the plurality of WLAN communication links, the first instance of the group-addressed frame having a sequence number set to a value, and transmitting a second instance of the group-addressed frame via a second WLAN communication link among the plurality of WLAN communication links, the second instance of the group-addressed frame having a sequence number set to the value; and in response to determining that the group-addressed frame is to be transmitted via only a single WLAN communication link among the plurality of WLAN communication links, transmitting, by the first communication device, the group-addressed frame only via the single WLAN communication link.

In another embodiment, a first communication device comprises: a wireless network interface device that is configured to communicate via a plurality of WLAN communication links in respective frequency segments. The wireless network interface device includes one or more IC devices configured to: determine whether the group-addressed frame is to be transmitted via multiple WLAN communication links among the plurality of WLAN communication links, the group addressed frame intended for a plurality of second communication devices in the WLAN; and in response to determining that the group-addressed frame is to be transmitted via the multiple WLAN communication links, transmit multiple instances of the group-addressed frame via respective WLAN communication links among the multiple WLAN communication links, including: transmitting a first instance of the group-addressed frame via a first WLAN communication link among the plurality of WLAN communication links, the first instance of the group-addressed frame having a sequence number set to a value, and transmitting a second instance of the group-addressed frame via a second WLAN communication link among the plurality of WLAN communication links, the second instance of the group-addressed frame having a sequence number set to the value. The one or more IC devices are further configured to: in response to determining that the group-addressed frame is to be transmitted via only a single WLAN communication link among the plurality of WLAN communication links, transmit the group-addressed frame only via the single WLAN communication link.

DETAILED DESCRIPTION

Figure 1:
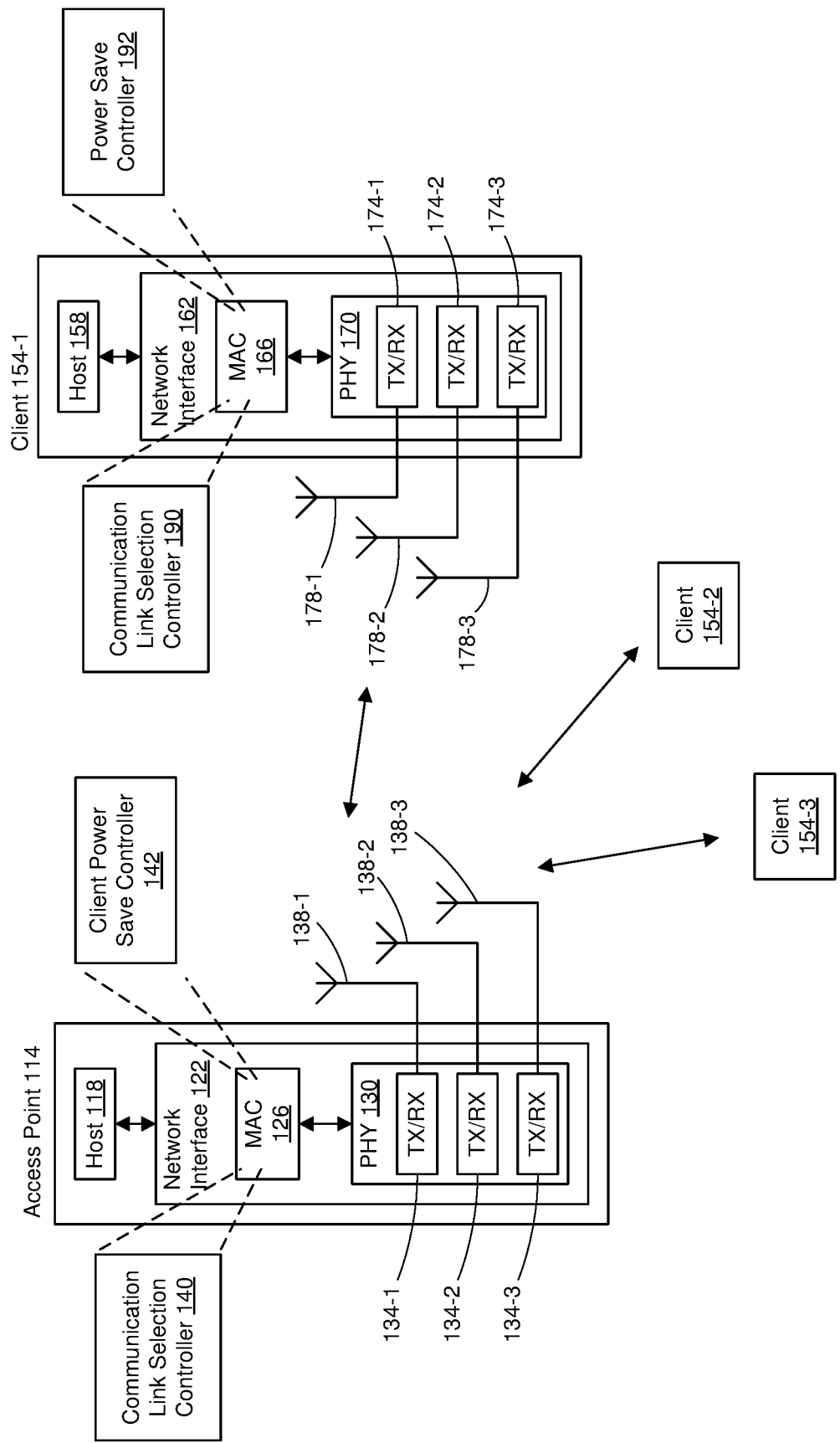
FIG. 1 is a block diagram of an example communication system in which communication devices wirelessly exchange information via multiple communication links corresponding to respective frequency segments, according to an embodiment.

A next generation wireless local area network (WLAN) protocol (e.g., the IEEE 802.11be Standard, sometimes referred to as the Extremely High Throughput (EHT) WLAN Standard) may permit aggregation of as many as sixteen (or perhaps even more) 20 MHz sub-channels to form 320 MHz aggregate communication channels (or perhaps even wider aggregate communication channels). Additionally, the IEEE 802.11be Standard may permit aggregation of 20 MHz sub-channels in different frequency segments (for example, separated by a gap in frequency) to form respective communication links. Additionally, the IEEE 802.11be Standard may permit the formation of multiple WLAN communication links corresponding to respective frequency segments. The multiple WLAN communication links may be used to simultaneously to transmit/receive different information In some embodiments, a communication device is permitted to operate in a power save mode with respect to a first communication link among a plurality of communication links that correspond to respective frequency segments independently of whether the communication device is operating in a power save mode with respect to a second communication link among the plurality of communication links, and vice versa. This provides communication devices in a WLAN with flexibility in communicating in a WLAN and in conserving power, according to some embodiments. In some embodiments, this provides an access point (AP) of the WLAN with flexibility in improving throughput and/or congestion because the AP can request different client stations to go into power save modes with respect to different communication links to reduce contention amongst client stations for WLAN communication links, for example.

In some embodiments, communication devices in a WLAN can negotiate a first target wake time (TWT) agreement for a first WLAN communication link among a plurality of WLAN communication links independently of negotiating a second TWT agreement for a second WLAN communication link. This provides communication devices in a WLAN with flexibility in conserving power, according to some embodiments. In some embodiments, this provides an AP with flexibility in improving throughput and/or congestion because the AP can schedule different client stations to go into low power states with respect to different communication links to reduce contention amongst client stations for WLAN communication links, for example.

In some embodiments, an AP can negotiate with client stations to select specific communication links for transmitting specific types of traffic having different quality of service requirements, and/or to have the flexibility to transmit some types of traffic via any of the communication links. In some embodiments, this provides an AP with flexibility in improving throughput and/or congestion because the AP can reserve a first communication link for certain types of traffic and/or transmit certain types of traffic via any communication link, for example.

In some embodiments, an AP can transmit a group-addressed frame via one communication link and/or multiple communication links. In some embodiments, this provides an AP with flexibility in improving throughput, congestion, and/or power consumption in a WLAN because the AP can choose to transmit a group-addressed frame only via one communication link when all intended receivers are available to receive via the one communication link, and choose to transmit the group-addressed frame via multiple communication links when all intended receivers are not available to receive via only one communication link, for example.

FIG. 1 is a diagram of an example WLAN 110 that uses multiple communication links in multiple frequency segments or in different radio frequency (RF) bands, according to an embodiment. The WLAN 110 includes an access point (AP) 114 that comprises a host processor 118 coupled to a wireless network interface device 122. The wireless network interface device 122 includes one or more medium access control (MAC) processors 126 (sometimes referred to herein as "the MAC processor 126" for brevity) and one or more PHY processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

In an embodiment, the wireless network interface device 122 is configured for operation within a single RF band at a given time. In an embodiment, the wireless network interface device 122 is configured to simultaneously communicate via multiple communication links in respective frequency segments within a single RF band, and/or to communicate via the multiple communication links at different times. In another embodiment, the wireless network interface device 122 is additionally configured for operation within two or more RF bands at the same time or at different times. For instance, in an embodiment, the wireless network interface device 122 is configured to the wireless network interface device 122 is configured to simultaneously communicate via multiple communication links in respective RF bands, and/or to communicate via the multiple communication links at different times. In an embodiment, the wireless network interface device 122 includes multiple PHY processors 130, where respective PHY processors 130 correspond to respective RF bands. In another embodiment, the wireless network interface device 122 includes a single PHY processor 130, where each transceiver 134 includes respective RF radios corresponding to respective RF bands.

The wireless network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. The first IC and the second IC may be packaged together in a single IC package thereby forming a modular device, or the first IC and the second IC may be coupled together on a single printed board, for example, in various embodiments. As another example, at least a portion of the MAC processor 126 and at least a portion of the PHY processor 130 may be implemented on a single IC. For instance, the wireless network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the wireless network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 is configured to generate MAC layer data units such as MAC service data units (MSDUs), MAC protocol data units (MPDUs), etc., and provide the MAC layer data units to the PHY processor 130. Additionally, the MAC processor 126 is configured to select communication links via which MAC layer data units should be transmitted and to control the PHY processor 130 so that the MAC layer data units are transmitted in the selected communication links, in some embodiments. Also, the MAC processor 126 is configured to determine when the respective communication links are idle and available for transmission and to control the PHY processor 130 so that MAC layer data units are transmitted when respective communication links are idle, in some embodiments. Additionally, the MAC processor 126 is configured to determine when client stations are in a sleep state and therefore unavailable to transmit or receive, in some embodiments. For example, the MAC processor 126 is configured to negotiate a schedule with a client station for when the client station is permitted to be in the sleep state and when the client station should be in a wake state and available to transmit to or receive from the AP 114, according to some embodiments.

The PHY processor 130 may be configured to receive MAC layer data units from the MAC processor 126 and to encapsulate the MAC layer data units to generate PHY data units such as PHY protocol data units (PPDUs) for transmission via the antennas 138. Similarly, the PHY processor 130 may be configured to receive PHY data units that were received via the antennas 138, and to extract MAC layer data units encapsulated within the PHY data units. The PHY processor 130 may provide the extracted MAC layer data units to the MAC processor 126, which processes the MAC layer data units.

PHY data units are sometimes referred to herein as "packets", and MAC layer data units are sometimes referred to herein as "frames".

In connection with generating one or more RF signals for transmission, the PHY processor 130 is configured to process (which may include modulation, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulation, filtering, etc.) the one or more digital baseband signals to generate a PPDU.

The PHY processor 130 includes amplifiers (e.g., a low noise amplifier (LNA), a power amplifier, etc.), an RF downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc., in various embodiments.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals, for example, by providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In other embodiments, the MAC processor 126 additionally or alternatively includes one or more hardware state machines.

The MAC processor 126 includes, or implements, a communication link selection controller 140 that is configured to select communication links via which MAC layer data units should be transmitted, according to some embodiments. For example, when a client station is configured to communicate via multiple communication links in respective frequency segments, the communication link selection controller 140 selects, for one or more MAC layer data units, one of the communication links for sending the one or more MAC layer data units, according to an embodiment. As another example, for a group-addressed MAC layer data unit (e.g., a MAC layer data unit with a receiver address set to a multicast address or a broadcast address), the communication link selection controller 140 selects, for the group-addressed MAC layer data unit, one of, or multiple ones of, the communication links for sending the group-addressed MAC layer data unit, according to an embodiment.

In an embodiment, the communication link selection controller 140 is implemented by a processor executing machine readable instructions stored in a memory, where the machine readable instructions cause the processor to perform acts described in more detail below. In another embodiment, the communication link selection controller 140 additionally or alternatively comprises hardware circuitry that is configured to perform acts described in more detail below. In some embodiments, the hardware circuitry comprises one or more hardware state machines that are configured to perform acts described in more detail below.

Additionally or alternatively, the MAC processor 126 includes, or implements, a client power save (PS) controller 142 that is configured to i) determine PS-related states of client stations with regard to multiple communication links, ii) negotiate PS-related schedules for the client stations with regard to multiple communication links, and/or iii) control the generation of frames in connection with the PS-related schedules, according to some embodiments. For example, when a client station is configured to communicate via multiple communication links in respective frequency segments, the client PS controller 142 is configured to determine PS-related states of the client station corresponding to respective communication links, according to an embodiment. As another example, when a client station is configured to communicate via multiple communication links in respective frequency segments, the client PS controller 142 negotiates with the client station PS-related schedules for the respective communication links, according to an embodiment.

In an embodiment, the client PS controller 142 is implemented by a processor executing machine readable instructions stored in a memory, where the machine readable instructions cause the processor to perform acts described in more detail below. In another embodiment, the client PS controller 142 additionally or alternatively comprises hardware circuitry that is configured to perform acts described in more detail below. In some embodiments, the hardware circuitry comprises one or more hardware state machines that are configured to perform acts described in more detail below.

In other embodiments, the communication link controller 140 and/or the client PS controller 142 are omitted from the AP 114.

The WLAN 110 also includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a wireless network interface device 162. The wireless network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

In an embodiment, the wireless network interface device 162 is configured for operation within a single RF band at a given time. In another embodiment, the wireless network interface device 162 is configured for operation within two or more RF bands at the same time or at different times. For example, in an embodiment, the wireless network interface device 162 includes multiple PHY processors 170, where respective PHY processors 170 correspond to respective RF bands. In another embodiment, the wireless network interface device 162 includes a single PHY processor 170, where each transceiver 174 includes respective RF radios corresponding to respective RF bands. In an embodiment, the wireless network interface device 162 includes multiple MAC processors 166, where respective MAC processors 166 correspond to respective RF bands. In another embodiment, the wireless network interface device 162 includes a single MAC processor 166 corresponding to the multiple RF bands.

The wireless network interface device 162 is implemented using one or more ICs configured to operate as discussed below. For example, the MAC processor 166 may be implemented on at least a first IC, and the PHY processor 170 may be implemented on at least a second IC. The first IC and the second IC may be packaged together in a single IC package thereby forming a modular device, or the first IC and the second IC may be coupled together on a single printed board, for example, in various embodiments. As another example, at least a portion of the MAC processor 166 and at least a portion of the PHY processor 170 may be implemented on a single IC. For instance, the wireless network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the wireless network interface device 162 may be implemented on a single IC.

In various embodiments, the MAC processor 166 and the PHY processor 170 of the client station 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. Additionally, the MAC processor 166 is configured to select communication links via which MAC layer data units should be transmitted and to control the PHY processor 170 so that the MAC layer data units are transmitted in the selected communication links, in some embodiments. Also, the MAC processor 166 is configured to determine when the respective communication links are idle and available for transmission and to control the PHY processor 170 so that MAC layer data units are transmitted when respective communication links are idle, in some embodiments. Additionally, the MAC processor 166 is configured to control when portions of the wireless network interface device 162 are in a sleep state or a wake state, for example to conserve power, in some embodiments. For example, the MAC processor 166 is configured to negotiate a schedule with the AP 114 for when the client station 154-1 is permitted to be in the sleep state and when the client station 154-1 should be in a wake state and available to transmit to or receive from the AP 114, according to some embodiments.

The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

The MAC processor 166 includes, or implements, a communication link selection controller 190 that is configured to select communication links via which MAC layer data units should be transmitted, according to some embodiments. For example, the communication link selection controller 190 selects, for one or more MAC layer data units, one of the communication links for sending the one or more MAC layer data units, according to an embodiment.

In an embodiment, the communication link selection controller 190 is implemented by a processor executing machine readable instructions stored in a memory, where the machine readable instructions cause the processor to perform acts described in more detail below. In another embodiment, the communication link selection controller 190 additionally or alternatively comprises hardware circuitry that is configured to perform acts described in more detail below. In some embodiments, the hardware circuitry comprises one or more hardware state machines that are configured to perform acts described in more detail below.

Additionally or alternatively, the MAC processor 166 includes, or implements, a PS controller 192 that is configured to i) determine PS-related states of the wireless network interface device 162 with regard to multiple communication links, ii) negotiate PS-related schedules for the client station 154-1 with regard to multiple communication links, and/or iii) control the generation of frames in connection with the PS-related schedules, according to some embodiments. For example, the client PS controller 192 negotiates with the AP 114 PS-related schedules for respective communication links, according to an embodiment.

In an embodiment, the client PS controller 192 is implemented by a processor executing machine readable instructions stored in a memory, where the machine readable instructions cause the processor to perform acts described in more detail below. In another embodiment, the client PS controller 192 additionally or alternatively comprises hardware circuitry that is configured to perform acts described in more detail below. In some embodiments, the hardware circuitry comprises one or more hardware state machines that are configured to perform acts described in more detail below.

In other embodiments, the communication link controller 190 and/or the client PS controller 192 are omitted from the client station 154-1.

In an embodiment, each of the client stations 154-2 and 154-3 has a structure that is the same as or similar to the client station 154-1. In an embodiment, one or more of the client stations 154-2 and 154-3 has a different suitable structure than the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2A:
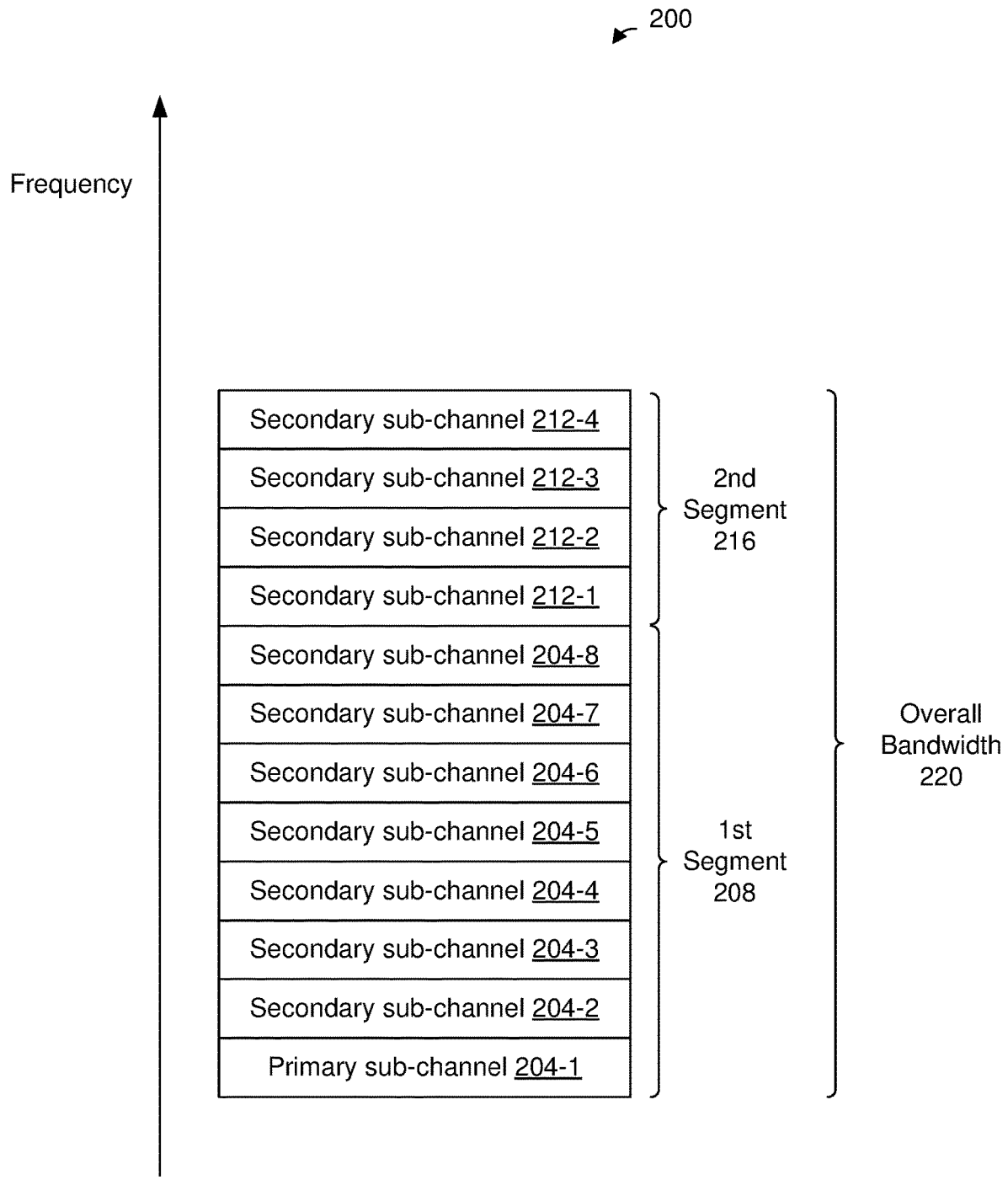
FIG. 2A is a diagram of an example communication channel used by the communication system of FIG. 1, the communication channel having multiple communication links corresponding to respective frequency segments, according to an embodiment.

FIG. 2A is a diagram of an example operating channel 200 that is used in the communication system 110 of FIG. 1, according to an embodiment. The operating channel 200 comprises a plurality of subchannels 204 in a first frequency segment 208 and a plurality of subchannels 212 in a second frequency segment 216. The operating channel 200 spans an overall bandwidth 220. In an embodiment, the first segment 208 and the second segment 216 are within a same radio frequency (RF) band.

In other embodiments, the first segment 208 and the second segment 216 are in different RF bands. The Federal Communication Commission (FCC) now permits wireless local area networks (WLANs) to operate in multiple RF bands, e.g., the 2.4 GHz band (approximately 2.4 to 2.5 GHz), and the 5 GHz band (approximately 5.170 to 5.835 GHz). Recently, the FCC proposed that WLANs can also operate in the 6 GHz band (5.925 to 7.125 GHz). Regulatory agencies in other countries/regions also permit WLAN operation in the 2.4 GHz and 5 GHz bands, and are considering permitting WLAN operation in the 6 GHz band. A future WLAN protocol, now under development, may permit multi-band operation in which a WLAN can use spectrum in multiple RF bands at the same time.

In some embodiments, the first frequency segment 208 is used as a first communication link and the second frequency segment 216 is used as a second communication link, where the first communication link and the second communication link are used for simultaneous transmissions.

In one embodiment, each of the subchannels 204/212 spans 20 MHz. Thus, as illustrated in FIG. 2A, the first segment 208 spans 160 MHz and the second segment 216 spans 80 MHz. In other embodiments, the first frequency segment 208 includes another suitable number of subchannels 204 (e.g., one, two, four, etc.) and spans another suitable bandwidth, such as 20 MHz, 40 MHz, 80 MHz, etc., and/or the second frequency segment 216 includes another suitable number of subchannels 212 (e.g., one, two, eight, etc.) and spans another suitable bandwidth, such as 20 MHz, 40 MHz, 160 MHz, etc.

One subchannel 204-1 in the first frequency segment 208 is designated as a primary subchannel and the other subchannels 204/212 are designated as secondary subchannels. Control and/or management frames are transmitted in the primary subchannel 204-1, according to some embodiments. In some embodiments, the primary subchannel must be idle in order for any of the subchannels 204/212 to be used for a transmission, according to some embodiments. In some embodiments, a subchannel 212 in the second frequency segment 216 is also designated as a primary subchannel (not shown). In some embodiments in which the second frequency segment 216 also includes a primary subchannel, control and/or management frames are additionally or alternatively transmitted in the primary subchannel of the second frequency segment 216, at least in some scenarios. In other embodiments, control and/or management frames are only transmitted in the primary subchannel 204-1 of the first frequency segment 208.

In some embodiments in which the second frequency segment 216 also includes a primary subchannel, the primary subchannel 204-1 of the first frequency segment 208 must be idle in order for any of the subchannels 204 to be used for a transmission and the primary subchannel of the second frequency segment 216 must be idle in order for any of the subchannels 212 to be used for a transmission, according to some embodiments. In other embodiments, one or more of the secondary subchannels 204 may be used for a transmission even when the primary subchannel 204-1 is not idle, and/or one or more of the secondary subchannels 212 may be used for a transmission even when the primary subchannel of the second frequency segment 216 is not idle, according to some embodiments.

In other embodiments, no subchannel 212 in the second segment 216 is designated as a primary subchannel.

Figure 2B:
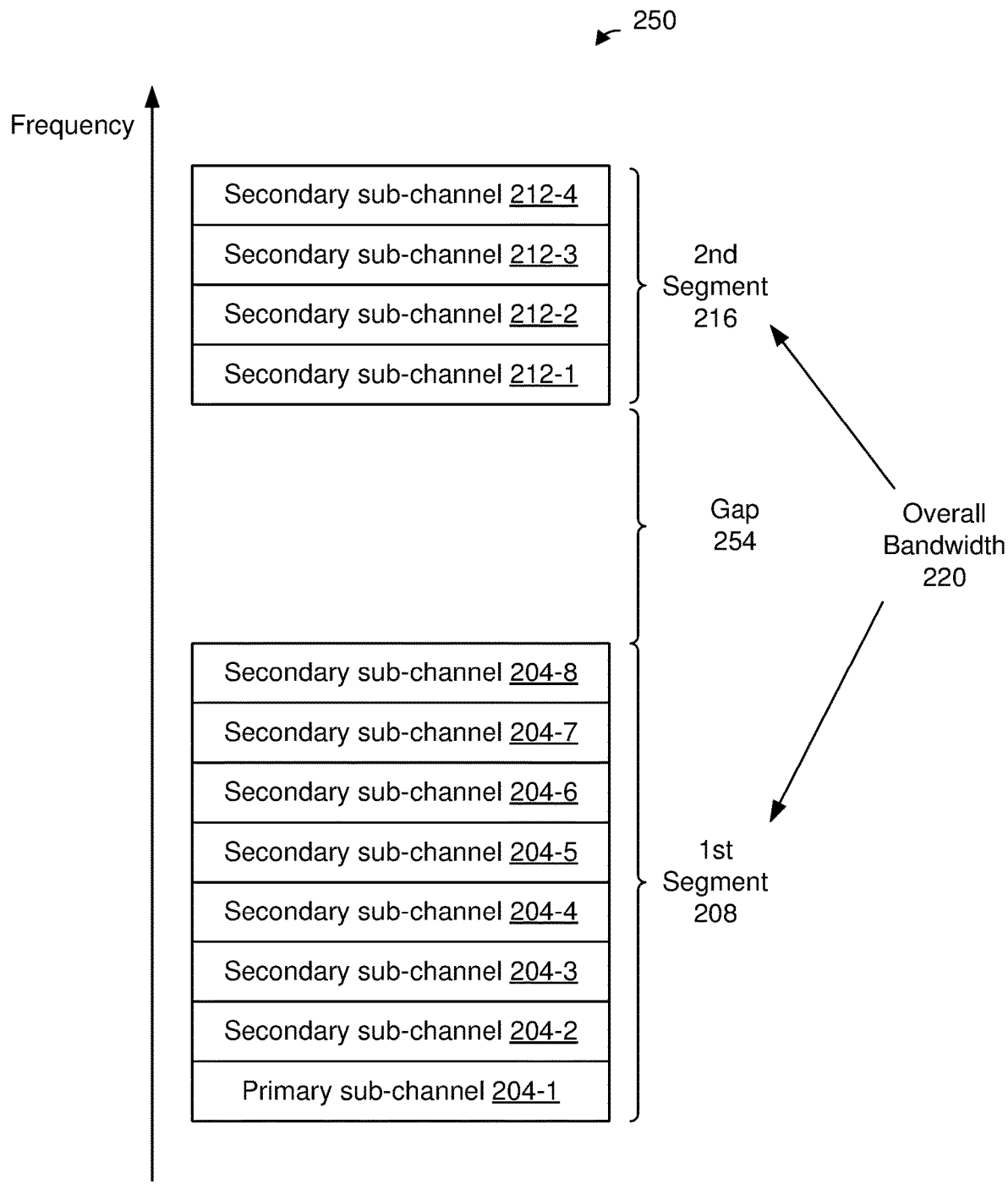
FIG. 2B is a diagram of another example communication channel used by the communication system of FIG. 1, the communication channel having multiple communication links corresponding to respective frequency segments, according to an embodiment.

FIG. 2B is a diagram of another example operating channel 250 that is used in the communication system 110 of FIG. 1, according to another embodiment. The operating channel 250 is similar to the example operating channel 200 of FIG. 2A, and like-numbered elements are not described in detail for brevity. In the example operating channel 250 the first frequency segment 208 and the second frequency segment 216 are separated by a gap 254 in frequency. In some embodiments, the first frequency segment 208 and the second frequency segment 216 are in a same RF band. In other embodiments, the first frequency segment 208 and the second frequency segment 216 are in different RF bands.

Referring now to FIGS. 2A and 2B, one or more of the subchannels 204/212 are "punctured" (not shown in FIGS. 2A and 2B, e.g., nothing is transmitted within the "punctured" subchannels, according to some embodiments.

Although the example operating channels 200 and 250 of FIGS. 2A-B are illustrated as including two frequency segments 208/216, other suitable operating channels include three or more frequency segments (e.g., include a third frequency segment, include a third frequency segment and a fourth frequency segment, etc.). In some embodiments, a third frequency segment is separated from the second frequency segment 216 by a gap in frequency in which nothing is transmitted, similar to the gap 254. In some embodiments, a third frequency segment is contiguous in frequency with the second frequency segment 216.

In some embodiments, respective frequency segments such as illustrated in FIGS. 2A-B are associated with different MAC addresses. For example, in embodiments in which the respective frequency segments are uses as respective communication links, the respective communication links correspond to different MAC addresses.

Figure 3:
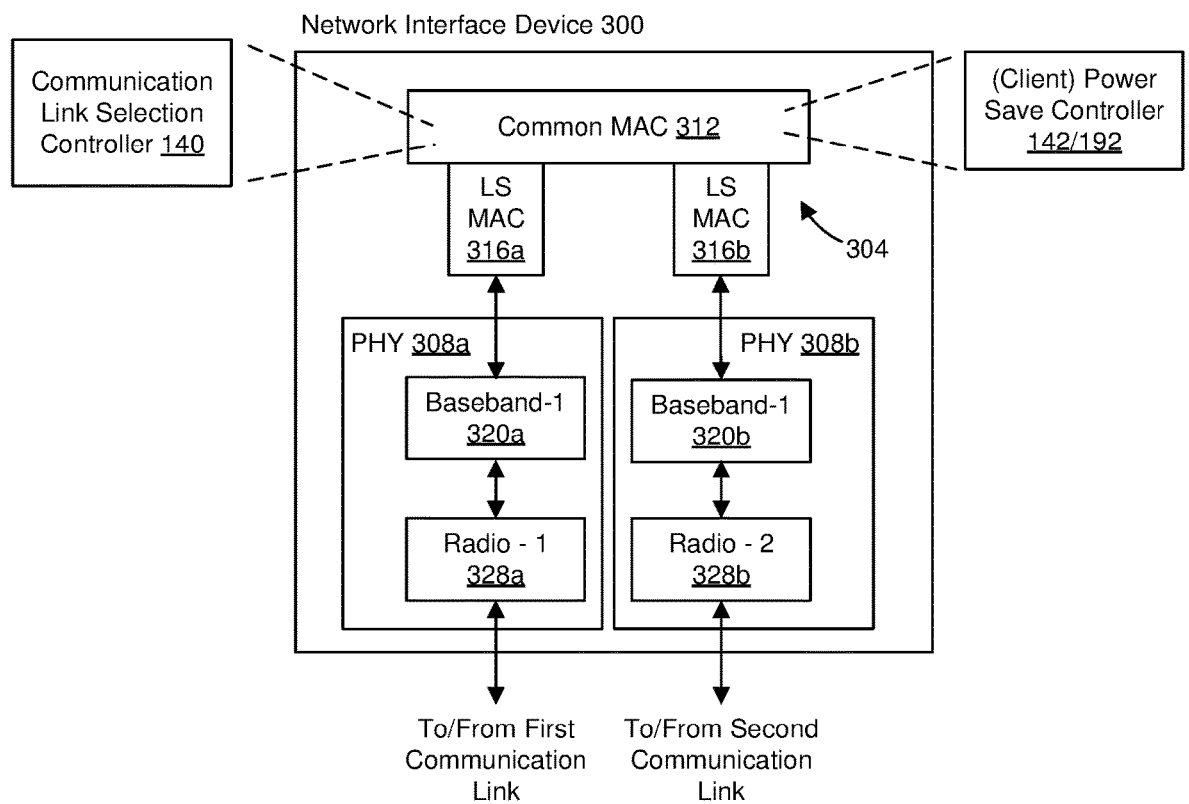
FIG. 3 is a block diagram of an example wireless network interface device configured to communication via multiple communication links corresponding to respective frequency segments, according to an embodiment.

FIG. 3 is a diagram of an example network interface device 300 configured for simultaneous communication via multiple communication links in respective frequency segments, according to an embodiment. The network interface device 300 is an embodiment of the network interface device 122 of the AP 114 of Fig. The network interface device 300 is an embodiment the network interface device 162 of the client station 154-1 of FIG. 1. In other embodiments, the network interface device 122 and/or the network interface device 162 have a different suitable structure than the network interface device 300. Additionally, in some embodiments, the network interface device 300 is used in another suitable communication device than the communication devices of FIG. 1, and/or is used in another suitable wireless network than the wireless network of FIG. 1

The network interface device 300 is configured for simultaneous communication via a first communication link in a first frequency segment and a second communication link in a second frequency segment, in the illustrated embodiment.

The network interface device 300 includes a MAC processor 304 coupled to a PHY processors 308. The MAC processor 304 exchanges frames (or PSDUs) with the PHY processors 308.

In an embodiment, the MAC processor 304 corresponds to the MAC processor 126 of FIG. 1. In another embodiment, the MAC processor 304 corresponds to the MAC processor 166 of FIG. 1. In an embodiment, the PHY processors 308 corresponds to the one or more PHY processors 130 of FIG. 1. In another embodiment, the PHY processors 308 corresponds to the one or more PHY processors 170 of FIG. 1.

The MAC processor 304 includes common MAC logic 312 and link specific (LS) MAC logic 316. The common MAC logic 312 generally implements MAC layer functions that are common to the multiple communication links. For instance, the common MAC logic 312 is configured to encapsulate data (received from a host processor (not shown), for example) in MAC layer data units such as MSDUs, MPDUs, aggregate MPDUs (A-MPDUs), etc., for transmission via the multiple communication links and to decapsulate data from MSDUs, MPDUs, A-MPDUs, etc., that were received via the multiple communication links. Additionally, the common MAC logic 312 is configured to select communication links via which MAC layer data units should be transmitted, in some embodiments.

Each LS MAC logic 316 generally implements MAC layer functions that are specific to the particular communication link to which the LS MAC logic 316 corresponds. For example, the LS MAC logic 316a is configured to determine when the first communication link is idle and available for transmission, and the LS MAC logic 316b is configured to determine when the second communication link is idle and available for transmission, in some embodiments. In some embodiments, each LS MAC logic 316 is associated with a respective network address (e.g., a MAC address), i.e., the LS MAC logic 316a is associated with a first network address (e.g., a first MAC address) and the LS MAC logic 316a is associated with a second network address (e.g., a second MAC address) that is different than the first network address.

In some embodiments, the common MAC logic 312 implements the communication link selection controller 140 discussed above with reference to FIG. 1. In some embodiments, the common MAC logic 312 additionally or alternatively implements the client power save controller 142/ power save controller 192 discussed above with reference to FIG. 1. In some embodiments, some or all of the client power save controller 142/power save controller 192 is implemented as respective link specific client power save controllers 142/power save controllers 192 in respective LS MAC logic 316.

In some embodiments, when the network interface device 300 is in an AP, the client power save controller 142 is configured to negotiate a first schedule with a client station 154 for when the client station 154 is permitted to be in the sleep state with respect to the first communication link and when the client station should be in a wake state with respect to the first communication link, and to negotiate a second schedule with the client station 154 for when the client station 154 is permitted to be in the sleep state with respect to the second communication link and when the client station should be in a wake state with respect to the second communication link, according to some embodiments. Similarly, when the network interface device 300 is in a client station, the power save controller 192 is configured to negotiate a first schedule with an AP for when the client station is permitted to be in the sleep state with respect to the first communication link and when the client station should be in a wake state with respect to the first communication link, and to negotiate a second schedule with the AP for when the client station 154 is permitted to be in the sleep state with respect to the second communication link and when the client station should be in a wake state with respect to the second communication link, according to some embodiments.

Additionally, when the network interface device 300 is in an AP, the client power save controller 142 is configured to determine when a client station 154 is in a sleep state with respect to the first communication link and therefore unavailable to transmit or receive via the first communication link, and to determine when the client station 154 is in a sleep state with respect to the second communication link and therefore unavailable to transmit or receive via the second communication link, in some embodiments. Similarly, when the network interface device 300 is in a client station, the power save controller 192 is configured to determine PS-related states of the client station with respect to the first communication link, and to determine PS-related states of the client station with respect to the second communication link, in some embodiments.

The PHY processor 308*a* includes a baseband signal processor 320*a* corresponding to the first communication link, and the PHY processor 308*b* includes a baseband signal processor 320*b* corresponding to the second communication link. The PHY processor 308*a* also includes a first RF radio (Radio-1) 328*a* corresponding to the first communication link, and the PHY processor 308*b* includes a second RF radio (Radio-2) 328*b* corresponding to the second communication link. The baseband signal processor 320*a* is coupled to the first RF radio 328*a* and the baseband signal processor 320*b* is coupled to the second RF radio 328*b*. In an embodiment, the RF radio 328*a* and the RF radio 328*b* correspond to the transceivers 134 of FIG. 1. In another embodiment, the RF radio 328*a* and the RF radio 328*b* correspond to the transceivers 174 of FIG. 1. In an embodiment, the RF radio 328*a* is configured to operate on a first RF band, and the RF radio 328*b* is configured to operate on a second RF band. In another embodiment, the RF radio 328*a* and the RF radio 328*b* are both configured to operate on the same RF band.

In an embodiment, the baseband signal processors 320 are configured to receive frames (or PSDUs) from the MAC processor 304, and encapsulate the frames (or PSDUs) into respective packets and generate respective baseband signals corresponding to the respective packets.

The baseband signal processor 320*a* provides the respective baseband signal generated by the baseband signal processor 320*a* to the Radio-1 328*a*. The baseband signal processor 320*b* provides the respective baseband signal generated by the baseband signal processor 320*b* to the Radio-1 328*b*. The Radio-1 328*a* and Radio-2 328*b* upconvert the respective baseband signals to generate respective RF signals for transmission via the first communication link and the second communication link, respectively. The Radio-1 328*a* transmits a first RF signal via the first frequency segment and the Radio-2 328*b* transmits a second RF signal via the second frequency segment.

The Radio-1 328*a* and the Radio-2 328*b* are also configured to receive respective RF signals via the first communication link and the second communication link, respectively. The Radio-1 328*a* and the Radio-2 328*b* generate respective baseband signals corresponding to the respective received signals. The generated respective baseband signals are provided to the respective baseband signal processors 320*a* and 320*b*. The respective baseband signal processors 320*a* and 320*b* generate respective PSDUs corresponding to the respective received signals, and provide the respective PSDUs to the MAC processor 304. The MAC processor 304 processes the PSDUs received from the baseband signal processors 320*a* and 320*b*, in an embodiment.

Although the example network interface 300 illustrated in FIG. 3 includes a single MAC processor 304, other suitable network interface devices include multiple MAC processors, with respective ones of the multiple MAC processors 304 corresponding to respective ones of the communication links, in some embodiments. Although the example network interface 300 illustrated in FIG. 3 includes multiple PHY processors 308, other suitable network interface devices include a single PHY processor with multiple RF radios corresponding to respective ones of the communication links, in some embodiments. In some embodiments, the single PHY processor includes multiple baseband processors 320, while in other embodiments the single PHY processor includes a single baseband processor that is configured to generate multiple baseband signals corresponding to respective communication links, and to process multiple baseband signals received from the multiple RF radios.

In some embodiments, at least some MAC layer data units (e.g., MPDUs) transmitted in a WLAN that utilizes multiple communication links, such as described above, correspond to multiple traffic classes, where each traffic class is associated with a particular traffic type (e.g., network control, video, voice, streaming multimedia, etc.). For example, in an embodiment, the traffic classes are associated with particular quality of service (QoS) requirements and/or priority levels (e.g., background, best effort, video, voice, etc.). In an embodiment, each traffic class corresponds to a particular traffic identifier (TID), and a MAC layer data unit (e.g., a MPDU) includes (e.g., in a MAC header of the MAC layer data unit) an indication of the TID to which the MPDU corresponds.

In some embodiments, a first communication device is permitted to transmit to a second communication device MPDUs in a traffic stream of MPDUs having a same TID via any communication link without first negotiating with the second communication device to set a particular communication link via which MPDUs in the traffic stream are to be transmitted. For example, referring to FIGS. 2A-B for explanatory purposes, the first communication device is permitted to transmit to the second communication device a first set of MPDUs in the traffic stream of MPDUs having the same TID via the first frequency segment 208 (e.g., a first communication link) without first negotiating with the second communication device that the first frequency segment 208 is to be used for the traffic stream. Continuing with this example, the first communication device is also permitted to subsequently transmit to the second communication device a second set of MPDUs in the traffic stream of MPDUs having the same TID via the second frequency segment 216 (e.g., a second communication link) without first negotiating with the second communication device that the communication link for the traffic stream is being switched from the first frequency segment 208 to the second frequency segment 216.

Similarly, in some embodiments, the first communication device is permitted to transmit to any second communication devices MPDUs in any traffic streams (each traffic stream comprising MPDUs having a respective same TID intended for a respective second communication device) via any communication links without first negotiating with any of the second communication devices to set particular communication links via which MPDUs in the traffic streams are to be transmitted.

In other embodiments, the first communication device is required to negotiate with the second communication device a particular communication link to transmit to the second communication device MPDUs in a traffic stream of MPDUs having a same TID prior to transmitting MPDUs in the traffic stream via the particular communication link. For example, referring to FIGS. 2A-B for explanatory purposes, the first communication device is required to negotiate with the second communication device using the first frequency segment 208 (e.g., a first communication link) to transmit to the second communication device MPDUs in a traffic stream of MPDUs having a same TID prior to transmitting MPDUs in the traffic stream via the first frequency segment 208. Continuing with this example, when the first communication device decides to switch to transmitting MPDUs in the traffic stream via the second frequency segment 216 (e.g., a second communication link), the first communication device is required to first negotiate with the second communication device switching to using the second frequency segment 216 for the traffic stream before transmitting MPDUs in the traffic stream to the second communication device via the second frequency segment 216.

Similarly, in some embodiments, the first communication device is required to negotiate with all second communication devices the communication links that are to be used for transmitting MPDUs in various traffic streams (each traffic stream comprising MPDUs having a respective same TID intended for a respective second communication device) prior to transmitting any traffic streams.

In other embodiments, the first communication device is permitted to transmit a first set traffic streams (each traffic stream comprising MPDUs having a respective same TID intended for a respective second communication device) via any communication links without first negotiating with any of the second communication devices to set particular communication links via which MPDUs in the first set of traffic streams are to be transmitted. Similarly, in such embodiments, the first communication device is permitted to switch communication links via which MPDUs in any of the first set of traffic streams are transmitted without first negotiating with any of the second communication devices regarding the switching of communication links. On the other hand, in such embodiments, the first communication device is required to negotiate with at least some second communication devices the communication links that are to be used for transmitting MPDUs in a second set of traffic streams (each traffic stream comprising MPDUs having a respective same TID intended for a respective second communication device) prior to transmitting any traffic streams in the second set of traffic streams. Similarly, in such embodiments, the first communication device is required to negotiate with at least some second communication device a switch of communication links via which MPDUs in any of the second set of traffic streams are transmitted prior to switching communication links via which MPDUs in the second set of traffic streams are transmitted.

In some embodiments, negotiating a communication link via which MPDUs with a particular TID are to be transmitted comprises transmitting, by an AP, an announcement frame that specifies that all MPDUs having the particular TID and being transmitted in the WLAN are to be transmitted via a particular communication link, among multiple communication links being used in the WLAN. In some embodiments, negotiating a communication link via which MPDUs with a particular TID are to be transmitted comprises transmitting, by an AP, an announcement frame that specifies that all MPDUs, having the particular TID, to be transmitted to or by a particular client station are to be transmitted via a particular communication link, among multiple communication links being used in the WLAN.

In some embodiments, negotiating a communication link via which MPDUs with a particular TID are to be transmitted to or from a particular client station comprises transmitting, by the particular client station, an announcement frame that specifies that all MPDUs having the particular TID are to be transmitted to or by the client station via a particular communication link, among multiple communication links being used in the WLAN.

In some embodiments, negotiating a communication link such as described includes the AP making a final decision regarding which communication link is to be used for a particular TID and, optionally, for a particular client station. Having the AP make the final decision regarding which communication link is to be used for a particular TID and, optionally, for a particular client station facilitates the AP controlling latency and/or jitter (and/or another suitable quality of service metric) regarding the transmission of MPDUs having the particular TID, at least in some embodiments.

In some embodiments, if there has been no negotiation regarding a particular TID, the first communication device is permitted to transmit MPDUs in a traffic stream of MPDUs having a same TID via any communication link without first negotiating with any second communication device to set a particular communication link via which MPDUs in the traffic stream are to be transmitted. On the other hand, if there has been a negotiation with a second communication device regarding a particular TID, the first communication device is required to transmit MPDUs in a traffic stream of MPDUs having the particular TID to the second communication device via the particular communication link.

Referring now to FIG. 1, in some embodiments, the network interface 122 is configured to (e.g., the MAC processor 126 is configured to, the communication link selection controller 140 is configured to, etc.) select a communication link via which a particular traffic stream (e.g., comprising MPDUs having a same TID and intended for a same client station 154) is to be transmitted. In some embodiments, the network interface 122 is configured to (e.g., the MAC processor 126 is configured to, the communication link selection controller 140 is configured to, etc.) negotiate with a client station 154 a communication link via which a particular traffic stream (e.g., comprising MPDUs having a same TID and intended for a same client station 154) is to be transmitted. In some embodiments, the network interface 122 is configured to (e.g., the MAC processor 126 is configured to, the communication link selection controller 140 is configured to, etc.) generate a frame that announces a communication link via which a particular traffic stream (e.g., comprising MPDUs having a same TID and intended for a same client station 154) is to be transmitted.

In some embodiments, the network interface 162 is configured to (e.g., the MAC processor 166 is configured to, the communication link selection controller 190 is configured to, etc.) select a communication link via which a particular traffic stream (e.g., comprising MPDUs having a same TID and intended for the AP 114) is to be transmitted. In some embodiments, the network interface 162 is configured to (e.g., the MAC processor 166 is configured to, the communication link selection controller 190 is configured to, etc.) negotiate with the AP 114 a communication link via which a particular traffic stream (e.g., comprising MPDUs having a same TID and intended for the AP 114) is to be transmitted. In some embodiments, the network interface 162 is configured to (e.g., the MAC processor 166 is configured to, the communication link selection controller 190 is configured to, etc.) generate a frame that announces a communication link via which a particular traffic stream (e.g., comprising MPDUs having a same TID and intended for the AP 114) is to be transmitted.

Figure 4:
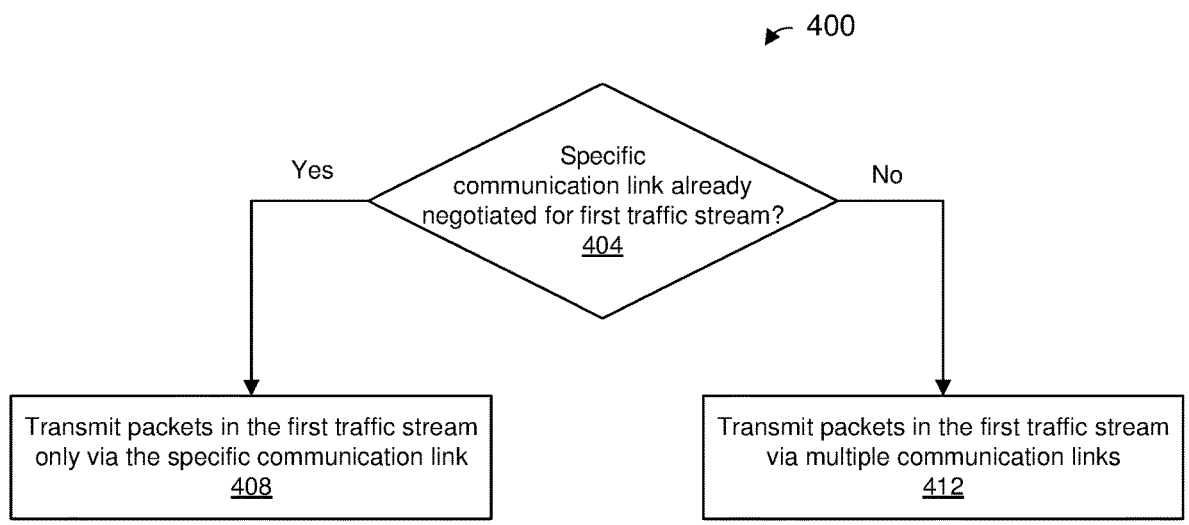
FIG. 4 is a flow diagram of an example method for transmitting traffic streams in a WLAN that utilizes a plurality of communication links in respective frequency segments, according to another embodiment.

FIG. 4 is a flow diagram of an example method 400 for transmitting traffic streams in a WLAN that utilizes a plurality of WLAN communication links in respective frequency segments, according to an embodiment. In some embodiments, the AP 114 and/or the client station 154 is configured to implement the method 400, and FIG. 4 is described with reference to FIG. 1 merely for explanatory purposes. In other embodiments, the method 400 is implemented by another suitable communication device.

At block 404, a first communication device determines (e.g., the network interface 122 determines, the MAC processor 126 determines, the communication link selection controller 140 determines, the network interface 162 determines, the MAC processor 166 determines, the communication link selection controller 190 determines, etc.) whether a specific WLAN communication link has been negotiated with a second communication device for a first traffic stream. In an embodiment, the first traffic stream corresponds to MPDUs (within PHY data units or packets) having a same TID and, optionally, intended for the second communication device.

In response to determining at block 404 that the specific WLAN communication link has been negotiated for the first traffic stream, the flow proceeds to block 408. At block 408, the first communication device transmits (e.g., the network interface 122 transmits, the PHY processor 130 transmits, the network interface 162 transmits, the PHY processor 270 transmits, etc.) packets in the first traffic stream only via the specific WLAN communication link that was negotiated with the second communication device.

On the other hand, in response to determining at block 404 that no WLAN communication link has been negotiated with the second communication device for the first traffic stream, the flow proceeds to block 412. At block 412, the first communication device transmits (e.g., the network interface 122 transmits, the PHY processor 130 transmits, the network interface 162 transmits, the PHY processor 270 transmits, etc.) packets in the first traffic stream via multiple WLAN communication links.

In some embodiments, the method 400 further comprises: in response to determining at block 404 that no WLAN communication link has been negotiated with the second communication device for the first traffic stream, the first communication device determines (e.g., the network interface 122 determines, the MAC processor 126 determines, the communication link selection controller 140 determines, the network interface 162 determines, the MAC processor 166 determines, the communication link selection controller 190 determines, etc.) whether all packets in the first traffic stream will be transmitted only via one WLAN communication link; and in response to determining that all packets in the first traffic stream will be transmitted only via one WLAN communication link, the first communication device transmits (e.g., the network interface 122 transmits, the PHY processor 130 transmits, the network interface 162 transmits, the PHY processor 270 transmits, etc.) packets in the first traffic stream only via the one WLAN communication link; and transmitting packets in the first traffic stream at block 412 via multiple WLAN communication links is further in response to subsequently determining that all packets in the first traffic stream will not be transmitted only via the one WLAN communication link.

Referring again to FIGS. 1, 2A-B, in some embodiments, the AP 114 negotiates a "negotiated link" with each client station 154 that is capable of using multiple communication links corresponding to respective frequency segments. The negotiated link functions as a main or default communication link, among the multiple communication links, for the AP 114 and the client station 154. In some embodiments, the negotiated link is the same for all client stations 154, e.g., there is only one negotiated link for the WLAN 110. In some embodiments, the AP 114 transmits beacon frames only in the negotiated link. In other embodiments, the AP 114 transmits beacon frames in multiple communication links.

In some embodiments, the AP 114 transmits group-addressed frames only in the negotiated link. In other embodiments, the AP 114 transmits each of at least some group-addressed frames in multiple communication links corresponding to respective frequency segments. As used herein, a "group-addressed" frame is an MPDU having, within a MAC header of the MPDU, a receiver address set to a broadcast address or a multicast address. A broadcast address is a network address that indicates to receivers that the MPDU is intended for all receivers. A multicast address is a network address that indicates to receivers that the MPDU is intended for a group of receivers corresponding to the multicast address. For example, the AP 114 may define a group of client stations 154 and assign a particular multicast address to the group of client stations 154. Thus, when a client station 154 in the defined group receives an MPDU with a receiver address set to the particular multicast address, the client station 154 determines that the MPDU is intended for the client station; on the other hand, when a client station 154 that is not in the defined group receives the MPDU with the receiver address set to the particular multicast address, the client station 154 determines that the MPDU is not intended for the client station 154, according to an embodiment.

In some embodiments, the AP 114 determines (e.g., the network interface device 122 determines, the MAC processor 126 determines, the communication link selection controller 140 determines, etc.) one or more communication links via which a group-addressed frame is to be transmitted, and the AP 114 transmits (e.g., the network interface device 122 transmits, the PHY processor 130 transmits, etc.) the group-addressed frame via the determined one or more communication links.

When a communication device transmits a group-addressed frame via multiple communication links, the communication device transmits respective instances of the group-addressed frame via respective ones of the communication links. In some embodiments, when the communication device transmits respective instances of the group-addressed frame via respective instances of the communication links, the communication device sets a sequence number field in a MAC header of each instance of the group-addressed frame to a same number. The sequence number field corresponds to a sequence number corresponding to group-addressed frames. Thus, the respective sequence number fields of subsequent other respective group-addressed frames (as opposed to instances of a same group-addressed frame) are incremented so that different respective group-addressed frames have different sequence numbers, although if multiple instances of a same subsequent group-addressed frame are transmitted, the sequence number field in the multiple instance of the same subsequent group-addressed frame are set to a same value. As will be described in more detail below, a receiver uses the sequence number field in MAC headers of respective instances of the group-addressed frame received via multiple communication links to accept one of the instances of the group-addressed frame and to discard or drop any other instances of the group-addressed frame, according to some embodiments.

Figure 5:
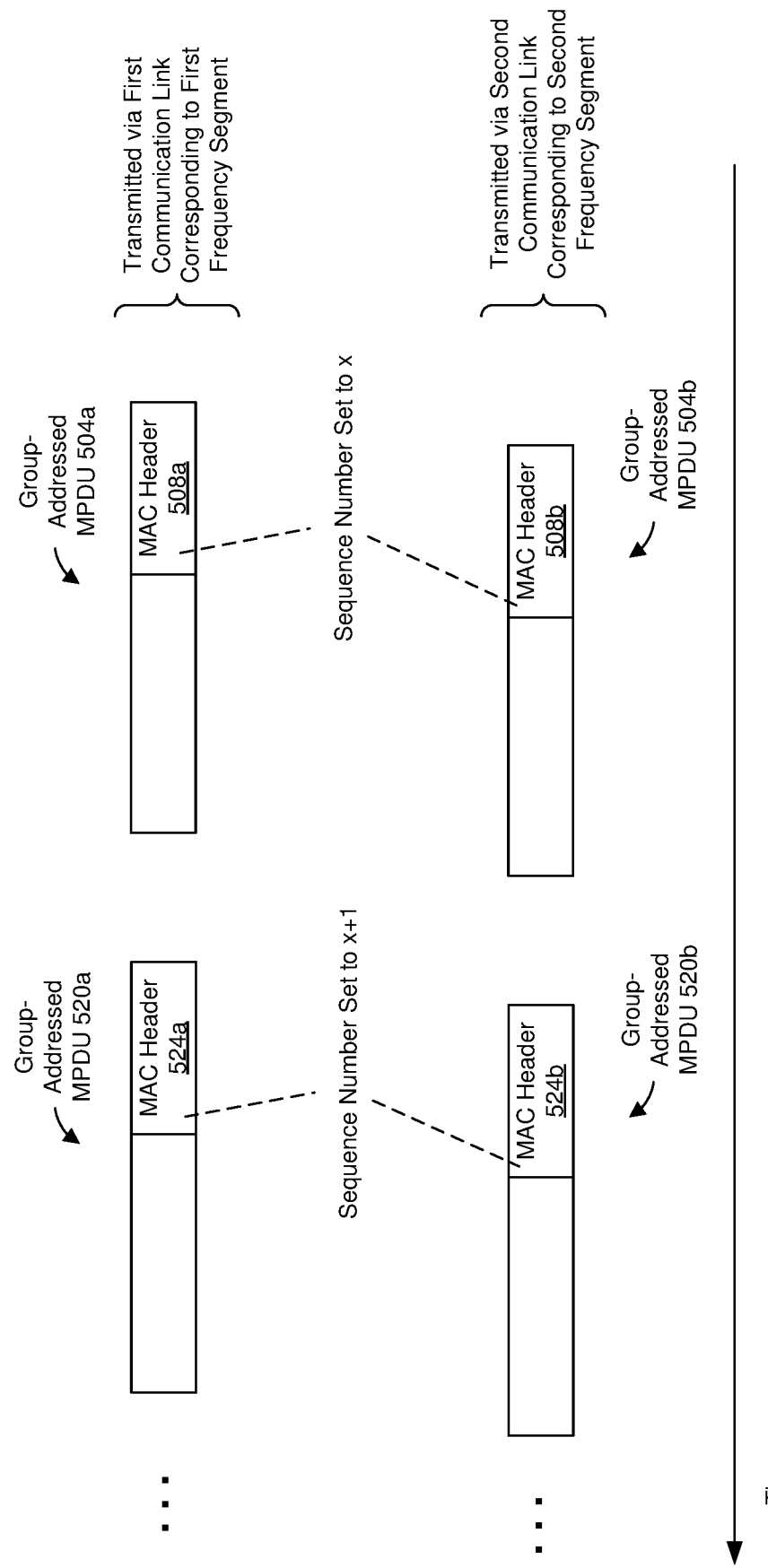
FIG. 5 is a diagram showing group-addressed frames transmitted via multiple communication links corresponding to respective frequency segments, according to an embodiment.

FIG. 5 is a diagram showing group-addressed MPDUs transmitted via multiple communication links corresponding to respective frequency segments, according to an embodiment. For example, multiple instances of a group-addressed MPDU 504 are transmitted via multiple communication links. In particular, a first instance of the group-addressed MPDU 504a is transmitted via a first communication link corresponding to a first frequency segment and a second instance of the group-addressed MPDU 504b is transmitted via a second communication link corresponding to a second frequency segment. The first instance of the group-addressed MPDU 504a includes a MAC header 508a with a sequence number field set to a value x, and the second instance of the group-addressed MPDU 504b includes a MAC header 508b with a sequence number field set to the value x. Additionally, multiple instances of a group-addressed MPDU 520 are transmitted via the multiple communication links. In particular, a first instance of the group-addressed MPDU 520a is transmitted via the first communication link after transmission of the first instance of the group addressed MPDU 504a. Similarly, a second instance of the group-addressed MPDU 520b is transmitted via the second communication link after transmission of the second instance of the group addressed MPDU 504b. The first instance of the group-addressed MPDU 520a includes a MAC header 524a with a sequence number field set to a value x+1, and the second instance of the group-addressed MPDU 520b includes a MAC header 524b with a sequence number field set to the value x+1. In other words, the sequence number of the group-addressed MPDU 520, which is generally transmitted after transmission of the group-addressed MPDU 504, is incremented with respect to the sequence number of the group-addressed MPDU 504.

Figure 6:
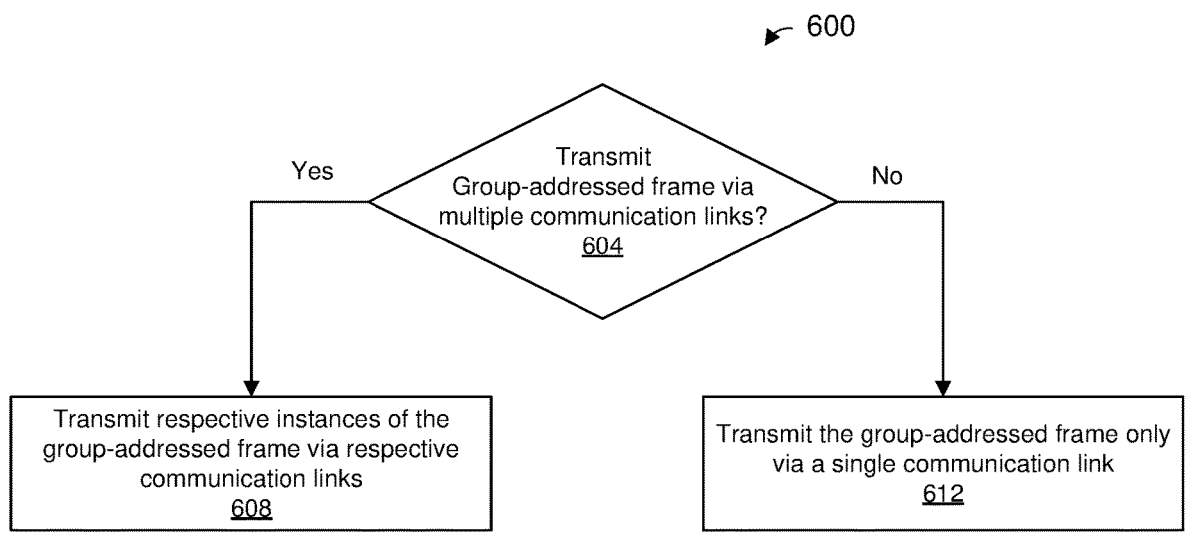
FIG. 6 is a flow diagram of an example method for transmitting a group-addressed frame in a wireless communication network that utilizes a plurality of communication links in respective frequency segments, according to an embodiment.

FIG. 6 is a flow diagram of an example method 600 for transmitting a group-addressed frame in a WLAN that utilizes a plurality of WLAN communication links in respective frequency segments, according to an embodiment. In some embodiments, the AP 114 and/or the client station 154 is configured to implement the method 600, and FIG. 6 is described with reference to FIG. 1 merely for explanatory purposes. In other embodiments, the method 600 is implemented by another suitable communication device.

At block 604, a first communication device determines (e.g., the network interface 122 determines, the MAC processor 126 determines, the communication link selection controller 140 determines, the network interface 162 determines, the MAC processor 166 determines, the communication link selection controller 190 determines, etc.) whether the group-addressed frame is to be transmitted via multiple WLAN communication links among the plurality of WLAN communication links, the group-addressed frame intended for a plurality of second communication devices in the WLAN.

In response to determining at block 604 that the group-addressed frame is to be transmitted via the multiple WLAN communication links, the flow proceeds to block 608. At block 608, the first communication device transmits (e.g., the network interface 122 transmits, the PHY processor 130 transmits, the network interface 162 transmits, the PHY processor 170 transmits, etc.) multiple instances of the group-addressed frame via respective WLAN communication links among the multiple WLAN communication links. In an embodiment, transmitting multiple instances of the group-addressed frame at block 608 includes: transmitting a first instance of the group-addressed frame via a first WLAN communication link among the plurality of WLAN communication links, and transmitting a second instance of the group-addressed frame via a second WLAN communication link among the plurality of WLAN communication links.

In some embodiments, each instance of the group-addressed frame transmitted at block 608 includes a sequence number field in a MAC header of the group-addressed frame, and the sequence number field in each instance of the group-addressed frame is set to a same value. In an embodiment, the method 600 further includes the first communication device generating (e.g., the network interface 122 generating, the MAC processor 126 generating, the network interface 162 generating, the MAC processor 166 generating, etc.) each instance of the group-addressed frame so that the sequence number field in the MAC header of each instance of the group-addressed frame is set to the same value. On the other hand, the respective sequence number fields of subsequent other respective group-addressed frames (as opposed to instances of a same group-addressed frame) are incremented so that different respective group-addressed frames have different sequence numbers, although if multiple instances of a same subsequent group-addressed frame are transmitted, the sequence number field in the multiple instance of the same subsequent group-addressed frame are set to another same value, according to an embodiment.

On the other hand, in response to determining at block 604 that the group-addressed frame is to be transmitted via only a single WLAN communication link, the flow proceeds to block 612. At block 612, the first communication device transmits (e.g., the network interface 122 transmits, the PHY processor 130 transmits, the network interface 162 transmits, the PHY processor 170 transmits, etc.) the group-addressed frame via only a single WLAN communication link among the multiple WLAN communication links.

Figure 7:
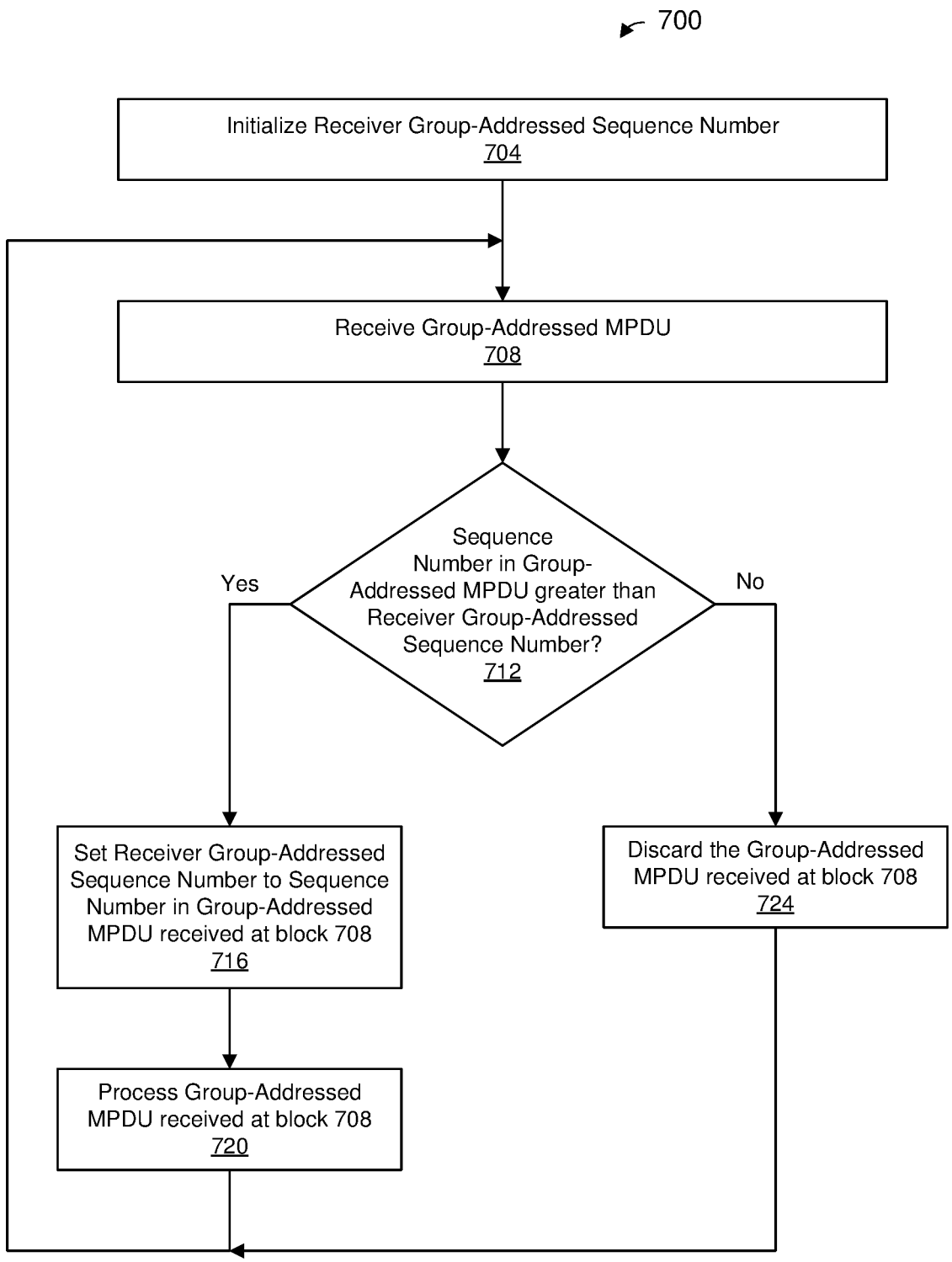
FIG. 7 is a flow diagram of an example method for processing, at a receiver device, group-addressed frames that were transmitted in a wireless communication network that utilizes a plurality of communication links in respective frequency segments, according to an embodiment.

FIG. 7 is a flow diagram of an example method 700 for processing, at a receiver device, group-addressed frames that were transmitted in a WLAN that utilizes a plurality of WLAN communication links in respective frequency segments, according to an embodiment. In some embodiments, the AP 114 and/or the client station 154 is configured to implement the method 700, and FIG. 7 is described with reference to FIG. 1 merely for explanatory purposes. In other embodiments, the method 700 is implemented by another suitable communication device.

At block 704, a communication device initializes (e.g., the network interface 162 initializes, the MAC processor 166 initializes, the network interface 122 initializes, the MAC processor 126 initializes, etc.) a receiver group-addressed sequence number that is maintained by the communication device. For example, the communication device maintains (e.g., the network interface 162 maintains, the MAC processor 166 maintains, the network interface 122 maintains, the MAC processor 126 maintains, etc.) a receiver group-addressed sequence number in a register, a memory location, etc., and the communication device initializes (e.g., the network interface 162 initializes, the MAC processor 166 initializes, the network interface 122 initializes, the MAC processor 126 initializes, etc.) the receiver group-addressed sequence number to zero or another suitable value, according to an embodiment.

At block 708, the communication device receives (e.g., the network interface 162 receives, the PHY processor 170 receives, the MAC processor 166 receives, the network interface 122 receives, the PHY processor 130 receives, the MAC processor 126 receives, etc.) a group-addressed frame transmitted via one of the multiple WLAN communication links, the group-addressed frame intended for multiple communication devices in the WLAN.

At block 712, the communication device determines (e.g., the network interface 162 determines, the MAC processor 166 determines, the network interface 122 determines, the MAC processor 126 determines, etc.) whether a sequence number in the group-addressed frame received at block 708 is greater than the receiver group-addressed sequence number maintained by the communication device.

In response to determining at block 712 that the sequence number in the group-addressed frame received at block 708 is greater than the receiver group-addressed sequence number, the flow proceeds to block 716. At block 716, the communication device sets (e.g., the network interface 162 sets, the MAC processor 166 sets, the network interface 122 sets, the MAC processor 126 sets, etc.) the receiver group-addressed sequence number to the sequence number in the group-addressed frame received at block 708.

At block 720, the communication device processes (e.g., the network interface 162 processes, the MAC processor 166 processes, the network interface 122 processes, the MAC processor 126 processes, etc.) group-addressed frame received at block 708, and the flow returns to block 708 to receive another group-addressed frame.

On the other hand, in response to determining at block 712 that the sequence number in the group-addressed frame received at block 708 is not greater than (e.g., is less than or equal to) the receiver group-addressed sequence number, the flow proceeds to block 724. At block 724, the communication device discards (e.g., the network interface 162 discards, the MAC processor 166 discards, the network interface 122 discards, the MAC processor 126 discards, etc.) the group-addressed frame received at block 708. For example, because the sequence number in the group-addressed frame received at block 708 is not greater than (e.g., is less than or equal to) the receiver group-addressed sequence number, this indicates that the group-addressed frame received at block 708 is an additional instance of a same group-addressed frame that was received via another communication link and has been, or will be, processed by the communication device, and thus the additional instance of the group-addressed frame received at block 708 can be discarded. In connection with discarding the group-addressed frame at block 724, the flow returns to block 708 to receive another group-addressed frame.

Referring again to FIGS. 1, 2A-B, and 3, a communication device such as the AP 114, the client station 154-1, and the network interface device 300 is configured to independently control respective statuses of the communication device with respect to multiple communication links corresponding to respective frequency segments, according to some embodiments. For example, the communication link may be in an ON state or an OFF state with respect to each communication link, according to an embodiment. For ease of explanation, the state of a communication device in the ON state with respect to a communication link is sometimes referred to herein as the "communication link in the ON state," and the state of the communication device in the OFF state with respect to the communication link is sometimes referred to herein as the "communication link in the OFF state".

When a communication link is in the OFF state, the communication device does not transmit and does not receive via the communication link. Thus, in some embodiments and/or scenarios, the communication device optionally puts at least some hardware components corresponding to the communication link in a low power mode to conserve power. For example, with the network interface device 300 (FIG. 3), when the first communication link is in the OFF state, the power save controller 142/192 controls the network interface device 300 to put one or both of i) the first RF radio 328a and ii) the first baseband processor 320a in a low power mode. In some embodiments, when the first communication link is in the OFF state, the power save controller 142/192 controls the network interface device 300 to put the PHY processor 308a in a low power mode. In some embodiments, when the first communication link is in the OFF state, the power save controller 142/192 additionally or alternatively controls the network interface device 300 to put the LS MAC 316a in a low power mode.

Similarly, when the second communication link is in the OFF state, the power save controller 142/192 controls the network interface device 300 to put one or both of i) the second RF radio 328b and ii) the second baseband processor 320b in a low power mode. In some embodiments, when the second communication link is in the OFF state, the power save controller 142/192 controls the network interface device 300 to put the PHY processor 308b in a low power mode. In some embodiments, when the second communication link is in the OFF state, the power save controller 142/192 additionally or alternatively controls the network interface device 300 to put the LS MAC 316b in a low power mode.

In some embodiments that utilize a negotiated link such as described above, the communication device is required to keep the negotiated link in the ON state, and is permitted to selectively transition any other communication links to the OFF state.

A communication device announces a state of a communication link, according to some embodiments. For example, during an association procedure in which a client station becomes associated with an AP (e.g., the client station joins a WLAN managed by the AP), the client station generates and transmits a frame that includes an indication (e.g., included in an information element (IE) of a suitable frame such as an association request frame, a reassociation request frame, a probe request frame, etc., included in a MAC header (e.g., within a control field or another suitable field) of a suitable frame, etc.) of whether a particular communication link is in the ON state or is in the OFF state, according to an embodiment. As another example, while a client station is associated with the AP, the client station generates and transmits a frame (e.g., an acknowledgement frame, an action frame, a quality of service (QoS) null frame, or another suitable frame) that includes an indication (e.g., included in a MAC header (e.g., within a control field or another suitable field)) of whether a particular communication link is in the ON state or is in the OFF state, according to an embodiment.

In some embodiments, if the particular communication link transitions to the OFF state, the client station transmits the frame that includes the indication in another communication link that is in the ON state (e.g., the negotiated link or another suitable communication link), according to an embodiment. In some embodiments, if the particular communication link transitions to the ON state, the client station transmits the frame that includes the indication in the same communication link or in another communication link that is in the ON state (e.g., the negotiated link or another suitable communication link), according to an embodiment.

A first communication device requests that a second communication change a state of a communication link, according to some embodiments. For example, an AP generates and transmits a frame (e.g., an acknowledgement frame, an action frame, a QoS null frame, an association response frame, a reassociation response frame, a probe response frame, or another suitable frame) to a client station, the frame including a request to set a particular communication link is in the ON state or in the OFF state, according to an embodiment. In some embodiments, if the particular communication link is in the OFF state, the AP transmits the frame that includes the request in another communication link that is in the ON state (e.g., the negotiated link or another suitable communication link), according to an embodiment. In some embodiments, if the particular communication link is in the ON state, the AP transmits the frame that includes the request in the same communication link or in another communication link that is in the ON state (e.g., the negotiated link or another suitable communication link), according to an embodiment.

In an embodiment, when a communication link is in the ON state, the communication device can operate in an active mode or in a power save mode with respect to the communication link. In the active mode, hardware components of the communication device that correspond to the communication link are powered and ready to transmit and receive via the communication link at all times while in the active mode, according to an embodiment.

In the power save mode, the communication device switches among a plurality of states including a doze state and an awake state, with respect to a communication link. In the doze state, the communication device does not transmit and other communication devices assume that the communication device cannot receive via the communication link, according to an embodiment. In some embodiments and/or scenarios, when the communication device is in the doze state in connection with a communication link, at least some hardware components of the communication device that correspond to the communication link may be put in a low power mode. On the other hand, in the awake state, hardware components of the communication device that correspond to the communication link are powered and ready to transmit and receive via the communication link.

In some embodiments, the communication device is configured to permit different power-save related modes (e.g., active or power save) with respect to different communication links and to independently switch among different power-save related modes (e.g., active or power save) in connection with different communication links. Similarly, in some embodiments, the communication device is configured to transition between different power-save related states (e.g., awake or doze) with respect to a first communication link independently of the power-save related mode(s) and/or the power-save related state(s) of any other communication links. As an example, while the communication device is in a doze state with respect to a first communication link and unable to transmit/receive via the first communication link, the communication device can be in an active mode or awake state with respect to one or more second communication links and thus able to transmit/receive via the one or more second communication links, according to some embodiments.

A communication device announces a change in a mode of the communication device with respect to a communication link, according to some embodiments. For example, when a client station enters (or will shortly enter) the power save mode with respect to a communication link, the client station generates and transmits a frame (e.g., an acknowledgement frame, an action frame, a QoS null frame, or another suitable frame) that includes an indication (e.g., included in a MAC header (e.g., within a control field or another suitable field), included a MAC frame body, etc.) that the client station is entering the power save mode with respect to the communication link, according to an embodiment. As another example, when the client station enters (or will enter) the active mode with respect to a communication link, the client station generates and transmits a frame (e.g., an acknowledgement frame, an action frame, a QoS null frame, or another suitable frame) that includes an indication (e.g., included in a MAC header (e.g., within a control field or another suitable field), included a MAC frame body, etc.) that the client station is entering the active mode with respect to the communication link, according to an embodiment. In some embodiments, when the mode change corresponds to a specific communication link (as opposed to all communication links being used by the communication device), the frame discussed above includes an indication of the specific communication link. In some embodiments, when the mode change corresponds to all communication links being used by the communication device, the frame discussed above includes an indication that the mode change corresponds to all communication links being used by the communication device. In some embodiments the frame discussed above does not include an indication of which link(s) the mode change the corresponds to, and the communication device announces a mode change in connection with a specific link, the communication transmits the frame in the communication link to which the mode change corresponds.

In some embodiments, when the mode change corresponds to a specific communication link (as opposed to all communication links being used by the communication device), the communication device transmits the frame in the specific communication link. In other embodiments, when the mode change corresponds to a specific communication link (as opposed to all communication links being used by the communication device), the communication device transmits the frame in another communication link, where the frame includes an indication that the mode change corresponds to the specific communication link.

In some embodiments, when the mode change corresponds to a specific communication link as opposed to all communication links being used by the communication device), a frame such as discussed above (e.g., an acknowledgement frame, an action frame, a QoS null frame, or another suitable frame) includes an indication of whether any other communication link(s) being used by the communication device are in the awake mode.

In some embodiments, in response to switching a communication link to the ON state, the communication device is considered in the active mode with respect to the communication link. In some embodiments, in response to switching a communication link to the OFF state, the communication device is considered in the power save mode with respect to the communication link except that no transition to an awake state with respect to the communication link can occur and no traffic can be transmitted in the communication link.

Referring again to FIG. 6, a communication device that is to transmit a group-addressed frame decides via which communication links to transmit the group-addressed frame based on the power save-related modes/states of other communication devices that are to receive the group-addressed frame with respect to multiple communication links. For example, if the communication device determines (e.g., the network interface device 122 determines, the MAC processor 126 determines, the communication link selection controller 140 determines, the client power save controller 142 determines, the network interface device 162 determines, the MAC processor 166 determines, the communication link selection controller 190 determines, the power save controller 192 determines, the network interface device 300 determines, etc.) that all of the other communication devices that are to receive the group-addressed frame are in at least one of i) the active mode or ii) the wake state, with respect to a single WLAN communication link, the communication device determines (e.g., the network interface device 122 determines, the MAC processor 126 determines, the communication link selection controller 140 determines, the network interface device 162 determines, the MAC processor 166 determines, the communication link selection controller 190 determines, the network interface device 300 determines, etc.) to transmit the group-addressed frame via only the single communication link, according to an embodiment.

On the other hand, if the communication device determines (e.g., the network interface device 122 determines, the MAC processor 126 determines, the communication link selection controller 140 determines, the client power save controller 142 determines, the network interface device 162 determines, the MAC processor 166 determines, the communication link selection controller 190 determines, the power save controller 192 determines, the network interface device 300 determines, etc.) that all of the other communication devices that are to receive the group-addressed frame are not in at least one of i) the active mode or ii) the wake state, with respect to a single WLAN communication link, the communication device determines (e.g., the network interface device 122 determines, the MAC processor 126 determines, the communication link selection controller 140 determines, the network interface device 162 determines, the MAC processor 166 determines, the communication link selection controller 190 determines, the network interface device 300 determines, etc.) to transmit the group-addressed frame via multiple communication links.

Figure 8:
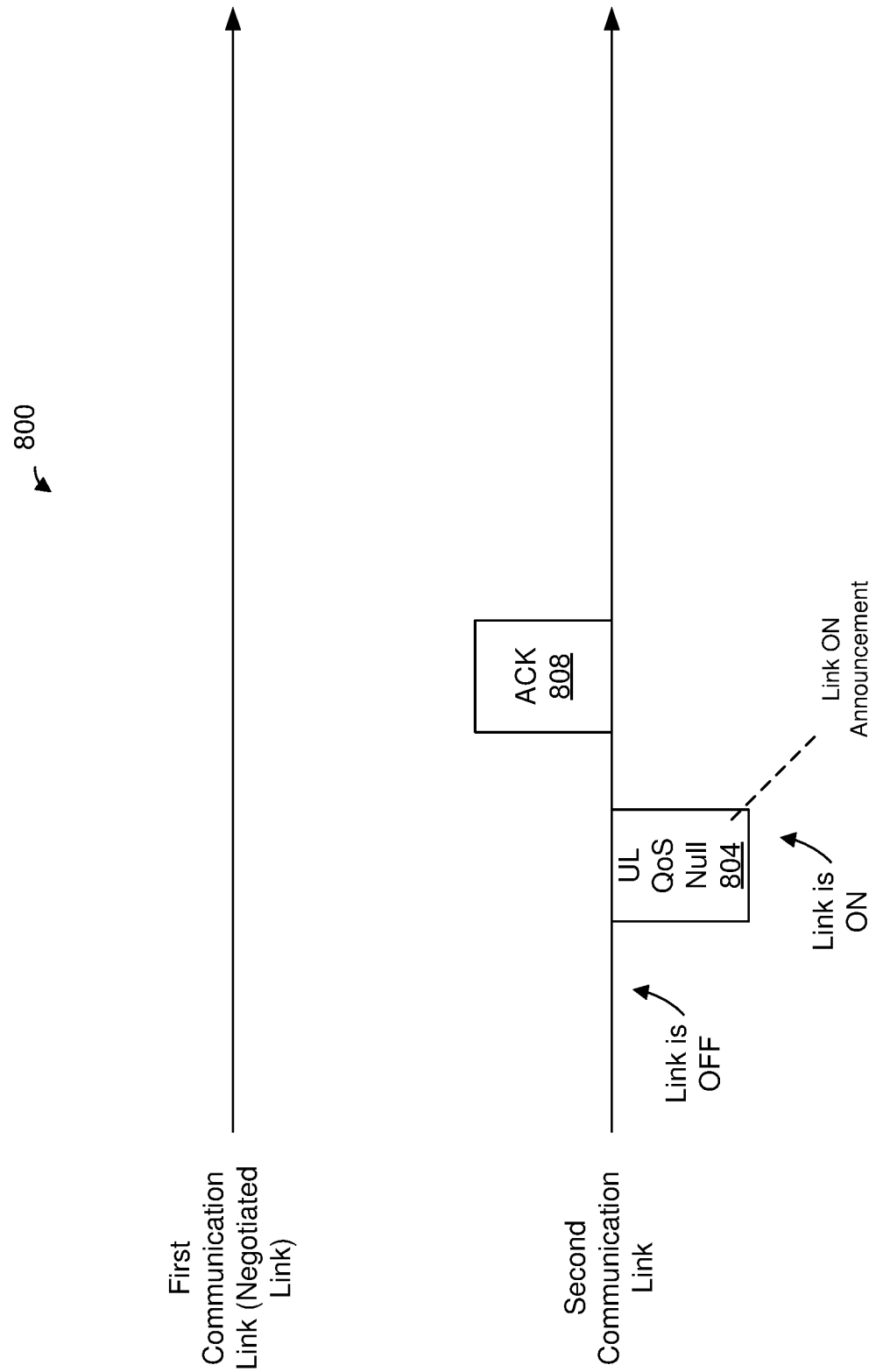
FIG. 8 is a diagram of an example communication exchange between an access point (AP) and a client station in a wireless communication network that utilizes a plurality of communication links in respective frequency segments, according to an embodiment.

FIG. 8 is a diagram of an example communication exchange 800 between an AP and a client station, according to an embodiment. Horizontal lines in FIG. 8 indicate different communication links corresponding to respective frequency segments. In particular, FIG. 8 illustrates a first communication link (e.g., a negotiated link) and a second communication link. A transmission by the client station on a particular communication link is illustrated below the corresponding horizontal line, and a transmission by the AP on a particular communication link is illustrated above the corresponding horizontal line. Additionally, time increases from left to right in FIG. 8.

In the scenario illustrated in FIG. 8, the second communication link is initially in the OFF state for the client station. The client station generates (e.g., the network interface 162 generates, the network interface 300 generates, the MAC processor 166 generates, the power save controller 192 generates, etc.) and transmits (e.g., the network interface 162 transmits, the network interface 300 transmits, the PHY processor 170 transmits, etc.) a frame (e.g., a QoS null frame, an action frame, or another suitable frame) 804 that corresponds to announcement that a communication link is in the ON state. In an embodiment, the frame 804 includes an indication of the second communication link to indicate that the second communication link is in the ON state. In another embodiment, the frame 804 does not include an indication of which communication link the announcement is for, but because the frame 804 is transmitted in the second communication link the AP assumes that the frame 804 is announcing that the second communication link is in the ON state.

Upon receiving the frame 804, the AP determines (e.g., the network interface 122 determines, the network interface 300 determines, the MAC processor 126 determines, the client power save controller 142 determines, etc.) that the second communication link is in the ON state for the client station. In an embodiment in which the frame 804 includes the indication of the second communication link to indicate that the second communication link is in the ON state, the AP uses (e.g., the network interface 122 uses, the network interface 300 uses, the MAC processor 126 uses, the client power save controller 142 uses, etc.) the indication of the second communication link to determine that the second communication link is in the ON state. In an embodiment in which the frame 804 does not include an indication of which communication link the announcement is for, the AP determines (e.g., the network interface 122 determines, the network interface 300 determines, the MAC processor 126 determines, the client power save controller 142 determines, etc.) that the announcement is for the second communication link in response to receiving the frame 804 via the second communication link.

In response to receiving the frame 804, the AP generates (e.g., the network interface 122 generates, the network interface 300 generates, the MAC processor 126 generates, etc.) and transmits (e.g., the network interface 122 transmits, the network interface 300 transmits, the PHY processor 130 transmits, etc.) an acknowledgment frame 808 to acknowledge receiving the frame 804, according to an embodiment.

In other embodiments, the frame 804 is transmitted in the first communication link.

Figure 9:
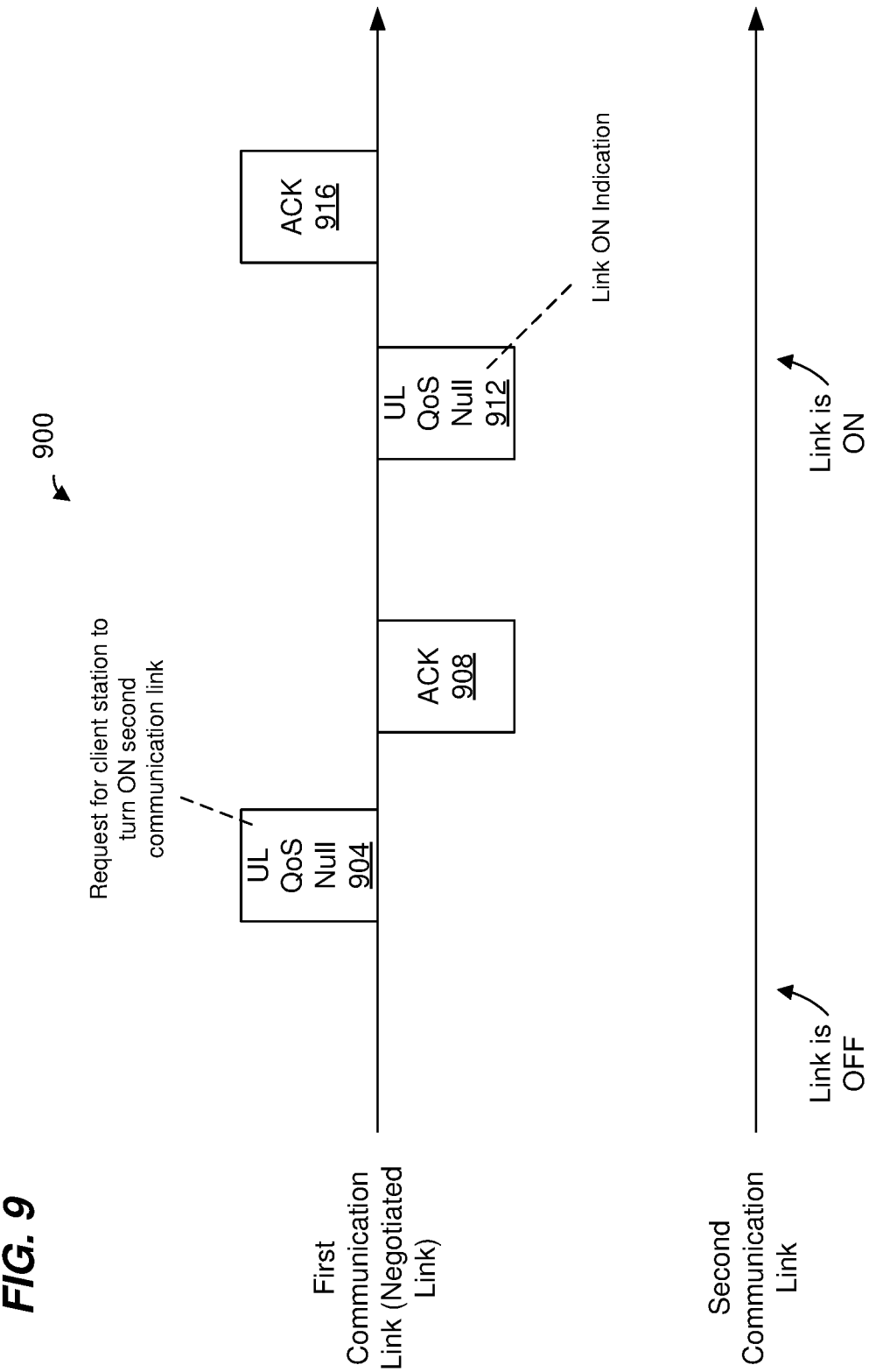
FIG. 9 is a diagram of another example communication exchange between an AP and a client station in a wireless communication network that utilizes a plurality of communication links in respective frequency segments, according to another embodiment.

FIG. 9 is a diagram of another example communication exchange 900 between an AP and a client station, according to another embodiment. Horizontal lines in FIG. 9 indicate different communication links corresponding to respective frequency segments. In particular, FIG. 9 illustrates a first communication link (e.g., a negotiated link) and a second communication link. A transmission by the client station on a particular communication link is illustrated below the corresponding horizontal line, and a transmission by the AP on a particular communication link is illustrated above the corresponding horizontal line. Additionally, time increases from left to right in FIG. 9.

In the scenario illustrated in FIG. 9, the second communication link is initially in the OFF state for the client station. The AP generates (e.g., the network interface 122 generates, the network interface 300 generates, the MAC processor 126 generates, the client power save controller 124 generates, etc.) and transmits (e.g., the network interface 122 transmits, the network interface 300 transmits, the PHY processor 130 transmits, etc.) a frame (e.g., a QoS null frame, an action frame, or another suitable frame) 904 that corresponds to request for the client station to transition the second communication link to the ON state. In an embodiment, the frame 904 includes an indication of the second communication link to indicate that the request correspond to the second communication link.

In response to receiving the frame 904, the client station generates (e.g., the network interface 162 generates, the network interface 300 generates, the MAC processor 166 generates, etc.) and transmits (e.g., the network interface 162 transmits, the network interface 300 transmits, the PHY processor 170 transmits, etc.) an acknowledgment frame 908 to acknowledge receiving the frame 904, according to an embodiment. Additionally in response to receiving the frame 904, the client station determines (e.g., the network interface 162 determines, the network interface 300 determines, the MAC processor 166 determines, the power save controller 192 determines, etc.) whether to transition the second communication link to the ON state in response to the frame 904.

In response to determining to transition the second communication link to the ON state, the client station transitions the second communication link to the ON state (e.g., the network interface 162 transitions the second communication link to the ON state, the network interface 300 transitions the second communication link to the ON state, the MAC processor 166 controls the network interface 162 to transition the second communication link to the ON state, the power save controller 192 controls the network interface 162 to transition the second communication link to the ON state, etc.). Additionally, in response to determining to transition the second communication link to the ON state, the client station generates (e.g., the network interface 162 generates, the network interface 300 generates, the MAC processor 166 generates, the power save controller 192 generates, etc.) and transmits (e.g., the network interface 162 transmits, the network interface 300 transmits, the PHY processor 170 transmits, etc.) a frame (e.g., a QoS null frame, an action frame, or another suitable frame) 912 that corresponds to announcement that a communication link is in the ON state. In an embodiment, the frame 912 includes an indication of the second communication link to indicate that the second communication link is in the ON state.

Upon receiving the frame 912, the AP determines (e.g., the network interface 122 determines, the network interface 300 determines, the MAC processor 126 determines, the client power save controller 142 determines, etc.) that the second communication link is in the ON state for the client station. In an embodiment in which the frame 912 includes the indication of the second communication link to indicate that the second communication link is in the ON state, the AP uses (e.g., the network interface 122 uses, the network interface 300 uses, the MAC processor 126 uses, the client power save controller 142 uses, etc.) the indication of the second communication link to determine that the second communication link is in the ON state.

In response to receiving the frame 912, the AP generates (e.g., the network interface 122 generates, the network interface 300 generates, the MAC processor 126 generates, etc.) and transmits (e.g., the network interface 122 transmits, the network interface 300 transmits, the PHY processor 130 transmits, etc.) an acknowledgment frame 916 to acknowledge receiving the frame 804, according to an embodiment.

In other embodiments, the frame 912 is transmitted in the second communication link similar to the frame 804 in FIG. 8.

Figure 10:
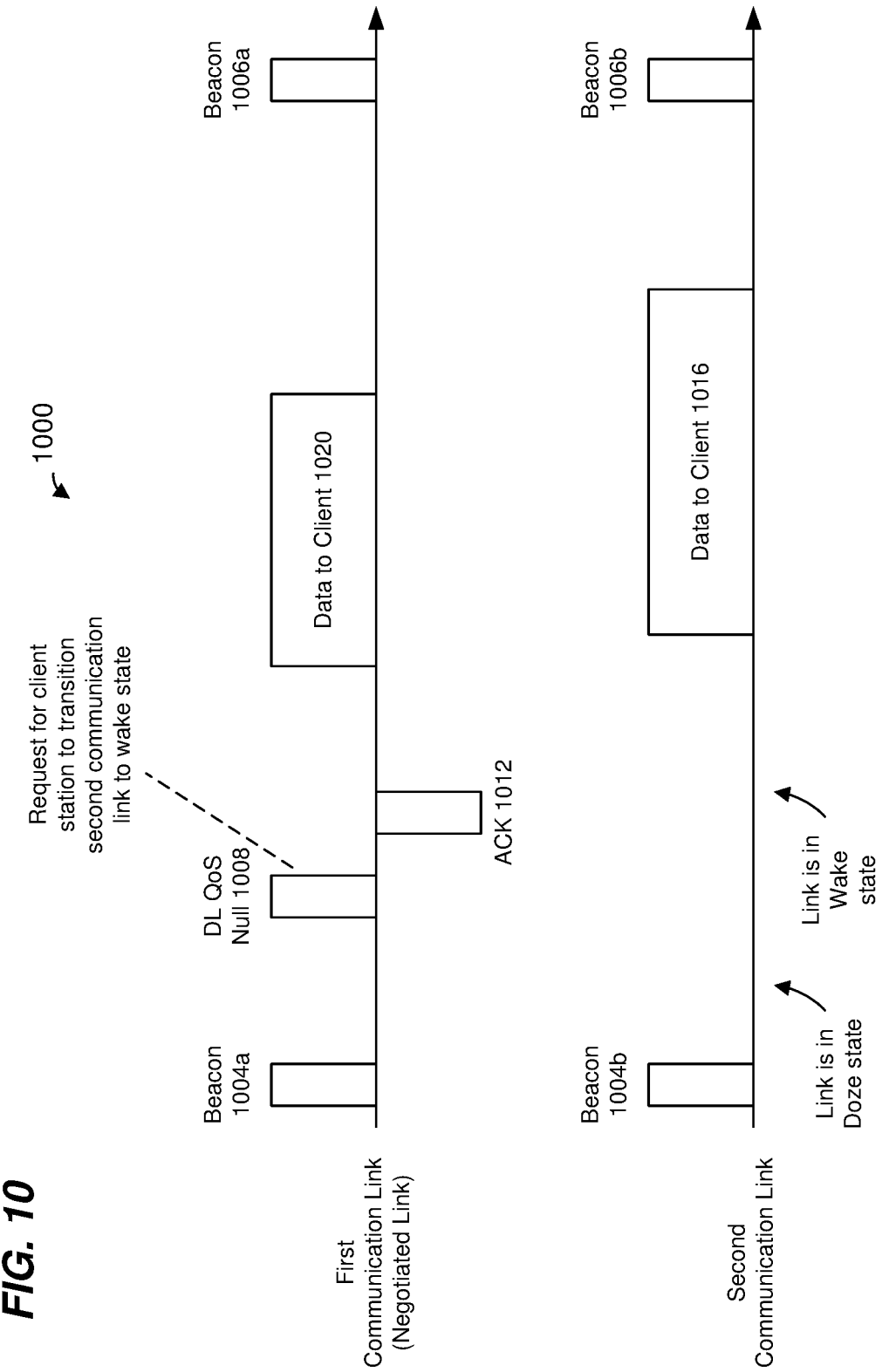
FIG. 10 is a diagram of another example communication exchange between an AP and a client station in a wireless communication network that utilizes a plurality of communication links in respective frequency segments, according to another embodiment.

FIG. 10 is a diagram of another example communication exchange 1000 between an AP and a client station, according to another embodiment. Horizontal lines in FIG. 10 indicate different communication links corresponding to respective frequency segments. In particular, FIG. 10 illustrates a first communication link (e.g., a negotiated link) and a second communication link. A transmission by the client station on a particular communication link is illustrated below the corresponding horizontal line, and a transmission by the AP on a particular communication link is illustrated above the corresponding horizontal line. Additionally, time increases from left to right in FIG. 10.

In the scenario illustrated in FIG. 10, the second communication link is in the power save mode and is initially in the doze state for the client station. The AP generates (e.g., the network interface 122 generates, the network interface 300 generates, the MAC processor 126 generates, the client power save controller 124 generates, etc.) and transmits (e.g., the network interface 122 transmits, the network interface 300 transmits, the PHY processor 130 transmits, etc.) a beacon frame 1004. In an embodiment, a first instance of the beacon frame 1004a is transmitted via the first communication link and a second instance of the beacon frame 1004b is transmitted via the second communication link.

Prior to transmitting a next beacon frame 1006 (i.e., prior to a next the target beacon transmission time (TBTT)), the AP determines (e.g., the network interface 122 determines, the network interface 300 determines, the MAC processor 126 determines, the client power save controller 124 determines, etc.) that the client station should transition to the wake state in connection with the second communication link. As an example, the AP determines (e.g., the network interface 122 determines, the network interface 300 determines, the MAC processor 126 determines, the client power save controller 124 determines, etc.) that the client station should transition to the wake state in connection with the second communication link because the AP determines (e.g., the network interface 122 determines, the network interface 300 determines, the MAC processor 126 determines, the client power save controller 124 determines, etc.) that there is a high traffic load on the first communication link, there is high traffic load for traffic to the client station, etc.

In response to determining that the client station should transition to the wake state in connection with the second communication link, the AP generates (e.g., the network interface 122 generates, the network interface 300 generates, the MAC processor 126 generates, the client power save controller 124 generates, etc.) and transmits (e.g., the network interface 122 transmits, the network interface 300 transmits, the PHY processor 130 transmits, etc.) a frame 1008 (e.g., a QoS null frame, an action frame, or another suitable frame) that corresponds to request for the client station to transition to the wake state in connection with the second communication link. In an embodiment, the frame 1008 includes an indication of the second communication link to indicate that the request corresponds to the second communication link.

In response to receiving the frame 1008, the client station generates (e.g., the network interface 162 generates, the network interface 300 generates, the MAC processor 166 generates, etc.) and transmits (e.g., the network interface 162 transmits, the network interface 300 transmits, the PHY processor 170 transmits, etc.) an acknowledgment frame 1012 to acknowledge receiving the frame 1008, according to an embodiment. Additionally in response to receiving the frame 1008, the client station determines (e.g., the network interface 162 determines, the network interface 300 determines, the MAC processor 166 determines, the power save controller 192 determines, etc.) whether to transition to the wake state in connection with the second communication link in response to the frame 1008.

In response to determining to transition to the wake state in connection with the second communication link, the client station transitions to the wake state in connection with the second communication link (e.g., the network interface 162 transitions to the wake state in connection with the second communication link, the network interface 300 transitions to the wake state in connection with the second communication link, the MAC processor 166 controls the network interface 162 to transitions to the wake state in connection with the second communication link, the power save controller 192 controls the network interface 162 to transitions to the wake state in connection with the second communication link, etc.).

Additionally, in response to determining to transition to the wake state in connection with the second communication link, the client station generates (e.g., the network interface 162 generates, the network interface 300 generates, the MAC processor 166 generates, the power save controller 192 generates, etc.) and transmits (e.g., the network interface 162 transmits, the network interface 300 transmits, the PHY processor 170 transmits, etc.) a frame (e.g., a QoS null frame, an action frame, or another suitable frame) (not shown in FIG. 10) that corresponds to announcement that the client station has transitioned to the wake state in connection with the second communication link, according to some embodiments. In an embodiment, the frame (that announces that the client station has transitioned to the wake state in connection with the second communication link) includes an indication of the second communication link to indicate that the second communication link is in the wake state. In one embodiment, the client station transmits the frame (that announces that the client station has transitioned to the wake state in connection with the second communication link) in the first communication link. In another embodiment, the client station transmits the frame (that announces that the client station has transitioned to the wake state in connection with the second communication link) in the second communication link.

In another embodiment, the client station determines (e.g., the network interface 162 determines, the network interface 300 determines, the MAC processor 166 determines, the power save controller 192 determines, etc.) a future time at which to transition to the wake state in connection with the second communication link in response to the frame 1008, and transitioning to the wake state occurs at the determined future time. In such embodiments, the client station generates (e.g., the network interface 162 generates, the network interface 300 generates, the MAC processor 166 generates, the power save controller 192 generates, etc.) and transmits (e.g., the network interface 162 transmits, the network interface 300 transmits, the PHY processor 170 transmits, etc.) a frame (e.g., a QoS null frame, an action frame, or another suitable frame) (not shown in FIG. 10) that corresponds to announcement that the client station will transition to the wake state in connection with the second communication link at a future time, and that indicates the future time, according to some embodiments. In an embodiment, the frame (that announces that the client station will transition to the wake state in connection with the second communication link at a future time) includes an indication of the second communication link to indicate that the second communication link will transition to the wake state. In one embodiment, the client station transmits the frame (that announces that the client station will transitioned to the wake state in connection with the second communication link at a future time) in the first communication link. In another embodiment, the client station transmits the frame (that announces that the client station will transition to the wake state in connection with the second communication link at a future time) in the second communication link.

Upon determining that the client station is in the wake state in connection with the second communication link, the AP transmits (e.g., the network interface 122 transmits, the network interface 300 transmits, the PHY processor 130 transmits, etc.) one or more data packets 1016 to the client station via the second communication link. In some embodiments, the AP also transmits (e.g., the network interface 122 transmits, the network interface 300 transmits, the PHY processor 130 transmits, etc.) one or more data packets 1020 to the client station via the first communication link.

Figure 11:
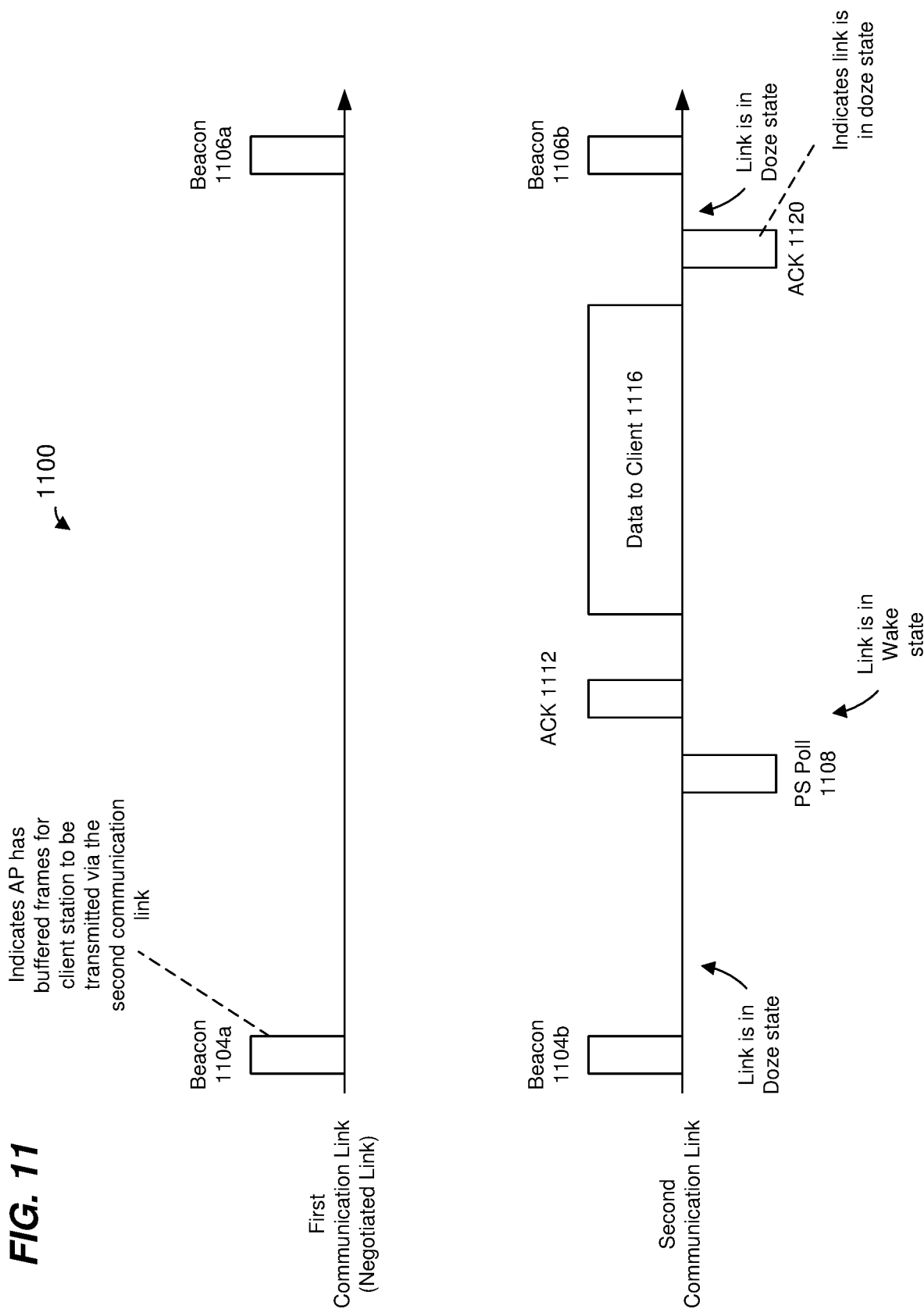
FIG. 11 is a diagram of another example communication exchange between an AP and a client station in a wireless communication network that utilizes a plurality of communication links in respective frequency segments, according to another embodiment.

FIG. 11 is a diagram of another example communication exchange 1100 between an AP and a client station, according to another embodiment. Horizontal lines in FIG. 11 indicate different communication links corresponding to respective frequency segments. In particular, FIG. 11 illustrates a first communication link (e.g., a negotiated link) and a second communication link. A transmission by the client station on a particular communication link is illustrated below the corresponding horizontal line, and a transmission by the AP on a particular communication link is illustrated above the corresponding horizontal line. Additionally, time increases from left to right in FIG. 11.

In the scenario illustrated in FIG. 11, the second communication link is in the power save mode and is initially in the doze state for the client station. The AP generates (e.g., the network interface 122 generates, the network interface 300 generates, the MAC processor 126 generates, the client power save controller 124 generates, etc.) and transmits (e.g., the network interface 122 transmits, the network interface 300 transmits, the PHY processor 130 transmits, etc.) a beacon frame 1104. In an embodiment, a first instance of the beacon frame 1104*a* is transmitted via the first communication link and a second instance of the beacon frame 1104*b* is transmitted via the second communication link.

The beacon frame 1104 includes information (e.g., within a traffic indication map (TIM)) that the AP has frames buffered for the client station, the buffered frames to be transmitted to the client station via the second communication link. The client station receives the beacon frame 1104*a* via the first communication link and determines (e.g., the network interface 162 determines, the network interface 300 determines, the MAC processor 166 determines, the power save controller 192 determines, etc.) that the AP has frames buffered for the client station, the buffered frames to be transmitted to the client station via the second communication link.

Prior to the AP transmitting a next beacon frame 1106 (i.e., prior to a next the TBTT), and in response to determining that the AP has frames buffered for the client station, the buffered frames to be transmitted to the client station via the second communication link, the client station transitions to the wake state in connection with the second communication link (e.g., the network interface 162 transitions to the wake state in connection with the second communication link, the network interface 300 transitions to the wake state in connection with the second communication link, the MAC processor 166 controls the network interface 162 to transitions to the wake state in connection with the second communication link, the power save controller 192 controls the network interface 162 to transitions to the wake state in connection with the second communication link, etc.). Additionally, in response to determining that the AP has frames buffered for the client station, the buffered frames to be transmitted to the client station via the second communication link, the client station generates (e.g., the network interface 162 generates, the network interface 300 generates, the MAC processor 166 generates, the power save controller 192 generates, etc.) and transmits (e.g., the network interface 162 transmits, the network interface 300 transmits, the PHY processor 170 transmits, etc.) a frame 1108 (e.g., a power save (PS) poll frame, a QoS null frame, an action frame, or another suitable frame) that indicates that the client station has transitioned to the wake state in connection with the second communication link, according to some embodiments. In an embodiment, the frame 1108 includes an indication of the second communication link to indicate that the second communication link is in the wake state. In one embodiment, the client station transmits the frame 1108 in the first communication link. In another embodiment, the client station transmits the frame 1108 in the second communication link.

In response to receiving the frame 1108, the AP generates (e.g., the network interface 122 generates, the network interface 300 generates, the MAC processor 126 generates, etc.) and transmits (e.g., the network interface 122 transmits, the network interface 300 transmits, the PHY processor 130 transmits, etc.) an acknowledgment frame 1112 to acknowledge receiving the frame 1108, according to an embodiment.

Upon determining that the client station is in the wake state in connection with the second communication link, the AP transmits (e.g., the network interface 122 transmits, the network interface 300 transmits, the PHY processor 130 transmits, etc.) one or more data packets 1116 to the client station via the second communication link.

In response to receiving the packet 1116, the client station generates (e.g., the network interface 162 generates, the network interface 300 generates, the MAC processor 166 generates, etc.) and transmits (e.g., the network interface 162 transmits, the network interface 300 transmits, the PHY processor 170 transmits, etc.) an acknowledgment frame 1120 to acknowledge receiving the packet 1116, according to an embodiment.

In some embodiments, the acknowledgment frame 1120 is generated to include an indication (e.g., in a MAC header of the acknowledgment frame 1120, in a control field within the MAC header, etc.) that the second communication device has transitioned to the doze state in connection with the second communication link. In some embodiments, the acknowledgment frame 1120 does not include an indication that the transition to the doze state is in connection with the second communication link, but rather the AP assumes that the transition to the doze state is in connection with the second communication link because the indication of the transition to the doze state was transmitted in the second communication link. In other embodiments, the acknowledgment frame 1120 includes (e.g., in a MAC header of the acknowledgment frame 1120, in a control field within the MAC header, etc.) an explicit indication that the transition to the doze state is in connection with the second communication link.

Figure 12:
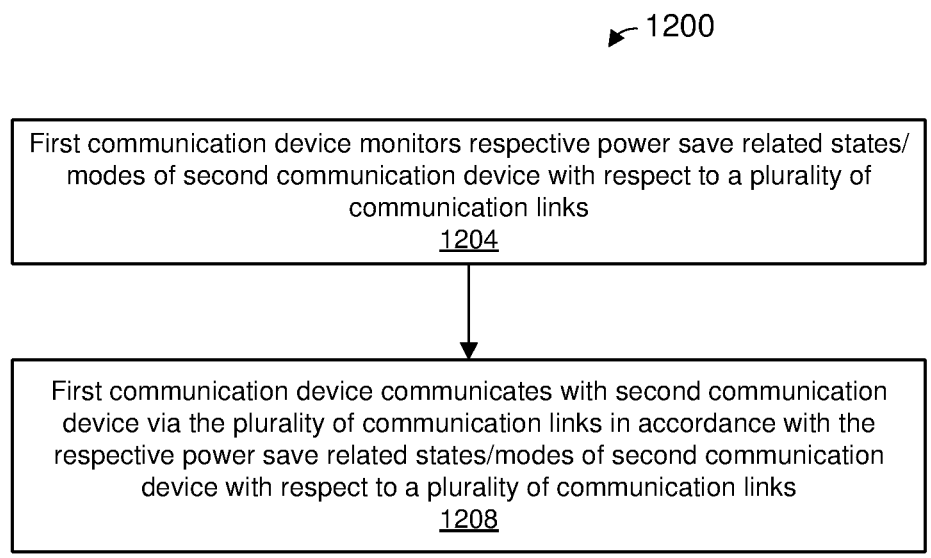
FIG. 12 is a flow diagram of an example method for communicating via multiple communication links corresponding to respective frequency segments, according to an embodiment.

FIG. 12 is a flow diagram of an example method 1200 for communicating via multiple communication links corresponding to respective frequency segments, according to an embodiment. In some embodiments, the AP 114 (FIG. 1), the client station 154 (FIG. 1), and/or the network interface device 300 (FIG. 3) is configured to implement the method 1200, and FIG. 12 is described with reference to FIGS. 1 and 3 merely for explanatory purposes. In other embodiments, the method 1200 is implemented by another suitable communication device.

In various embodiments, the method 1200 is implemented in combination with one or more of (or none of) the method 400 of FIG. 4, the techniques described with reference to FIG. 5, the method 600 of FIG. 6, the techniques described with reference to FIG. 8, the techniques described with reference to FIG. 9, the techniques described with reference to FIG. 10, and/or the techniques described with reference to FIG. 11.

At block 1204, a first communication device monitors (e.g., the network interface 122 monitors, the MAC processor 126 monitors, the client power save controller 142 monitors, the network interface 162 monitors, the MAC processor 166 monitors, the power save controller 192 monitors, the network interface 300 monitors, etc.) respective power save-related states and/or modes of a second communication device with respect to a plurality of communication links corresponding to respective frequency segments. Monitoring power save-related states and/or modes at block 1204 includes determining respective current power save-related states and/or modes corresponding to respective communication links, in some embodiments. Monitoring power save-related states and/or modes at block 1204 additionally or alternatively includes determining one or more respective future times at which one or more current power save-related states and/or modes (corresponding to respective communication links) will change, in some embodiments. Monitoring power save-related states and/or modes at block 1204 includes one or both of i) recording, in a memory device (e.g., one or more registers, a register file, a random access memory (RAM), a Flash memory, a solid state memory, etc.), respective indications of respective current power save-related states and/or modes corresponding to respective communication links, and ii) recording, in the memory device, one or more respective indications of one or more respective future times at which one or more current power save-related states and/or modes (corresponding to respective communication links) will change, in some embodiments.

Determining respective power save-related states and/or modes corresponding to respective communication links at block 1204 comprises receiving indications from the second communication device of current power save-related states and/or modes of the second communication device corresponding to respective communication links, according to some embodiments. For example, the first communication device receives indications such as described above (e.g., with reference to FIGS. 8-11) or other suitable indications.

Determining respective power save-related states and/or modes corresponding to respective communication links at block 1204 additionally or alternatively comprises receiving indications from the second communication device of future times at which one or more current power save-related states and/or modes (corresponding to respective communication links) will change, according to some embodiments. For example, the first communication device receives indications such as described above (e.g., with reference to FIGS. 8-11) or other suitable indications.

At block 1208, the first communication device communicates (e.g., the network interface 122 communicates, the network interface 162 communicates, the network interface 300 communicates, etc.) with the second communication device via the plurality of communication links in accordance with the respective power save-related states and/or modes of the second communication device determined at block 1204. In some embodiments, communicating via the plurality of communication links at block 1208 comprises transmitting to the second communication device via one or more communication links that the first communication device determines are in an ON state (with respect to the second communication device) and determining to not transmit to the second communication device via one or more communication links that the first communication device determines are in an OFF state (with respect to the second communication device). In some embodiments, communicating via the plurality of communication links at block 1208 additionally or alternatively comprises transmitting to the second communication device via one or more communication links that the first communication device determines are in a wake state (with respect to the second communication device) and determining to not transmit to the second communication device via one or more communication links that the first communication device determines are in a doze state (with respect to the second communication device).

In some embodiments, a client station negotiates a schedule for transitioning between the wake state and the doze state in connection with a communication link. The schedule is sometimes referred to herein as a "target wake time schedule", "TWT schedule", or "TWT agreement". For a particular client station, the TWT schedule includes a designated time period (sometimes referred to as a "TWT service period" or "TWT SP") at which the client station typically transitions to the wake state (if not already in the wake state) and remains in the wake state for a duration of the TWT SP. In some scenarios, the client station returns to the doze state at an end of the TWT SP. The use of TWT schedules by an AP is useful for minimizing contention between client stations in a WLAN and/or reducing power consumption by client stations, at least in some embodiments.

Negotiation of a TWT schedule includes negotiating one or more TWT schedule parameters such as one or more of i) a start time of a TWT SP, ii) a time period between TWT SPs, and iii) a duration of each TWT SP, according to some embodiments. Negotiating the one or more TWT schedule parameters comprises communication devices exchanges one or more packets regarding the one or more TWT schedule parameters, according to some embodiments.

A first communication device negotiates (with a second communication device) a TWT schedule for a particular communication link among a plurality of communication links corresponding to respective frequency segments. In some embodiments, the TWT schedule for the particular communication link is negotiated independently of one or more other TWT schedules (if any) for any other communication links among the plurality of communication link. For example, in some embodiments, the first communication device negotiates (with the second communication device) the TWT schedule for the particular communication link when no other TWT schedules exist and/or are being negotiated (with the second communication device) with any other communication links that are being used with the second communication device. As another example, in some embodiments, when another TWT schedule exists for another communication link, the first communication device negotiates (with the second communication device) one or more parameters of the TWT schedule for the particular communication link that are different than corresponding parameters of the other TWT schedule for the other communication link.

In other embodiments, one or more of the parameters of the TWT schedules of multiple communication links are not negotiated independently. For example, one or more of the parameters of a TWT schedule that are negotiated apply to all communication links being used by a communication device. As an illustrative embodiment, a first communication devices negotiates with a second communication device regarding a same TWT schedule for all communication links being used by the first communication device, e.g., i) a start time of a TWT SP, ii) a time period between TWT SPs, and iii) a duration of each TWT SP, are the same for all communication links.

As another example, a first set of parameters of a TWT schedule that are negotiated apply to all communication links being used by a communication device, whereas a second set of parameters of the TWT schedule that are negotiated apply to less than all of the communication links being used by the communication device. As an illustrative embodiment, a first communication devices negotiates with a second communication device regarding i) a start time of a TWT SP, and ii) a time period between TWT SPs, that are the same for all communication links, and the first communication devices negotiates with the second communication device regarding different respective time durations of TWT SPs for respective communication links.

A teardown of a TWT schedule involves permanently ending an agreed TWT schedule, according to an embodiment. Tearing down a TWT schedule comprises communication devices exchanging one or more packets to end the TWT schedule, according to some embodiments.

A first communication device tears down a TWT schedule for a particular communication link among a plurality of communication links corresponding to respective frequency segments. In some embodiments, the tearing down of the TWT schedule for the particular communication link is performed independently of one or more other TWT schedules (if any) for any other communication links among the plurality of communication links. For example, in some embodiments, the first communication device tears down the TWT schedule for the particular communication link when no other TWT schedules exist with any other communication links that are being used with the second communication device. As another example, in some embodiments, when another TWT schedule exists for another communication link, the first communication device tears down the TWT schedule for the particular communication link without tearing down the other TWT schedule for the other communication link, e.g., the other TWT schedule for the other communication link remains active after the TWT schedule for the particular communication link has been torn down.

In other embodiments, the tearing down of a TWT schedule for a particular communication link is not performed independently of one or more other TWT schedules for other communication links among the plurality of communication links. As an illustrative example, the first communication device tears down the TWT schedule for all communication links at a same time. As another illustrative example, the first communication device tears down the TWT schedule for a first set of multiple communication links at a same time, without tearing down one or more other TWT schedules for a second set of communication links.

A suspension of a TWT schedule involves suspending an agreed TWT schedule for a defined period of time, according to an embodiment. Suspending a TWT schedule comprises communication devices exchanging one or more packets to suspend the TWT schedule, according to some embodiments.

A first communication device suspends a TWT schedule for a particular communication link among a plurality of communication links corresponding to respective frequency segments. In some embodiments, the suspension of the TWT schedule for the particular communication link is performed independently of one or more other TWT schedules (if any) for any other communication links among the plurality of communication link. For example, in some embodiments, the first communication device suspends the TWT schedule for the particular communication link when no other TWT schedules exist with any other communication links that are being used with the second communication device. As another example, in some embodiments, when another TWT schedule exists for another communication link, the first communication device suspends the TWT schedule for the particular communication link without suspending the other TWT schedule for the other communication link, e.g., the other TWT schedule for the other communication remains active while the TWT schedule for the particular communication link is suspended.

In other embodiments, the suspension of a TWT schedule for a particular communication link is not performed independently of one or more other TWT schedules for other communication links among the plurality of communication links. As an illustrative example, the first communication device suspends the TWT schedule for all communication links at a same time. As another illustrative example, the first communication device suspends down the TWT schedule for a first set of multiple communication links at a same time, without suspending one or more other TWT schedules for a second set of communication links.

A resumption of a TWT schedule involves resuming a TWT schedule that was suspended, according to an embodiment. Resuming a TWT schedule comprises communication devices exchanging one or more packets to resume the TWT schedule, according to some embodiments.

A first communication device resumes a TWT schedule for a particular communication link among a plurality of communication links corresponding to respective frequency segments. In some embodiments, the resumption of the TWT schedule for the particular communication link is performed independently of one or more other TWT schedules (if any) for any other communication links among the plurality of communication link. For example, in some embodiments, the first communication device resumes the TWT schedule for the particular communication link when no other TWT schedules exist with any other communication links that are being used with the second communication device. As another example, in some embodiments, when another TWT schedule exists for another communication link and is suspended, the first communication device resumes the TWT schedule for the particular communication link without resuming the other TWT schedule for the other communication link, e.g., the other TWT schedule for the other communication remains suspended while the TWT schedule for the particular communication link is resumed.

In other embodiments, the resumption of a TWT schedule for a particular communication link is not performed independently of one or more other TWT schedules for other communication links among the plurality of communication links. As an illustrative example, the first communication device resumes the TWT schedule for all communication links at a same time. As another illustrative example, the first communication device resumes the TWT schedule for a first set of multiple communication links at a same time, without resuming one or more other TWT schedules for a second set of communication links.

A change to a TWT schedule involves changing one or more parameters of an existing TWT schedule, according to an embodiment. For example, a changing a TWT schedule involves changing one or both of i) the time period between TWT SPs, and ii) the duration of each TWT SP, according to an illustrative embodiment. Changing the one or more TWT schedule parameters comprises communication devices exchanging one or more packets regarding the changing of the one or more TWT schedule parameters, according to some embodiments.

A first communication device changes a TWT schedule for a particular communication link among a plurality of communication links corresponding to respective frequency segments. In some embodiments, changing of the TWT schedule for the particular communication link is performed independently of one or more other TWT schedules (if any) for any other communication links among the plurality of communication link. For example, in some embodiments, the first communication device changes the TWT schedule for the particular communication link when no other TWT schedules exist with any other communication links that are being used with the second communication device. As another example, in some embodiments, when another TWT schedule exists for another communication link, the first communication device changes a parameters of the TWT schedule for the particular communication link without changing a corresponding parameter (and optionally without changing any parameters of) the other TWT schedule for the other communication link.

In other embodiments, the changing of a TWT schedule for a particular communication link is not performed independently of one or more other TWT schedules for other communication links among the plurality of communication links. As an illustrative example, the first communication device changes the TWT schedule for all communication links at a same time. As another illustrative example, the first communication device changes the TWT schedule for a first set of multiple communication links at a same time, without changing one or more other TWT schedules for a second set of communication links.

During a particular TWT SP, communication devices may agree to end the TWT SP early. Ending a particular TWT SP early comprises communication devices exchanging one or more packets to end the TWT SP early, according to some embodiments.

A first communication device ends a particular TWT SP early, the TWT SP for a particular communication link among a plurality of communication links corresponding to respective frequency segments. In some embodiments, ending the particular TWT SP early is performed independently of one or more other TWT schedules (if any) and/or TWT SPs (if any) for any other communication links among the plurality of communication link. For example, in some embodiments, the first communication device ends the particular TWT SP for the particular communication link early when no other TWT schedules exist with any other communication links that are being used with the second communication device. As another example, in some embodiments, when another TWT schedule exists for another communication link, the first communication device ends the particular TWT SP for the particular communication link early without ending another TWT SP for the other communication link early.

In other embodiments, the early ending of a TWT SP for a particular communication link is not performed independently of one or more other TWT SPs for other communication links among the plurality of communication links. As an illustrative example, the first communication device ends a TWT SP early for all communication links at a same time. As another illustrative example, the first communication device ends the TWT SP early for a first set of multiple communication links at a same time, without ending one or more other TWT SPs early for a second set of communication links.

As discussed above, TWT negotiation, TWT teardown, TWT suspension, TWT resumption, TWT parameter change, and/or early ending of a TWT SP involve the communication of packets between communication devices, at least in some embodiments. For example, a first communication device transmits to a second communication device a frame, within a packet, regarding a TWT management operation, such as TWT negotiation, a TWT teardown, a TWT suspension, a TWT resumption, a TWT parameter change, or an early ending of a TWT SP in connection with one or more communication links, at least in some embodiments. The frame includes one or more respective indications of the one or more communication links to which the TWT management operation corresponds, according to an embodiment. For example, the frame includes a bitmap, and respective bit positions in the bitmap correspond to respective communication links to indicate the communication link(s) to which the TWT management operation corresponds. For example, the first communication device sets to a first value (e.g., the network interface 122 sets, the MAC processor 126 sets, the client power save controller 142 sets, the network interface 162 sets, the MAC processor 166 sets, the power save controller 192 sets, the network interface 300 communicates, etc.) bit(s) that correspond to communication link(s) to which the TWT management operation corresponds, whereas the first communication device sets to a second value (e.g., the network interface 122 sets, the MAC processor 126 sets, the client power save controller 142 sets, the network interface 162 sets, the MAC processor 166 sets, the power save controller 192 sets, the network interface 300 sets, etc.) bit(s) that correspond to communication link(s) to which the TWT management operation does not correspond, according to an embodiment.

In some embodiments, when the frame is for a TWT management operation that applies to all communication links being used by a communication device, the frame includes an indication that the management operation applies to all communication links being used by the communication device.

In some embodiments in which the frame regarding a TWT management operation includes an indication of a first communication link (or an indication of a set of communication links that includes the first communication link) to which the TWT management operation corresponds, the first communication device transmits (e.g., the network interface 122 transmits, the PHY processor 130 transmits, the network interface 162 transmits, the PHY processor 170 transmits, the network interface 300 transmits, etc.) the frame in a second communication link. In some embodiments, the second communication link is the negotiated link, and frames regarding the TWT management operations are required to be transmitted in the negotiated link.

In some embodiments in which the frame regarding a TWT management operation includes an indication of a first communication link (or an indication of a set of communication links that includes the first communication link) to which the TWT management operation corresponds, the first communication device transmits (e.g., the network interface 122 transmits, the PHY processor 130 transmits, the network interface 162 transmits, the PHY processor 170 transmits, the network interface 300 transmits, etc.) the frame in a second communication link.

In an embodiment, when negotiating a TWT schedule, the first communication device generates (e.g., the network interface 122 generates, the MAC processor 126 generates, the client power save controller 142 generates, the network interface 162 generates, the MAC processor 166 generates, the power save controller 192 generates, the network interface 300 generates, etc.) a frame that i) indicates the frame corresponds to a negotiation of a TWT schedule, ii) includes one or more parameters for the schedule (e.g., a TWT start time, a TWT time period, and/or a TWT SP duration, etc.), and iii) includes an indication of one or more communication links to which the TWT schedule corresponds, and transmits (e.g., the network interface 122 transmits, the PHY processor 130 transmits, the network interface 162 transmits, the PHY processor 170 transmits, the network interface 300 transmits, etc.) the frame (within a packet) to the second communication device.

In an embodiment, when negotiating a TWT schedule, the first communication device generates (e.g., the network interface 122 generates, the MAC processor 126 generates, the client power save controller 142 generates, the network interface 162 generates, the MAC processor 166 generates, the power save controller 192 generates, the network interface 300 generates, etc.) a frame that i) indicates the frame corresponds to a negotiation of a TWT schedule, ii) includes one or more parameters for the schedule (e.g., a TWT start time, a TWT time period, and/or a TWT SP duration, etc.), and iii) includes an indication of one or more communication links to which the TWT schedule corresponds, and transmits (e.g., the network interface 122 transmits, the PHY processor 130 transmits, the network interface 162 transmits, the PHY processor 170 transmits, the network interface 300 transmits, etc.) the frame (within a packet) to the second communication device.

In an embodiment, when tearing down a TWT schedule, the first communication device generates (e.g., the network interface 122 generates, the MAC processor 126 generates, the client power save controller 142 generates, the network interface 162 generates, the MAC processor 166 generates, the power save controller 192 generates, the network interface 300 generates, etc.) a frame that i) indicates the frame corresponds to a teardown of a TWT schedule, and ii) includes an indication of one or more communication links to which the teardown corresponds, and transmits (e.g., the network interface 122 transmits, the PHY processor 130 transmits, the network interface 162 transmits, the PHY processor 170 transmits, the network interface 300 transmits, etc.) the frame (within a packet) to the second communication device.

In an embodiment, when suspending a TWT schedule, the first communication device generates (e.g., the network interface 122 generates, the MAC processor 126 generates, the client power save controller 142 generates, the network interface 162 generates, the MAC processor 166 generates, the power save controller 192 generates, the network interface 300 generates, etc.) a frame that i) indicates the frame corresponds to a suspension of a TWT schedule, and ii) includes an indication of one or more communication links to which the suspension corresponds, and transmits (e.g., the network interface 122 transmits, the PHY processor 130 transmits, the network interface 162 transmits, the PHY processor 170 transmits, the network interface 300 transmits, etc.) the frame (within a packet) to the second communication device.

In an embodiment, when resuming a TWT schedule, the first communication device generates (e.g., the network interface 122 generates, the MAC processor 126 generates, the client power save controller 142 generates, the network interface 162 generates, the MAC processor 166 generates, the power save controller 192 generates, the network interface 300 generates, etc.) a frame that i) indicates the frame corresponds to a resumption of a TWT schedule, and ii) includes an indication of one or more communication links to which the resumption corresponds, and transmits (e.g., the network interface 122 transmits, the PHY processor 130 transmits, the network interface 162 transmits, the PHY processor 170 transmits, the network interface 300 transmits, etc.) the frame (within a packet) to the second communication device.

In an embodiment, when changing a TWT schedule, the first communication device generates (e.g., the network interface 122 generates, the MAC processor 126 generates, the client power save controller 142 generates, the network interface 162 generates, the MAC processor 166 generates, the power save controller 192 generates, the network interface 300 generates, etc.) a frame that i) indicates the frame corresponds to a change to a TWT schedule, ii) includes one or more parameters for the schedule (e.g., a TWT start time, a TWT time period, and/or a TWT SP duration, etc.) that are being changed, and iii) includes an indication of one or more communication links to which the TWT schedule change corresponds, and transmits (e.g., the network interface 122 transmits, the PHY processor 130 transmits, the network interface 162 transmits, the PHY processor 170 transmits, the network interface 300 transmits, etc.) the frame (within a packet) to the second communication device.

In an embodiment, when ending a TWT SP early, the first communication device generates (e.g., the network interface 122 generates, the MAC processor 126 generates, the client power save controller 142 generates, the network interface 162 generates, the MAC processor 166 generates, the power save controller 192 generates, the network interface 300 generates, etc.) a frame that i) indicates the frame corresponds to an early ending of a TWT SP, and ii) includes an indication of one or more communication links to which the early ending corresponds, and transmits (e.g., the network interface 122 transmits, the PHY processor 130 transmits, the network interface 162 transmits, the PHY processor 170 transmits, the network interface 300 transmits, etc.) the frame (within a packet) to the second communication device.

Figure 13:
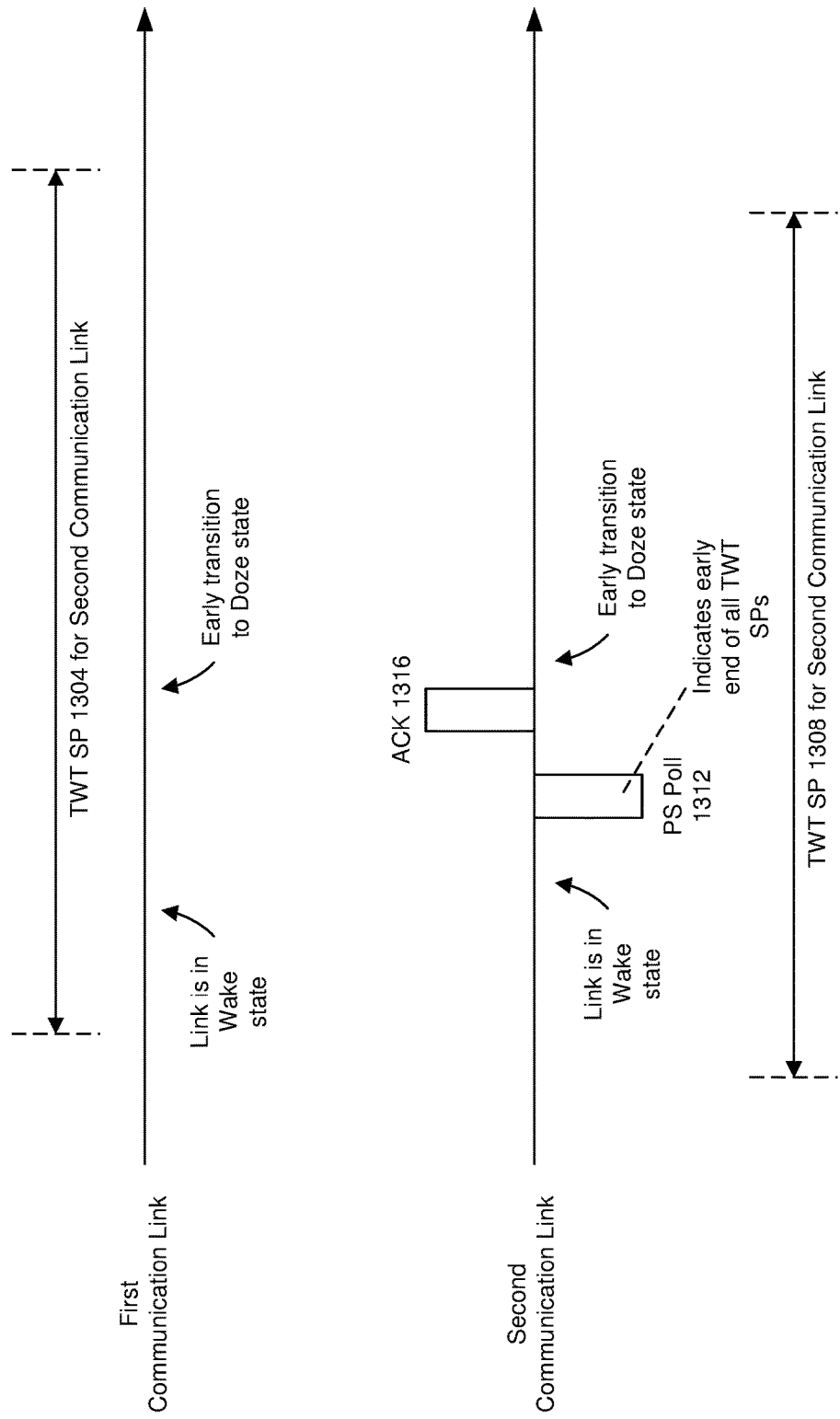
FIG. 13 is a diagram of another example communication exchange between an AP and a client station in a wireless communication network that utilizes a plurality of communication links in respective frequency segments, according to another embodiment.

FIG. 13 is a diagram of another example communication exchange 1300 between an AP and a client station, according to another embodiment. Horizontal lines in FIG. 13 indicate different communication links corresponding to respective frequency segments. In particular, FIG. 13 illustrates a first communication link and a second communication link. A transmission by the client station on a particular communication link is illustrated below the corresponding horizontal line, and a transmission by the AP on a particular communication link is illustrated above the corresponding horizontal line. Additionally, time increases from left to right in FIG. 13.

In the scenario illustrated in FIG. 13, the client station is in the power save mode in connection with both the first communication link and the second communication link. Additionally, a TWT SP 1304 has been established for the first communication link and a TWT SP 1308 has been established for the second communication link. Although the TWT SP 1304 and the TWT SP 1308 are illustrated in FIG. 13 as beginning and ending at different times, in other embodiments the TWT SP 1304 and the TWT SP 1308 begin at a same time and end at a same time.

During an initial portion of the TWT SP 1304, the client station is in the wake state with respect to the first communication link, and during an initial portion of the TWT SP 1308, the client station is in the wake state with respect to the second communication link. In an embodiment, the client station determines (e.g., the network interface 162 determines, the MAC processor 166 determines, the power save controller 192 determines, the network interface 300 determines, etc.) to end the TWT SP 1304 early and to end the TWT SP 1308 early. In response to determining to end the TWT SP 1304 early and to end the TWT SP 1308 early, the client station generates (e.g., the network interface 162 generates, the MAC processor 166 generates, the power save controller 192 generates, the network interface 300 generates, etc.) a frame 1312 having an indication (e.g., within a MAC header of the frame 1312, within a control field within the MAC header, within a MAC frame body of the frame 1312, etc.) that the client station is ending all TWT SPs early. Additionally, the client station transmits (e.g., the network interface 162 transmits, the PHY processor 170 transmits, the network interface 300 transmits, etc.) the frame 1312 within a packet to the AP via the second communication link. In another embodiment in which the first communication link is the negotiated link, the client station transmits (e.g., the network interface 162 transmits, the PHY processor 170 transmits, the network interface 300 transmits, etc.) the frame 1312 within a packet to the AP via the first communication link.

In an embodiment, the frame 1312 is a PS poll frame. In other embodiments, the frame 1312 is a QoS null frame, an action frame, or another suitable frame.

In response to receiving the frame 1312, the AP determines (e.g., the network interface 122 determines, the MAC processor 126 determines, the client power save controller 142 determines, the network interface 300 determines, etc.) that the client station is ending the TWT SP 1304 and the TWT SP 1308 early. Additionally, in response to receiving the frame 1312, the AP generates (e.g., the network interface 122 generates, the MAC processor 126 generates, the client power save controller 142 generates, the network interface 300 generates, etc.) and transmits (e.g., the network interface 122 transmits, the network interface 300 transmits, the PHY processor 130 transmits, etc.) an acknowledgment frame 1316 that acknowledges the frame 1312.

In connection with transmitting the frame 1312, the client station transitions (e.g., the network interface 162 transitions, the MAC processor 166 controls the network interface 162 to transition, the power save controller 192 controls the network interface 162 to transition, the network interface 300 transitions, etc.) at least hardware components corresponding to the first communication link and the second communication link to the doze state prior to an end of the TWT SP 1304 and prior to and end of the TWT SP 1308. In an embodiment, the client station transitions the at least hardware components corresponding to the first communication link and the second communication link to the doze state in response to receiving the acknowledgement frame 1316.

Figure 14:
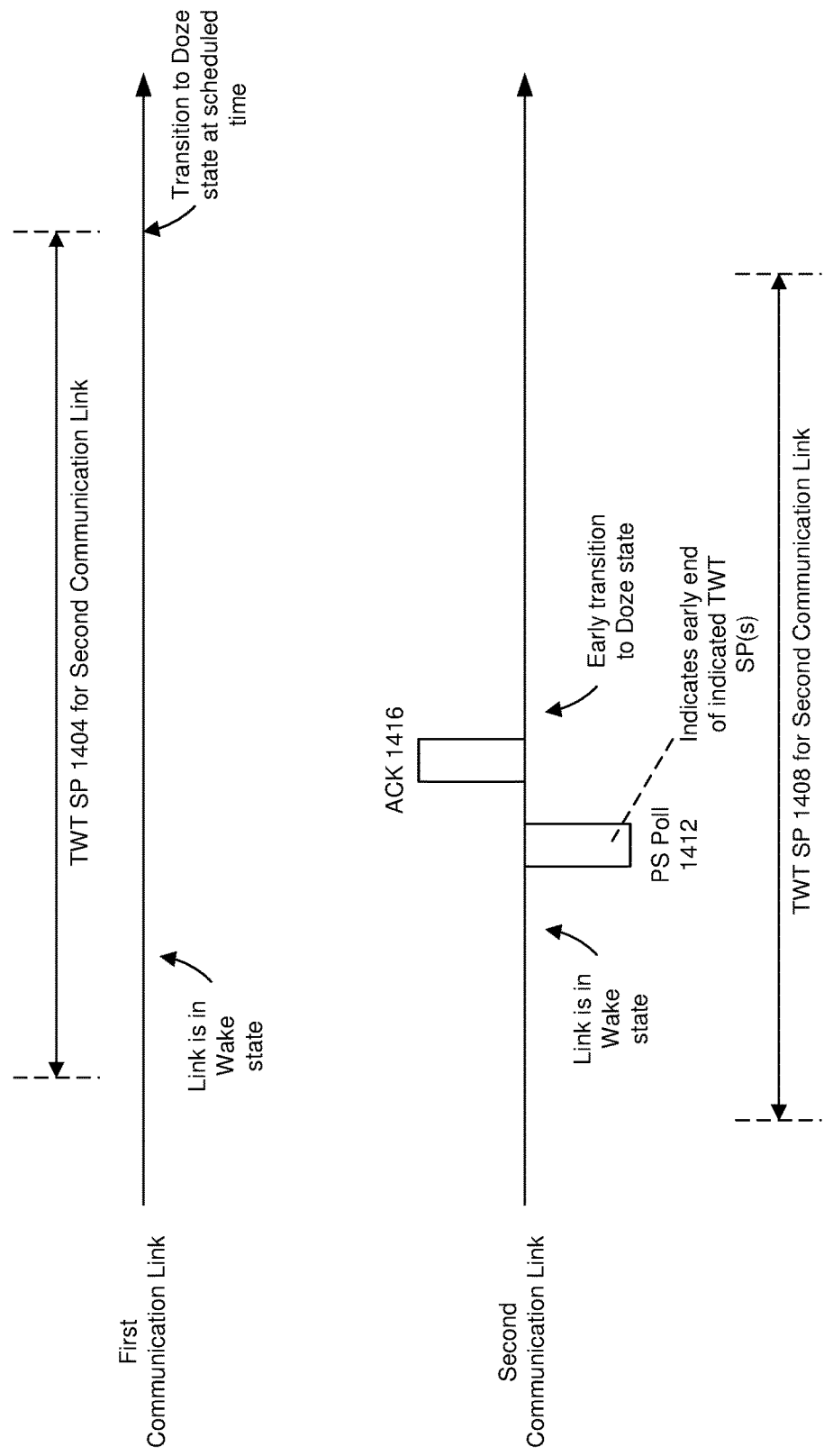
FIG. 14 is a diagram of another example communication exchange between an AP and a client station in a wireless communication network that utilizes a plurality of communication links in respective frequency segments, according to another embodiment.

FIG. 14 is a diagram of another example communication exchange 1400 between an AP and a client station, according to another embodiment. Horizontal lines in FIG. 14 indicate different communication links corresponding to respective frequency segments. In particular, FIG. 14 illustrates a first communication link and a second communication link. A transmission by the client station on a particular communication link is illustrated below the corresponding horizontal line, and a transmission by the AP on a particular communication link is illustrated above the corresponding horizontal line. Additionally, time increases from left to right in FIG. 14.

In the scenario illustrated in FIG. 14, the client station is in the power save mode in connection with both the first communication link and the second communication link. Additionally, a TWT SP 1404 has been established for the first communication link and a TWT SP 1408 has been established for the second communication link. Although the TWT SP 1404 and the TWT SP 1408 are illustrated in FIG. 14 as beginning and ending at different times, in other embodiments the TWT SP 1404 and the TWT SP 1408 begin at a same time and end at a same time.

During the TWT SP 1404, the client station is in the wake state with respect to the first communication link, and during an initial portion of the TWT SP 1408, the client station is in the wake state with respect to the second communication link. In an embodiment, the client station determines (e.g., the network interface 162 determines, the MAC processor 166 determines, the power save controller 192 determines, the network interface 300 determines, etc.) to end the TWT SP 1408 early. In response to determining to end the TWT SP 1408 early, the client station generates (e.g., the network interface 162 generates, the MAC processor 166 generates, the power save controller 192 generates, the network interface 300 generates, etc.) a frame 1412 having an indication (e.g., within a MAC header of the frame 1312, within a control field within the MAC header, within a MAC frame body of the frame 1312, etc.) that the client station is ending a TWT SP in the second communication link early. Additionally, the client station transmits (e.g., the network interface 162 transmits, the PHY processor 170 transmits, the network interface 300 transmits, etc.) the frame 1312 within a packet to the AP via the second communication link. In another embodiment in which the first communication link is the negotiated link, the client station transmits (e.g., the network interface 162 transmits, the PHY processor 170 transmits, the network interface 300 transmits, etc.) the frame 1412 within a packet to the AP via the first communication link.

In an embodiment, the frame 1412 is a PS poll frame. In other embodiments, the frame 1412 is a QoS null frame, an action frame, or another suitable frame.

In an embodiment, the frame 1412 includes a bitmap, and respective bit positions in the bitmap correspond to respective communication links to indicate the communication link(s) to which early ending of a TWT SP corresponds. For example, the client station sets to a first value (e.g., the network interface 122 sets, the MAC processor 126 sets, the client power save controller 142 sets, the network interface 162 sets, the MAC processor 166 sets, the power save controller 192 sets, the network interface 300 communicates, etc.) bit(s) that correspond to communication link(s) to which early ending of a TWT SP corresponds, whereas the client station sets to a second value (e.g., the network interface 122 sets, the MAC processor 126 sets, the client power save controller 142 sets, the network interface 162 sets, the MAC processor 166 sets, the power save controller 192 sets, the network interface 300 sets, etc.) bit(s) that correspond to communication link(s) to which the early ending of a TWT SP does not correspond, according to an embodiment. Thus, in an embodiment, the client station sets a first bit that corresponds to the first communication link to the second value, and sets a second bit that corresponds to the second communication link to the first value.

In response to receiving the frame 1412, the AP determines (e.g., the network interface 122 determines, the MAC processor 126 determines, the client power save controller 142 determines, the network interface 300 determines, etc.) that the client station is ending the TWT SP 1408 early.

Additionally, in response to receiving the frame 1412, the AP generates (e.g., the network interface 122 generates, the MAC processor 126 generates, the client power save controller 142 generates, the network interface 300 generates, etc.) and transmits (e.g., the network interface 122 transmits, the network interface 300 transmits, the PHY processor 130 transmits, etc.) an acknowledgment frame 1416 that acknowledges the frame 1412.

In connection with transmitting the frame 1412, the client station transitions (e.g., the network interface 162 transitions, the MAC processor 166 controls the network interface 162 to transition, the power save controller 192 controls the network interface 162 to transition, the network interface 300 transitions, etc.) at least hardware components corresponding to the second communication link to the doze state prior to an end of the TWT SP 1408. In an embodiment, the client station transitions the at least hardware components corresponding to the first communication link and the second communication link to the doze state in response to receiving the acknowledgement frame 1416.

Figure 15:
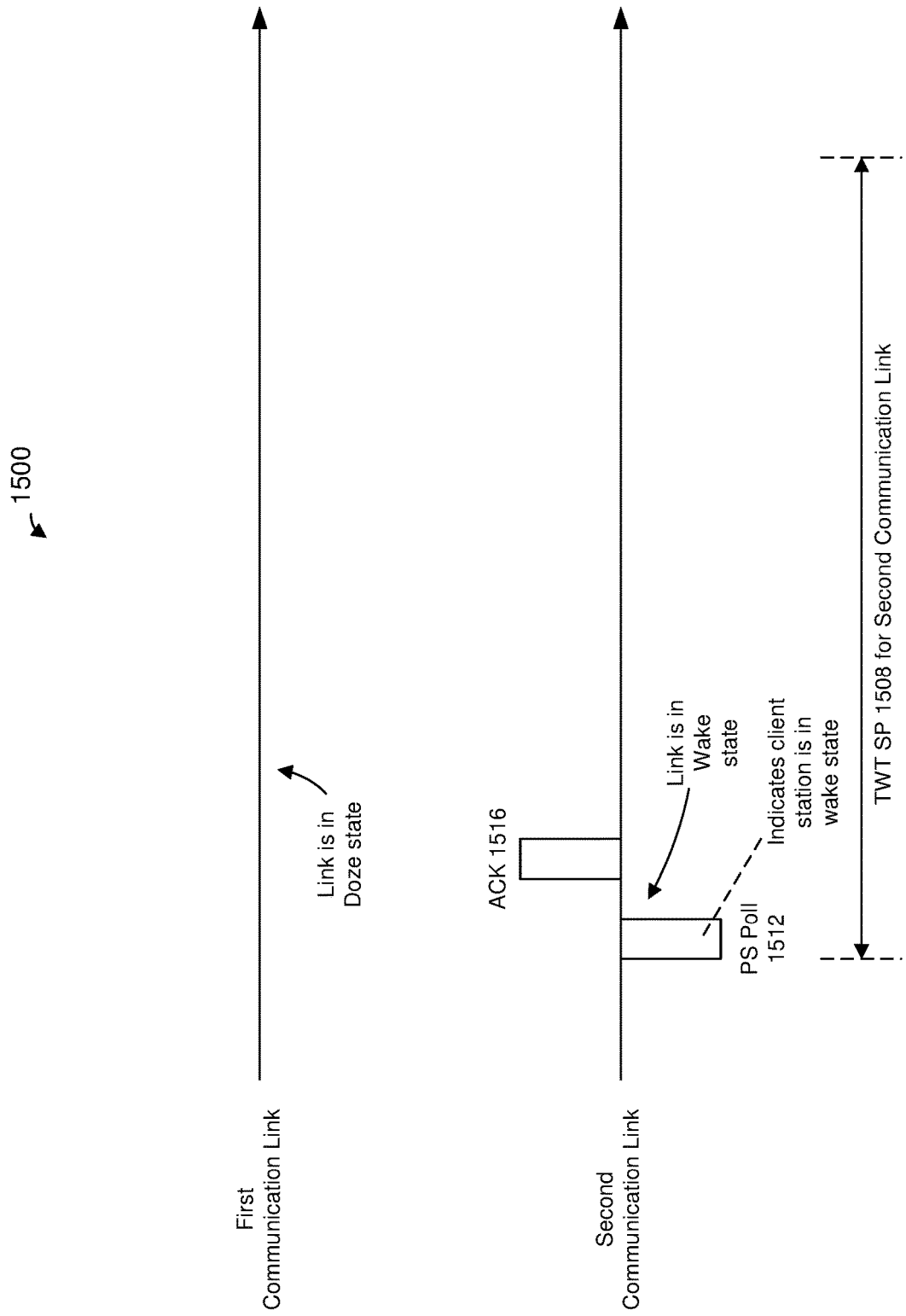
FIG. 15 is a diagram of another example communication exchange between an AP and a client station in a wireless communication network that utilizes a plurality of communication links in respective frequency segments, according to another embodiment.

FIG. 15 is a diagram of another example communication exchange 1500 between an AP and a client station, according to another embodiment. Horizontal lines in FIG. 15 indicate different communication links corresponding to respective frequency segments. In particular, FIG. 15 illustrates a first communication link and a second communication link. A transmission by the client station on a particular communication link is illustrated below the corresponding horizontal line, and a transmission by the AP on a particular communication link is illustrated above the corresponding horizontal line. Additionally, time increases from left to right in FIG. 15.

In the scenario illustrated in FIG. 15, the client station is in the power save mode in connection with both the first communication link and the second communication link. The client station is in the doze state with respect to the first communication link, and a TWT SP 1508 has been established for the second communication link.

In connection with a beginning of the TWT SP 1508, the client station generates (e.g., the network interface 162 generates, the MAC processor 166 generates, the power save controller 192 generates, the network interface 300 generates, etc.) a frame 1512 having an indication (e.g., within a MAC header of the frame 1312, within a control field within the MAC header, within a MAC frame body of the frame 1312, etc.) that the client station is in the wake state. Additionally, the client station transmits (e.g., the network interface 162 transmits, the PHY processor 170 transmits, the network interface 300 transmits, etc.) the frame 1512 within a packet to the AP via the second communication link. Transmission of the frame 1512 only within the second communication link indicates only that the client station is in the wake state with respect to the second communication link.

In an embodiment, the frame 1512 is a PS poll frame. In other embodiments, the frame 1512 is a QoS null frame, an action frame, or another suitable frame.

In response to receiving the frame 1512 in the second communication link, the AP determines (e.g., the network interface 122 determines, the MAC processor 126 determines, the client power save controller 142 determines, the network interface 300 determines, etc.) that the client station is in the wake state with respect to the second communication link. Additionally, in response to receiving the frame 1512, the AP generates (e.g., the network interface 122 generates, the MAC processor 126 generates, the client power save controller 142 generates, the network interface 300 generates, etc.) and transmits (e.g., the network interface 122 transmits, the network interface 300 transmits, the PHY processor 130 transmits, etc.) an acknowledgment frame 1516 that acknowledges the frame 1512.

In connection with transmitting the frame 1512, the client station transitions (e.g., the network interface 162 transitions, the MAC processor 166 controls the network interface 162 to transition, the power save controller 192 controls the network interface 162 to transition, the network interface 300 transitions, etc.) at least hardware components corresponding to the second communication link to the wake state.

Figure 16:
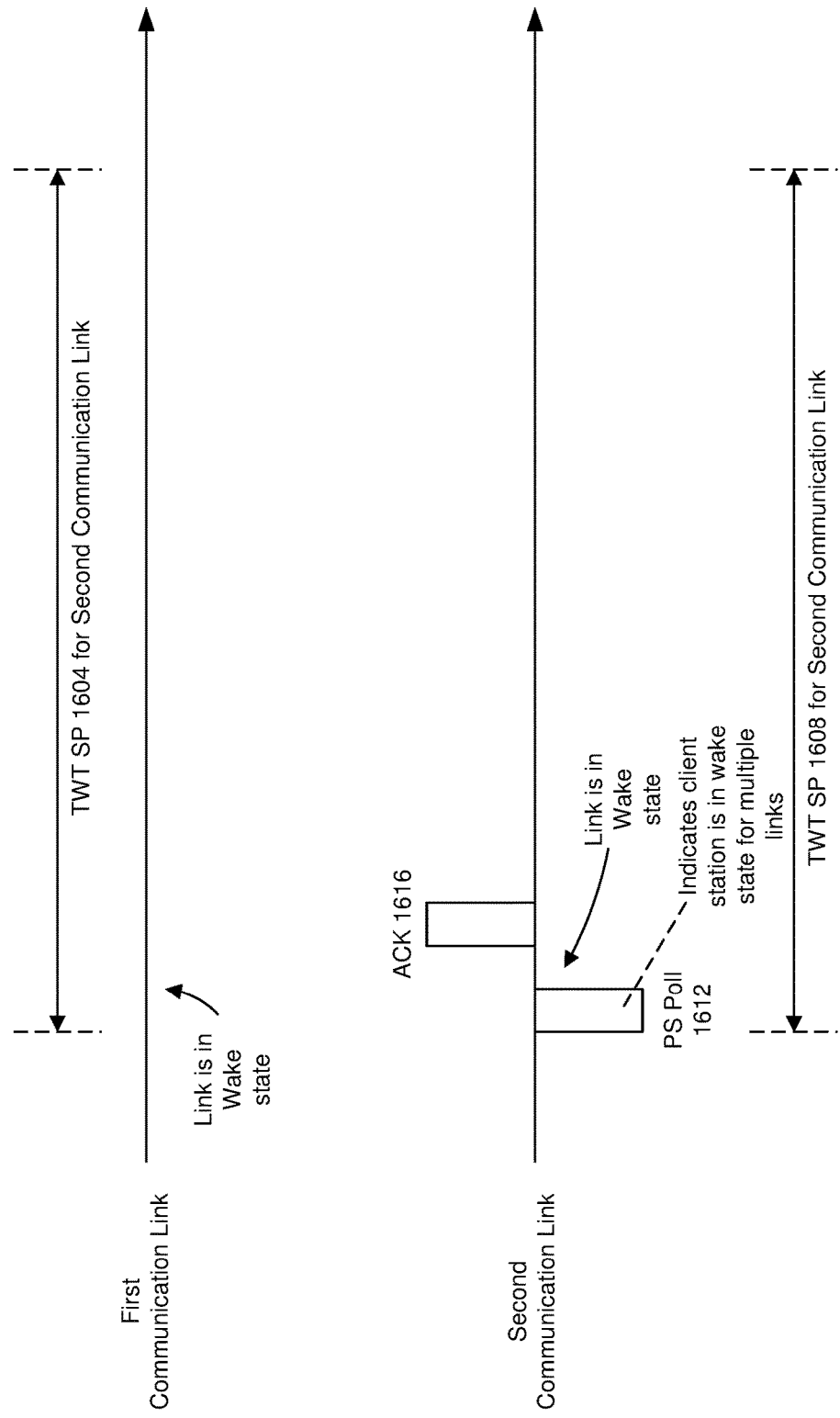
FIG. 16 is a diagram of another example communication exchange between an AP and a client station in a wireless communication network that utilizes a plurality of communication links in respective frequency segments, according to another embodiment.

FIG. 16 is a diagram of another example communication exchange 1600 between an AP and a client station, according to another embodiment. Horizontal lines in FIG. 16 indicate different communication links corresponding to respective frequency segments. In particular, FIG. 16 illustrates a first communication link and a second communication link. A transmission by the client station on a particular communication link is illustrated below the corresponding horizontal line, and a transmission by the AP on a particular communication link is illustrated above the corresponding horizontal line. Additionally, time increases from left to right in FIG. 16.

In the scenario illustrated in FIG. 16, the client station is in the power save mode in connection with both the first communication link and the second communication link. Additionally, a TWT SP 1604 has been established for the first communication link and a TWT SP 1608 has been established for the second communication link.

In connection with a beginning of the TWT SP 1604 and a beginning of the TWT SP 1608, the client station generates (e.g., the network interface 162 generates, the MAC processor 166 generates, the power save controller 192 generates, the network interface 300 generates, etc.) a frame 1612 having an indication (e.g., within a MAC header of the frame 1312, within a control field within the MAC header, within a MAC frame body of the frame 1312, etc.) that the client station is in the wake state. Additionally, the client station transmits (e.g., the network interface 162 transmits, the PHY processor 170 transmits, the network interface 300 transmits, etc.) the frame 1612 within a packet to the AP via the second communication link.

In an embodiment, the frame 1612 includes a bitmap, and respective bit positions in the bitmap correspond to respective communication links to indicate the communication links for which the client station is in the wake state. For example, the client station sets to a first value (e.g., the network interface 122 sets, the MAC processor 126 sets, the client power save controller 142 sets, the network interface 162 sets, the MAC processor 166 sets, the power save controller 192 sets, the network interface 300 communicates, etc.) bits that correspond to communication links for which the client station is in the wake state, whereas the client station sets to a second value (e.g., the network interface 122 sets, the MAC processor 126 sets, the client power save controller 142 sets, the network interface 162 sets, the MAC processor 166 sets, the power save controller 192 sets, the network interface 300 sets, etc.) bit(s) (if any) that correspond to communication link(s) for which the client station is not in the wake state (e.g., is in the doze state, if in the OFF state, etc.), according to an embodiment. Thus, in an embodiment, the client station sets a first bit that corresponds to the first communication link to the first value, and sets a second bit that corresponds to the second communication link to the first value.

In an embodiment, the frame 1612 is a PS poll frame. In other embodiments, the frame 1612 is a QoS null frame, an action frame, or another suitable frame.

In response to receiving the frame 1612, the AP determines (e.g., the network interface 122 determines, the MAC processor 126 determines, the client power save controller 142 determines, the network interface 300 determines, etc.) that the client station is in the wake state with respect to the first communication link and the second communication link. Additionally, in response to receiving the frame 1612, the AP generates (e.g., the network interface 122 generates, the MAC processor 126 generates, the client power save controller 142 generates, the network interface 300 generates, etc.) and transmits (e.g., the network interface 122 transmits, the network interface 300 transmits, the PHY processor 130 transmits, etc.) an acknowledgment frame 1616 that acknowledges the frame 1612.

In connection with transmitting the frame 1612, the client station transitions (e.g., the network interface 162 transitions, the MAC processor 166 controls the network interface 162 to transition, the power save controller 192 controls the network interface 162 to transition, the network interface 300 transitions, etc.) at least hardware components corresponding to the first communication link and the second communication link to the wake state.

In some embodiments, an AP operating on multiple communication links (sometimes referred to herein as a "multi-link AP entity") corresponding to respective frequency segments is considered as multiple different APs (sometimes referred to herein as "sub-APs") corresponding to respective communication links. In some embodiments, each sub-AP is associated with a respective network address (e.g., MAC address, basic service set identifier (BSSID), etc.).

In some embodiments, the multi-link AP entity transmits beacon frames on all of the communication links. A beacon frame is a management frame that is transmitted periodically by an AP. The beacon frame includes information about a WLAN managed by the AP. For example, the beacon frame includes about capabilities and configuration of the WLAN, according to some embodiments. In some embodiments, the beacon frame includes a timestamp that client stations can use to update internal clocks of the client stations. In some embodiments, the beacon frame includes information regarding imminent configuration changes, such as data rate changes. In some embodiments, the beacon frame includes one or more traffic indication map (TIM) elements that indicate to respective client stations in the power save mode whether the AP has buffered frames waiting for transmission to the respective client stations.

In some embodiments, the multi-link AP entity transmits multiple instances of a single beacon frame on respective communication links, where the single beacon frame includes information for all of the sub-APs. In other embodiments, the multi-link AP entity transmits, for each sub-AP, multiple instances of a beacon frame for the sub-AP on respective communication links, where the beacon frame includes information for the respective sub-AP.

Figure 17:
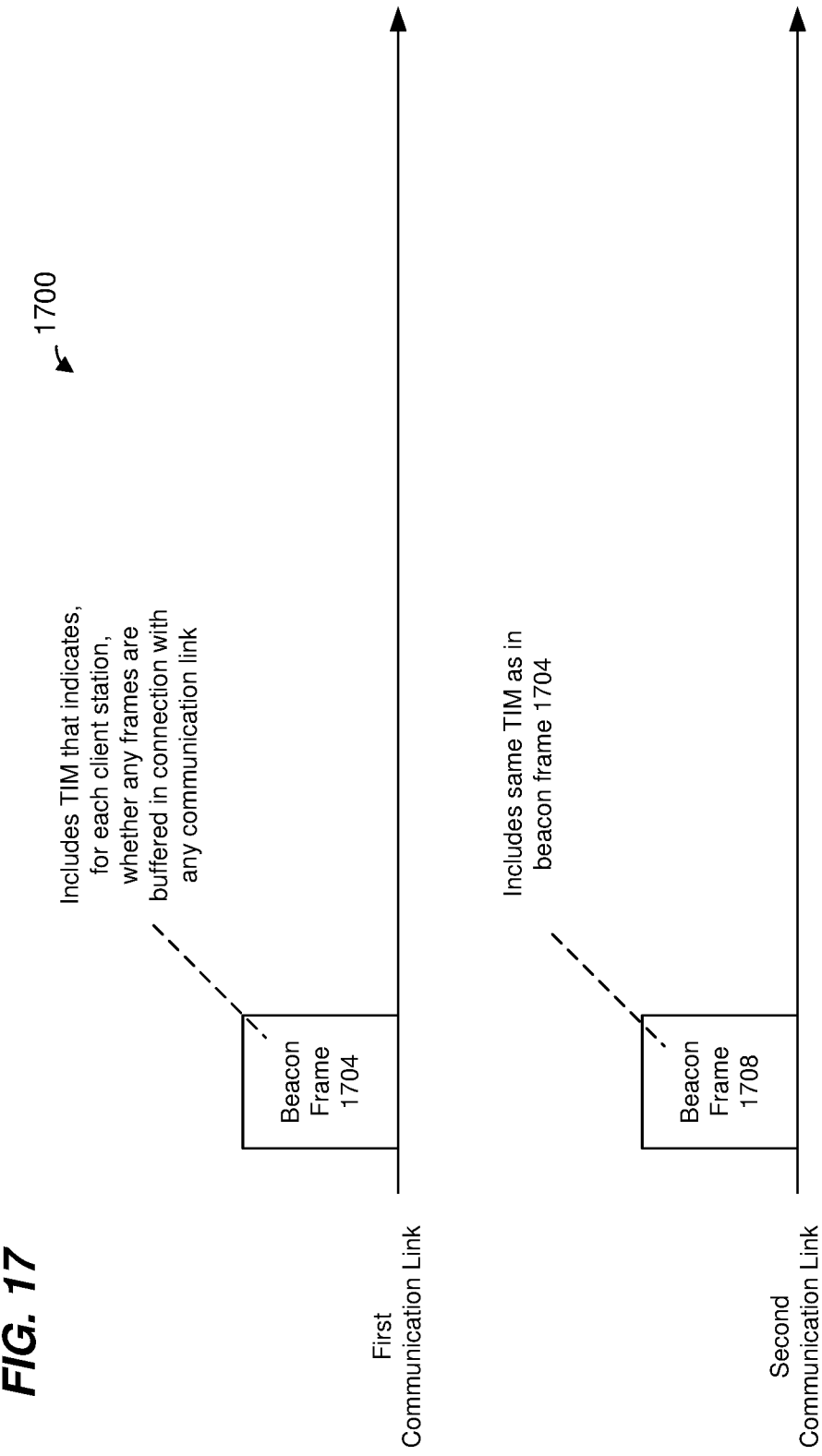
FIG. 17 is a diagram of an example transmission of beacon frames in a wireless communication network that utilizes a plurality of communication links in respective frequency segments, according to an embodiment.

In some embodiments, the beacon frame includes a TIM element that indicates, for each client station, whether any frames are buffered for the client station in connection with any of the communication links. FIG. 17 is a diagram of example transmission by a multi-link AP entity, according to another embodiment. Horizontal lines in FIG. 17 indicate different communication links corresponding to respective frequency segments. In particular, FIG. 17 illustrates a first communication link and a second communication link. Additionally, time increases from left to right in FIG. 17.

The multi-link AP entity generates (e.g., the network interface 122 generates, the MAC processor 126 generates, the network interface 200 generates, etc.) a beacon frame 1704 for transmission in the first communication link. The beacon frame 1704 includes a TIM element that indicates, for each client station, whether the multi-link AP entity has buffered any frames in connection with any of the communication links, according to an embodiment. Additionally, the multi-link AP transmits (e.g., the network interface 122 transmits, the PHY processor 130 transmits, the network interface 300 transmits, etc.) the beacon frame 1704 within a packet via the first communication link.

Additionally, the multi-link AP entity generates (e.g., the network interface 122 generates, the MAC processor 126 generates, the network interface 200 generates, etc.) a beacon frame 1708 for transmission in the second communication link. The beacon frame 1708 includes the same TIM element included in the beacon frame 1704, according to an embodiment. Additionally, the multi-link AP transmits (e.g., the network interface 122 transmits, the PHY processor 130 transmits, the network interface 300 transmits, etc.) the beacon frame 1708 within a packet via the second communication link.

In some embodiments, the beacon frame 1704 and the beacon frame 1708 are different instances of a same beacon frame. In other embodiments, the beacon frame 1704 is a different beacon frame than the beacon frame 1708.

Upon receiving the beacon frame 1704 in the first communication link and/or receiving the beacon frame 1708 in the second communication link, a client station analyzes (e.g., the network interface 162 analyzes, the MAC processor 166 analyzes, the network interface 300 analyzes, etc.) the TIM element to determine whether the AP has any frames buffered for the client station. If the client station determines that the AP has frames buffered for the client station, the client station generates (e.g., the network interface 162 generates, the MAC processor 166 generates, the power save controller 192 generates, the network interface 300 generates, etc.) a PS poll frame, a QoS null frame, or another suitable frame, and transmits (e.g., the network interface 162 transmits, the PHY processor 170 transmits, the network interface 300 transmits, etc.) the PS poll frame (or other suitable frame) within a packet to the AP to prompt the AP to transmit one or more of the buffered frames to the client station. In various embodiments, the client station transmits the PS poll frame (or other suitable frame) via one or both of the first communication link or the second communication link.

In some embodiments, the TIM element transmission techniques of FIG. 17 are used when the multi-link AP is permitted to transmit traffic streams (each traffic stream comprising MPDUs having a respective same TID intended for a respective client station) via any of the multiple communication links.

Figure 18:
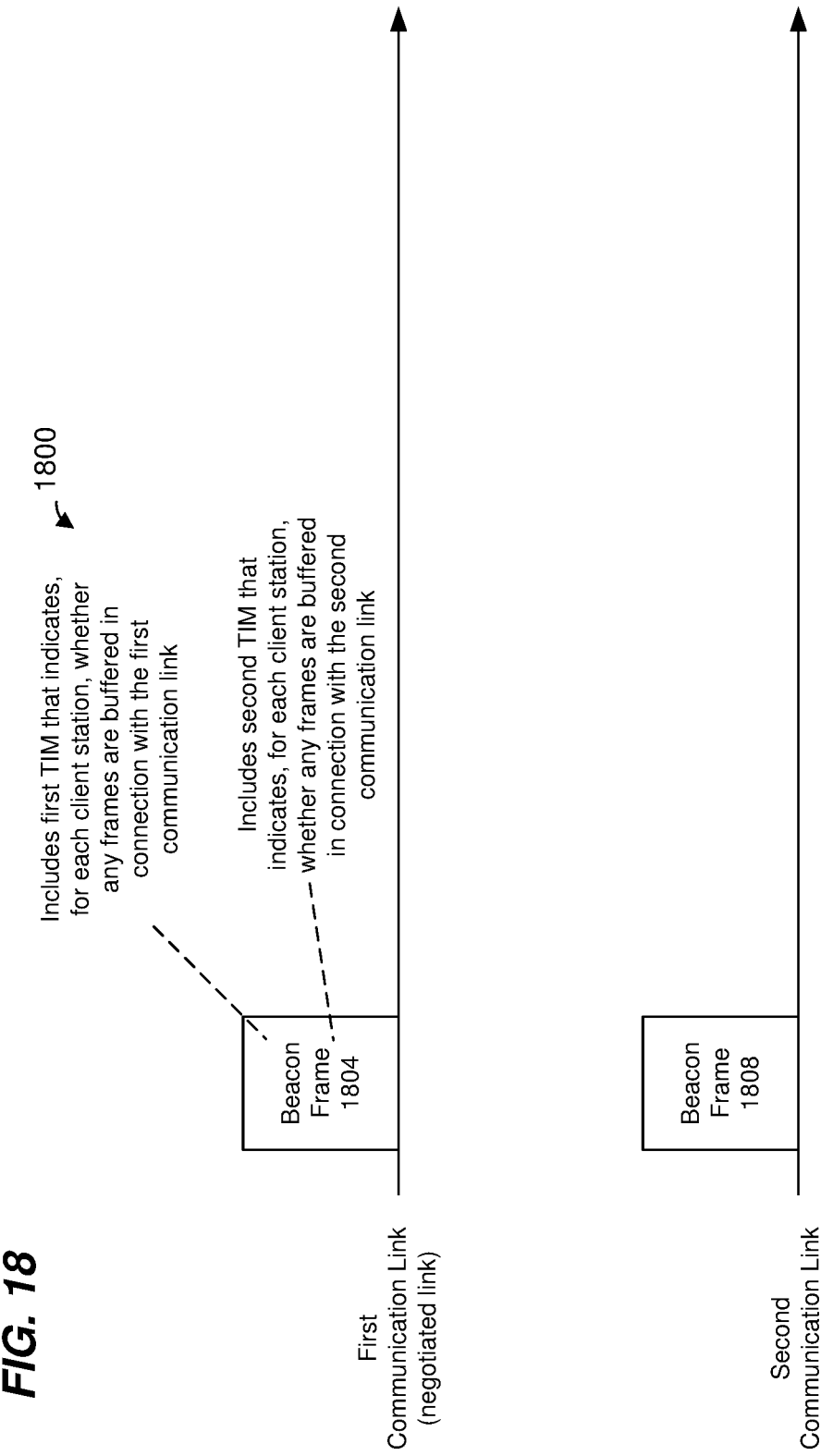
FIG. 18 is a diagram of another example transmission of beacon frames in a wireless communication network that utilizes a plurality of communication links in respective frequency segments, according to another embodiment.

FIG. 18 is a diagram of example transmission by a multi-link AP entity, according to another embodiment. Horizontal lines in FIG. 18 indicate different communication links corresponding to respective frequency segments. In particular, FIG. 18 illustrates a first communication link and a second communication link. Additionally, time increases from left to right in FIG. 18. In an embodiment, the first communication link is a negotiated link.

The multi-link AP entity generates (e.g., the network interface 122 generates, the MAC processor 126 generates, the network interface 200 generates, etc.) a beacon frame 1804 for transmission in the first communication link. The beacon frame 1804 includes a first TIM element that indicates, for each client station, whether the multi-link AP entity has buffered any frames for the client station for transmission via the first communication link. The beacon frame 1804 also includes a second TIM element that indicates, for each client station, whether the multi-link AP entity has buffered any frames for the client station for transmission via the second communication link.

The multi-link AP transmits (e.g., the network interface 122 transmits, the PHY processor 130 transmits, the network interface 300 transmits, etc.) the beacon frame 1804 within a packet via the first communication link.

Additionally, the multi-link AP entity also generates (e.g., the network interface 122 generates, the MAC processor 126 generates, the network interface 200 generates, etc.) a beacon frame 1808 for transmission in the second communication link. The beacon frame 1808 does not include the first TIM element or the second TIM element, according to an embodiment. The multi-link AP transmits (e.g., the network interface 122 transmits, the PHY processor 130 transmits, the network interface 300 transmits, etc.) the beacon frame 1808 within a packet via the second communication link.

In some embodiments, the beacon frame 1804 is a different beacon frame than the beacon frame 1808.

In some embodiments, at least some client stations are required to be in a wake state with respect to the first communication link when the beacon 1804 is transmitted.

Upon receiving the beacon frame 1804 in the first communication link, a client station analyzes (e.g., the network interface 162 analyzes, the MAC processor 166 analyzes, the network interface 300 analyzes, etc.) i) the first TIM element to determine whether the AP has any frames buffered for the client station for transmission via the first communication link, and ii) the second TIM element to determine whether the AP has any frames buffered for the client station for transmission via the second communication link. If the client station determines that the AP has frames buffered for the client station for transmission in the first communication link, the client station generates (e.g., the network interface 162 generates, the MAC processor 166 generates, the power save controller 192 generates, the network interface 300 generates, etc.) a PS poll frame, a QoS null frame, or another suitable frame, and transmits (e.g., the network interface 162 transmits, the PHY processor 170 transmits, the network interface 300 transmits, etc.) the PS poll frame (or other suitable frame) within a packet to the AP via the first communication link to prompt the AP to transmit one or more of the buffered frames to the client station via the first communication link. In another embodiment, the client station transits the PS poll frame (or other suitable frame) via the second communication link to prompt the AP to transmit one or more of the buffered frames to the client station via the first communication link.

Similarly, if the client station determines that the AP has frames buffered for the client station for transmission in the second communication link, the client station generates (e.g., the network interface 162 generates, the MAC processor 166 generates, the power save controller 192 generates, the network interface 300 generates, etc.) a PS poll frame, a QoS null frame, or another suitable frame, and transmits (e.g., the network interface 162 transmits, the PHY processor 170 transmits, the network interface 300 transmits, etc.) the PS poll frame (or other suitable frame) within a packet to the AP via the second communication link to prompt the AP to transmit one or more of the buffered frames to the client station via the second communication link. In another embodiment, the client station transits the PS poll frame (or other suitable frame) via the first communication link to prompt the AP to transmit one or more of the buffered frames to the client station via the second communication link.

In other embodiments, the AP transmits multiple beacon frames 1804 via the first communication link, e.g., within a single packet or multiple packets. For example, a first beacon frame 1804 corresponds to a first sub-AP in the first communication link, and the first beacon frame 1804 is generated to include the first TIM element; and a second beacon frame 1804 corresponds to a second sub-AP in the second communication link, and the second beacon frame 1804 is generated to include the second TIM element.

In some embodiments, the TIM element transmission techniques of FIG. 18 are used when the multi-link AP is required to transmit a first set of one or more traffic streams (each traffic stream comprising MPDUs having a respective same TID intended for a respective client station) via the first communication link, and a second set of one or more traffic streams (each traffic stream comprising MPDUs having a respective same TID intended for a respective client station) via the second communication link. For example, the first TIM element corresponds to buffered MPDUs in the first set of one or more traffic streams, and the second TIM element corresponds to buffered MPDUs in the second set of one or more traffic streams, according to an embodiment.

Figure 19:
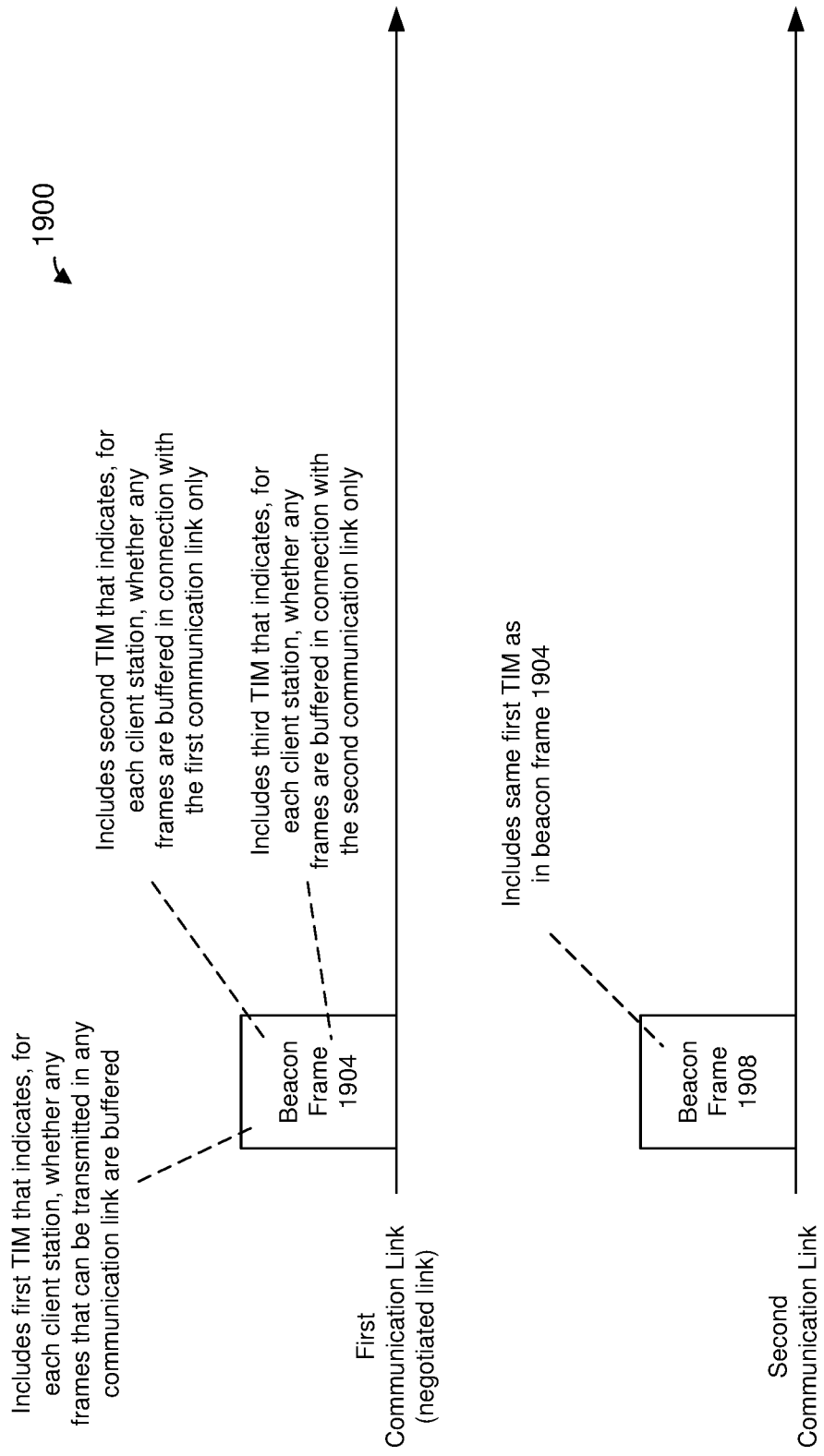
FIG. 19 is a diagram of another example transmission of beacon frames in a wireless communication network that utilizes a plurality of communication links in respective frequency segments, according to another embodiment.

FIG. 19 is a diagram of example transmission by a multi-link AP entity, according to another embodiment. Horizontal lines in FIG. 19 indicate different communication links corresponding to respective frequency segments. In particular, FIG. 19 illustrates a first communication link and a second communication link. Additionally, time increases from left to right in FIG. 19. In an embodiment, the first communication link is a negotiated link.

The multi-link AP entity generates (e.g., the network interface 122 generates, the MAC processor 126 generates, the network interface 200 generates, etc.) a beacon frame 1904 for transmission in the first communication link. The beacon frame 1904 includes a first TIM element that indicates, for each client station, whether the multi-link AP entity has buffered any frames for the client station that can be transmitted via any of the multiple communication links. The beacon frame 1904 also includes a second TIM element that indicates, for each client station, whether the multi-link AP entity has buffered any frames for the client station for transmission via the first communication link. The beacon frame 1904 also includes a third TIM element that indicates, for each client station, whether the multi-link AP entity has buffered any frames for the client station for transmission via the second communication link.

The multi-link AP transmits (e.g., the network interface 122 transmits, the PHY processor 130 transmits, the network interface 300 transmits, etc.) the beacon frame 1904 within a packet via the first communication link.

Additionally, the multi-link AP entity also generates (e.g., the network interface 122 generates, the MAC processor 126 generates, the network interface 200 generates, etc.) a beacon frame 1808 for transmission in the second communication link. The beacon frame 1908 includes the first TIM element, but does not include the second TIM element or the third TIM element, according to an embodiment. The multi-link AP transmits (e.g., the network interface 122 transmits, the PHY processor 130 transmits, the network interface 300 transmits, etc.) the beacon frame 1908 within a packet via the second communication link.

In some embodiments, the beacon frame 1904 is a different beacon frame than the beacon frame 1908.

In some embodiments, at least some client stations are required to be in a wake state with respect to the first communication link when the beacon 1904 is transmitted.

Upon receiving the beacon frame 1904 in the first communication link, a client station analyzes (e.g., the network interface 162 analyzes, the MAC processor 166 analyzes, the network interface 300 analyzes, etc.) i) the first TIM element to determine whether the AP has any frames buffered for the client station for transmission via either the first communication link or the second communication link, ii) the second TIM element to determine whether the AP has any frames buffered for the client station for transmission via the first communication link, and iii) the third TIM element to determine whether the AP has any frames buffered for the client station for transmission via the second communication link. If the client station determines that the AP has frames buffered for the client station for transmission in the first communication link, the client station generates (e.g., the network interface 162 generates, the MAC processor 166 generates, the power save controller 192 generates, the network interface 300 generates, etc.) a PS poll frame, a QoS null frame, or another suitable frame, and transmits (e.g., the network interface 162 transmits, the PHY processor 170 transmits, the network interface 300 transmits, etc.) the PS poll frame (or other suitable frame) within a packet to the AP via the first communication link to prompt the AP to transmit one or more of the buffered frames to the client station via the first communication link. In another embodiment, the client station transmits the PS poll frame (or other suitable frame) via the second communication link to prompt the AP to transmit one or more of the buffered frames to the client station via the first communication link.

Similarly, if the client station determines that the AP has frames buffered for the client station for transmission in the second communication link, the client station generates (e.g., the network interface 162 generates, the MAC processor 166 generates, the power save controller 192 generates, the network interface 300 generates, etc.) a PS poll frame, a QoS null frame, or another suitable frame, and transmits (e.g., the network interface 162 transmits, the PHY processor 170 transmits, the network interface 300 transmits, etc.) the PS poll frame (or other suitable frame) within a packet to the AP via the second communication link to prompt the AP to transmit one or more of the buffered frames to the client station via the second communication link. In another embodiment, the client station transits the PS poll frame (or other suitable frame) via the first communication link to prompt the AP to transmit one or more of the buffered frames to the client station via the second communication link.

Similarly, if the client station determines that the AP has frames buffered for the client station for transmission in either the first communication link or the second communication link, the client station generates (e.g., the network interface 162 generates, the MAC processor 166 generates, the power save controller 192 generates, the network interface 300 generates, etc.) one or both of i) a first PS poll frame (or QoS null frame, or another suitable frame), and ii) a second PS poll frame (or QoS null frame, or another suitable frame), transmits (e.g., the network interface 162 transmits, the PHY processor 170 transmits, the network interface 300 transmits, etc.) one or both of i) the first PS poll frame (or other suitable frame) within a packet to the AP via the first communication link to prompt the AP to transmit one or more of the buffered frames to the client station via the first communication link, and ii) the second PS poll frame (or other suitable frame) within a packet to the AP via the second communication link to prompt the AP to transmit one or more of the buffered frames to the client station via the first communication link.

In some embodiments, if the client station generates a PS poll frame (or other suitable frame) in connection with the second TIM element, the client station does not generate another PS poll frame (or other suitable frame) for the first communication link in connection with the first TIM element. Similarly, in some embodiments, if the client station generates a PS poll frame (or other suitable frame) in connection with the third TIM element, the client station does not generate another PS poll frame (or other suitable frame) for the second communication link in connection with the first TIM element.

In other embodiments, the AP transmits multiple beacon frames 1904 via the first communication link, e.g., within a single packet or multiple packets. For example, a first beacon frame 1904 corresponds to a first sub-AP in the first communication link, and the first beacon frame 1904 is generated to include the first TIM element and the second TIM element; and a second beacon frame 1904 corresponds to a second sub-AP in the second communication link, and the second beacon frame 1804 is generated to include the third TIM element, and optionally the first TIM element.

In some embodiments, the TIM element transmission techniques of FIG. 19 are used when the multi-link AP is required to transmit a first set of one or more traffic streams (each traffic stream comprising MPDUs having a respective same TID intended for a respective client station) via the first communication link, a second set of one or more traffic streams (each traffic stream comprising MPDUs having a respective same TID intended for a respective client station) via the second communication link, and is permitted to transmit third set of one or more traffic streams (each traffic stream comprising MPDUs having a respective same TID intended for a respective client station) via either the first communication link or the second communication link. For example, the second TIM element corresponds to buffered MPDUs in the first set of one or more traffic streams, the third TIM element corresponds to buffered MPDUs in the second set of one or more traffic streams, and the first TIM element corresponds to buffered MPDUs in the third set of one or more traffic streams, according to an embodiment.

Figure 20:
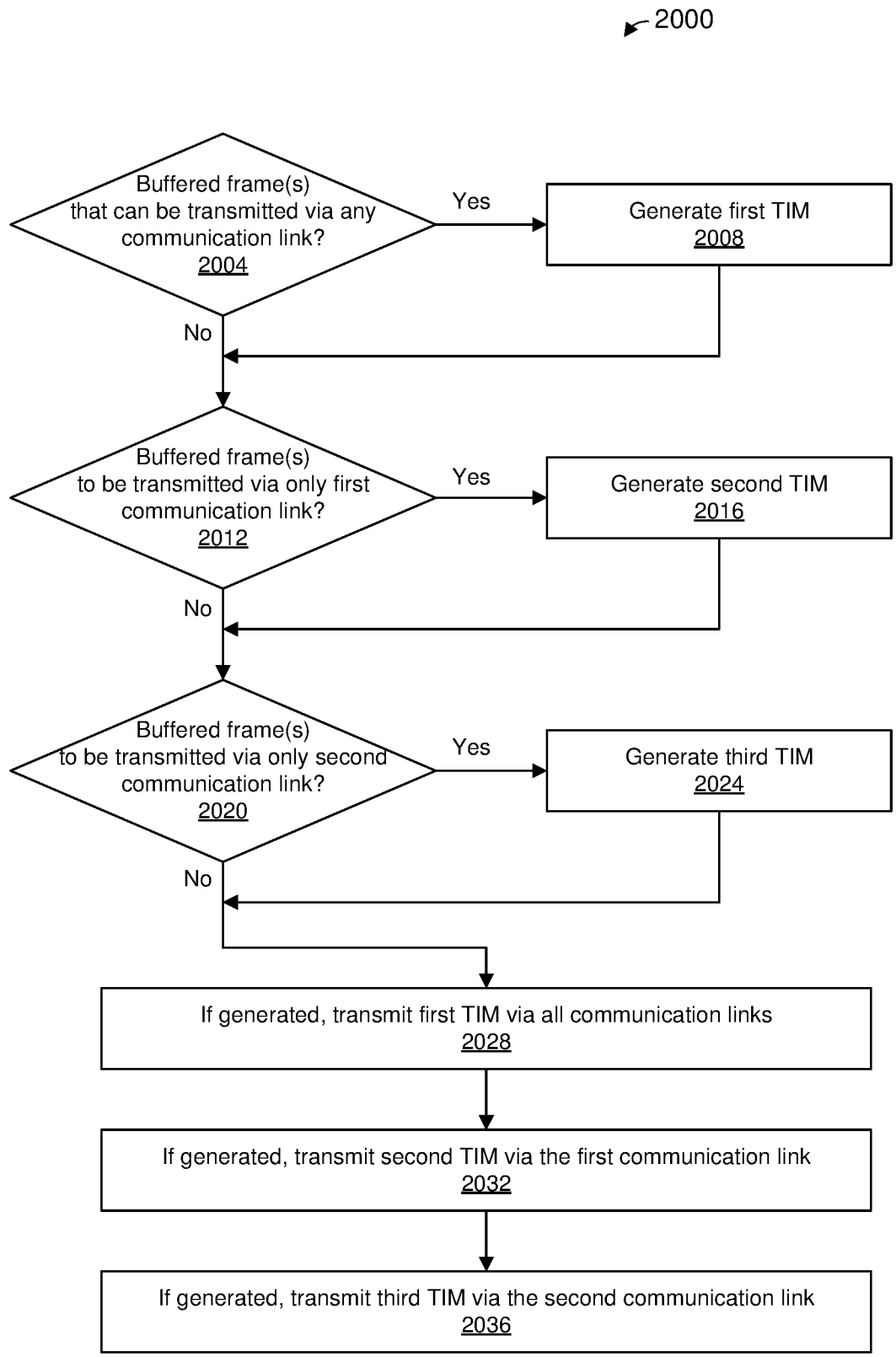
FIG. 20 is a flow diagram of an example method for a first communication device to inform second communication devices of whether the first communication device has buffered frames for the second communication devices, according to an embodiment.

FIG. 20 is a flow diagram of an example method for a first communication device to inform second communication devices of whether the first communication device has buffered frames for the second communication device, according to an embodiment. In some embodiments, the AP 114 and/or the client station 154 is configured to implement the method 2000, and FIG. 20 is described with reference to FIG. 1 merely for explanatory purposes. In other embodiments, the method 2000 is implemented by another suitable communication device. In some embodiments, the method 2000 is implemented in conjunction with the method 400 of FIG. 4. In other embodiments, the method 2000 is not implemented in conjunction with the method 400 of FIG. 4.

At block 2004, the first communication device determines (e.g., the network interface 122 determines, the MAC processor 126 determines, the communication link selection controller 140 determines, the network interface 162 determines, the MAC processor 166 determines, the communication link selection controller 190 determines, the network interface 300 determines, etc.) whether the first communication device has buffered any frames for any of the second communication devices that can be transmitted via any of multiple communication links corresponding to respective frequency segments.

In response to determining at block 2004 that the first communication device has buffered one or more frames for any of the second communication devices that can be transmitted via any of multiple communication links, the flow proceeds to block 2008. At block 2008, the first communication device generates (e.g., the network interface 122 generates, the MAC processor 126 generates, the network interface 162 generates, the MAC processor 166 generates, the network interface 300 generates, etc.) a first TIM element that indicates, for each second communication device, whether the first communication device has buffered any frames for the second communication device that can be transmitted via any of the multiple communication links. The flow then proceeds to block 2012.

Additionally, in response to determining at block 2004 that the first communication device does not have buffered at least one frame for any of the second communication devices that can be transmitted via any of multiple communication links, the flow also proceeds to block 2012. At block 2012, the first communication device determines (e.g., the network interface 122 determines, the MAC processor 126 determines, the communication link selection controller 140 determines, the network interface 162 determines, the MAC processor 166 determines, the communication link selection controller 190 determines, the network interface 300 determines, etc.) whether the first communication device has buffered any frames for any of the second communication devices that are to be transmitted via only a first communication link among the multiple communication links.

In response to determining at block 2012 that the first communication device has buffered one or more frames for any of the second communication devices that are to be transmitted via only the first communication link, the flow proceeds to block 2016. At block 2016, the first communication device generates (e.g., the network interface 122 generates, the MAC processor 126 generates, the network interface 162 generates, the MAC processor 166 generates, the network interface 300 generates, etc.) a second TIM element that indicates, for each second communication device, whether the first communication device has buffered any frames for the second communication device that are to be transmitted via only the first communication link. The flow then proceeds to block 2020.

Additionally, in response to determining at block 2012 that the first communication device does not have buffered at least one frame for any of the second communication devices that is be transmitted via any of only the first communication link, the flow also proceeds to block 2020. At block 2020, the first communication device determines (e.g., the network interface 122 determines, the MAC processor 126 determines, the communication link selection controller 140 determines, the network interface 162 determines, the MAC processor 166 determines, the communication link selection controller 190 determines, the network interface 300 determines, etc.) whether the first communication device has buffered any frames for any of the second communication devices that are to be transmitted via only a second communication link among the multiple communication links.

In response to determining at block 2020 that the first communication device has buffered one or more frames for any of the second communication devices that are to be transmitted via only the second communication link, the flow proceeds to block 2024. At block 2024, the first communication device generates (e.g., the network interface 122 generates, the MAC processor 126 generates, the network interface 162 generates, the MAC processor 166 generates, the network interface 300 generates, etc.) a third TIM element that indicates, for each second communication device, whether the first communication device has buffered any frames for the second communication device that are to be transmitted via only the second communication link. The flow then proceeds to block 2028.

Additionally, in response to determining at block 2020 that the first communication device does not have buffered at least one frame for any of the second communication devices that is be transmitted via any of only the second communication link, the flow also proceeds to block 2028.

At block 2028, if the first TIM was generated at block 2008, the first communication device transmits (e.g., the network interface 122 transmits, the PHY processor 130 transmits, the network interface 162 transmits, the PHY processor 170 transmits, the network interface 300 transmits, etc.) the first TIM via multiple ones (e.g., all) of the multiple communication links. In another embodiment, in response to determining at block 2004 that the first communication device has buffered one or more frames for any of the second communication devices that can be transmitted via any of multiple communication links, the first communication device transmits (at block 2028) the first TIM via multiple ones (e.g., all) of the multiple communication links.

At block 2032, if the second TIM was generated at block 2016, the first communication device transmits (e.g., the network interface 122 transmits, the PHY processor 130 transmits, the network interface 162 transmits, the PHY processor 170 transmits, the network interface 300 transmits, etc.) the second TIM via only the first communication link. In another embodiment, in response to determining at block 2012 that the first communication device has buffered one or more frames for any of the second communication devices that are to be transmitted via only the first communication device, the first communication device transmits (at block 2032) the second TIM via only the first communication link.

At block 2036, if the third TIM was generated at block 2024, the first communication device transmits (e.g., the network interface 122 transmits, the PHY processor 130 transmits, the network interface 162 transmits, the PHY processor 170 transmits, the network interface 300 transmits, etc.) the third TIM via only the first communication link. In another embodiment, in response to determining at block 2020 that the first communication device has buffered one or more frames for any of the second communication devices that are to be transmitted via only the second communication link, the first communication device transmits (at block 2036) the third TIM via only the first communication link. In some embodiments, the third TIM is transmitted at block 2036 via only the second communication link.

In some embodiments, the first TIM, the second TIM, and the third TIM are included within one or more beacon frames, such as described above with reference to FIG. 19.

Embodiment 1: A method for communicating in a wireless local area network (WLAN) that utilizes a plurality of WLAN communication links in respective frequency segments, the method comprising: determining, at a first communication device, whether a second communication device is in a power save mode with respect to a first WLAN communication link among the plurality of WLAN communication links, wherein the power save mode with respect to the first WLAN communication includes a wake state and a doze state; determining, at the first communication device, whether the second communication device is in a power save mode with respect to a second WLAN communication link among the plurality of WLAN communication links, wherein the power save mode with respect to the second WLAN communication includes a wake state and a doze state, wherein the second communication device is permitted to be in the power save mode with respect to the second WLAN communication link when the second communication device is not in the power save mode with respect to the first WLAN communication link, and wherein the second communication device is permitted to be in the power save mode with respect to the first WLAN communication link when the second communication device is not in the power save mode with respect to the second WLAN communication link; and communicating, by the first communication device, with the second communication device with at least one of i) the first WLAN communication link and ii) the second WLAN communication link, including communicating with the second communication device accordance with i) determining whether the second communication device is in the power save mode with respect to the first WLAN communication link, and ii) determining whether the second communication device is in the power save mode with respect to the second WLAN communication link.

Embodiment 2: The method of embodiment 1, further comprising: in response to determining that the second communication device is in the power save mode with respect to the first WLAN communication link, determining, at the first communication device, whether the second communication device is in the doze state with respect to the first WLAN communication link; and in response to determining that the second communication device is in the power save mode with respect to the second WLAN communication link, determining, at the first communication device, whether the second communication device is in the doze state with respect to the second WLAN communication link, wherein whether the second communication device is in the doze state with respect to the second WLAN communication link is independent of whether the second communication device is in the doze state with respect to the first WLAN communication link; wherein communicating with the second communication device is further in accordance with i) when the second communication device is in the power save mode with respect to the first WLAN communication link, determining whether the second communication device is in the doze state with respect to the first WLAN communication link, and ii) when the second communication device is in the power save mode with respect to the second WLAN communication link, determining whether the second communication device is in the doze state with respect to the second WLAN communication link.

Embodiment 3: The method of embodiment 2, wherein determining whether the second communication device is in the doze state with respect to the second WLAN communication link comprises: receiving, at the first communication device, a packet transmitted by the second communication device via only the first WLAN communication link, wherein the packet includes information indicating whether the second communication device is in the doze state with respect to the second WLAN communication link.

Embodiment 4: The method of either of embodiments 2 and 3, further comprising, when the second communication device is in the doze state with respect to the second WLAN communication link: transmitting, by the first communication device, a packet to the second communication device via only the first WLAN communication link, wherein the packet includes information to prompt the second communication device transition to an awake state with respect to the second WLAN communication link.

Embodiment 5: The method of any of embodiments 1-4, wherein determining whether the second communication device is in the power save mode with respect to the second WLAN communication link comprises: receiving, at the first communication device, a packet transmitted by the second communication device via only the first WLAN communication link, wherein the packet includes information indicating whether the second communication device is in the power save mode with respect to the second WLAN communication link.

Embodiment 6: The method of any embodiments 1-3 and 5, further comprising, when the first communication determines that the second communication device is in the power save mode with respect to the second WLAN communication link: transmitting, by the first communication device, a packet to the second communication device via the first WLAN communication link, wherein the packet includes information requesting that the second communication device transition to an active mode with respect to the second WLAN communication link.

Embodiment 7: The method of any of embodiments 1-6, further comprising: determining, at the first communication device, that the second communication device is in an OFF state with respect to the second WLAN communication link; and transmitting, by the first communication device, a packet to the second communication device via the first WLAN communication link, wherein the packet includes information requesting that the second communication device transition to an ON state with respect to the second WLAN communication link.

Embodiment 8: A first communication device, comprising: a wireless network interface device that is configured to communicate via a plurality of wireless local area network (WLAN) communication links in respective frequency segments. The wireless network interface device includes one or more integrated circuit (IC) devices configured to: determine whether a second communication device is in a power save mode with respect to a first WLAN communication link among the plurality of WLAN communication links, wherein the power save mode with respect to the first WLAN communication includes a wake state and a doze state; determine whether the second communication device is in a power save mode with respect to a second WLAN communication link among the plurality of WLAN communication links, wherein the power save mode with respect to the second WLAN communication includes a wake state and a doze state, wherein whether the second communication device is in the power save mode with respect to the second WLAN communication link is independent of whether the second communication device is in the power save mode with respect to the first WLAN communication link; and communicate with the second communication device with at least one of i) the first WLAN communication link and ii) the second WLAN communication link, including communicating with the second communication device accordance with i) determining whether the second communication device is in the power save mode with respect to the first WLAN communication link, and ii) determining whether the second communication device is in the power save mode with respect to the second WLAN communication link.

Embodiment 9: The first communication device of embodiment 8, wherein the one or more IC devices are further configured to: in response to determining that the second communication device is in the power save mode with respect to the first WLAN communication link, determine whether the second communication device is in the doze state with respect to the first WLAN communication link; in response to determining that the second communication device is in the power save mode with respect to the second WLAN communication link, determine whether the second communication device is in the doze state with respect to the second WLAN communication link, wherein whether the second communication device is in the doze state with respect to the second WLAN communication link is independent of whether the second communication device is in the doze state with respect to the first WLAN communication link; and communicate with the second communication device further in accordance with i) when the second communication device is in the power save mode with respect to the first WLAN communication link, determining whether the second communication device is in the doze state with respect to the first WLAN communication link, and ii) when the second communication device is in the power save mode with respect to the second WLAN communication link, determining whether the second communication device is in the doze state with respect to the second WLAN communication link.

Embodiment 10: The first communication device of embodiment 9, wherein the one or more IC devices are further configured to: receive a packet transmitted by the second communication device via only the first WLAN communication link, wherein the packet includes information indicating whether the second communication device is in the doze state with respect to the second WLAN communication link; and determine whether the second communication device is in the doze state with respect to the second WLAN communication link using the information in the packet.

Embodiment 11: The first communication device of either of embodiments 9 or 10, wherein the one or more IC devices are further configured to, when the second communication device is in the doze state with respect to the second WLAN communication link: transmit a packet to the second communication device via only the first WLAN communication link, wherein the packet includes information to prompt the second communication device transition to an awake state with respect to the second WLAN communication link.

Embodiment 12: The first communication device of any of embodiments 8-11, wherein the one or more IC devices are further configured to: receive a packet transmitted by the second communication device via only the first WLAN communication link, wherein the packet includes information indicating whether the second communication device is in the power save mode with respect to the second WLAN communication link; and determine whether the second communication device is in the power save mode with respect to the second WLAN communication link using the information in the packet.

Embodiment 13: The first communication device of any of embodiments 8-10 or 12, wherein the one or more IC devices are further configured to, when the first communication determines that the second communication device is in the power save mode with respect to the second WLAN communication link: transmit a packet to the second communication device via the first WLAN communication link, wherein the packet includes information requesting that the second communication device transition to an active mode with respect to the second WLAN communication link.

Embodiment 14: The first communication device of any of embodiments 8-13, wherein the one or more IC devices are further configured to: determine that the second communication device is in an OFF state with respect to the second WLAN communication link; and transmit a packet to the second communication device via the first WLAN communication link, wherein the packet includes information requesting that the second communication device transition to an ON state with respect to the second WLAN communication link.

Embodiment 15: A method for communicating in a wireless local area network (WLAN) that utilizes a plurality of WLAN communication links in respective frequency segments, the method comprising: negotiating, by a first communication device, a first target wake time (TWT) agreement with a second communication device, including negotiating i) a first time period of TWT service periods (SPs) of the first TWT agreement and ii) a first time duration of each TWT SP of first TWT agreement, the first TWT agreement for a first WLAN communication link among the plurality of WLAN communication links, wherein the TWT SPs of the first TWT agreement corresponds time segments during which the second communication device is to be in a wake state in connection with the first WLAN communication link; negotiating, by the first communication device, a second TWT agreement with the second communication device, including negotiating i) a second time period of TWT SPs of the second TWT agreement and ii) a second time duration of each TWT SP of second TWT agreement, the second TWT agreement for a second WLAN communication link, wherein the TWT SPs of the second TWT agreement corresponds time segments during which the second communication device is to be in a wake state in connection with the second WLAN communication link, and wherein at least one of i) the first time period is permitted to be different than the second time period, and ii) the first time duration is permitted to be different than the second time duration; communicating, by the first communication device, with the second communication device via the first WLAN communication link in accordance with the first TWT agreement; and communicating, by the first communication device, with the second communication device via the second WLAN communication link in accordance with the second TWT agreement.

Embodiment 16: The method of embodiment 15, wherein: negotiating the second TWT agreement with the second communication device includes transmitting, via the first WLAN communication link, one or more frames corresponding to negotiating the second TWT agreement, including transmitting the one or frames to the second communication device.

Embodiment 17: The method of embodiment 16, wherein: transmitting the one or more frames corresponding to negotiating the second TWT agreement comprises transmitting, via the first WLAN communication link, a frame that includes negotiation information for i) negotiating the first TWT agreement and ii) negotiating the second TWT agreement.

Embodiment 18: The method of embodiment 17, wherein: transmitting the frame corresponding to i) negotiating the first TWT agreement and ii) negotiating the second TWT agreement comprises transmitting a frame that includes a bitmap having i) a first bit corresponding to the first WLAN communication link and set to indicate that the frame includes negotiation information corresponding to the first WLAN communication link, and ii) a second bit corresponding to the second WLAN communication link and set to indicate that the frame includes negotiation information corresponding to the second WLAN communication link.

Embodiment 19: A first communication device, comprising: a wireless network interface device that is configured to communicate via a plurality of WLAN communication links in respective frequency segments. The wireless network interface device includes one or more IC devices configured to: negotiate a first target wake time (TWT) agreement with a second communication device, including negotiating i) a first time period of TWT service periods (SPs) of the first TWT agreement and ii) a first time duration of each TWT SP of first TWT agreement, the first TWT agreement for a first WLAN communication link among the plurality of WLAN communication links, wherein the TWT SPs of the first TWT agreement corresponds time segments during which the second communication device is to be in a wake state in connection with the first WLAN communication link; negotiate a second TWT agreement with the second communication device, including negotiating i) a second time period of TWT SPs of the second TWT agreement and ii) a second time duration of each TWT SP of second TWT agreement, the second TWT agreement for a second WLAN communication link, wherein the TWT SPs of the second TWT agreement corresponds time segments during which the second communication device is to be in a wake state in connection with the second WLAN communication link, and wherein at least one of i) the first time period is permitted to be different than the second time period, and ii) the first time duration is permitted to be different than the second time duration; communicate with the second communication device via the first WLAN communication link in accordance with the first TWT agreement; and communicate with the second communication device via the second WLAN communication link in accordance with the second TWT agreement.

Embodiment 20: The first communication device of embodiment 19, wherein the one or more IC devices are further configured to: transmit, via the first WLAN communication link, one or more frames corresponding to negotiating the second TWT agreement, including transmitting the one or frames to the second communication device.

Embodiment 21: The first communication device of embodiment 20, wherein the one or more IC devices are further configured to: generate a single frame that includes negotiation information for i) negotiating the first TWT agreement and ii) negotiating the second TWT agreement; and transmit the single frame, via the first WLAN communication link.

Embodiment 22: The first communication device of embodiment 20, wherein the one or more IC devices are further configured to: generate the single frame that to include a bitmap having i) a first bit corresponding to the first WLAN communication link and set to indicate that the single frame includes negotiation information corresponding to the first WLAN communication link, and ii) a second bit corresponding to the second WLAN communication link and set to indicate that the single frame includes negotiation information corresponding to the second WLAN communication link.

Embodiment 23: A method for transmitting traffic streams in a wireless local area network (WLAN) that utilizes a plurality of WLAN communication links in respective frequency segments, the method comprising: determining, at a first communication device, whether a specific WLAN communication link has been negotiated with a second communication device for a first traffic stream; in response to determining that the specific WLAN communication link has been negotiated for the first traffic stream, transmitting, by the first communication device, packets in the first traffic stream only via the specific WLAN communication link; and in response to determining that no WLAN communication link has been negotiated with the second communication device for the first traffic stream, transmitting, by the first communication device, packets in the first traffic stream via multiple WLAN communication links.

Embodiment 24: The method of embodiment 23, further comprising: in response to determining that no WLAN communication link has been negotiated with the second communication device for the first traffic stream, determining, at the first communication device, whether all packets in the first traffic stream will be transmitted only via one WLAN communication link; and in response to determining that all packets in the first traffic stream will be transmitted only via one WLAN communication link, transmitting, by the first communication device, packets in the first traffic stream only via the one WLAN communication link; wherein transmitting packets in the first traffic stream via multiple WLAN communication links is further in response to determining that all packets in the first traffic stream will not be transmitted only via the one WLAN communication link.

Embodiment 25: The method of either of embodiments 23 or 24, further comprising: transmitting, by the first communication device, a packet having a single traffic indication map (TIM) that includes information regarding frames buffered at the first communication device and that are to be transmitted via multiple WLAN communication links.

Embodiment 26: The method of either of embodiments 23 or 24, further comprising: transmitting, by the first communication device, i) a first traffic indication map (TIM) that includes information regarding frames buffered at the first communication device and that are to be transmitted via only a first WLAN communication link, and ii) a second TIM that includes information regarding frames buffered at the first communication device and that are to be transmitted via only a second WLAN communication link.

Embodiment 27: The method of embodiment 26, further comprising: transmitting, by the first communication device, the first TIM and the second TIM via the first WLAN communication link.

Embodiment 28: The method of embodiment 27, further comprising: transmitting, by the first communication device, the first TIM and the second TIM in respective beacon frames.

Embodiment 29: The method of embodiment 27, further comprising: transmitting, by the first communication device, the first TIM and the second TIM in a single packet.

Embodiment 30: The method of embodiment 29, further comprising: transmitting, by the first communication device, the first TIM and the second TIM in a single beacon frame.

Embodiment 31: The method of embodiment 23, further comprising: in response to determining that the first traffic stream is to be transmitted only via the specific WLAN communication link, transmitting, by the first communication device, a first traffic indication map (TIM) that includes information regarding only frames that are to be transmitted only via the specific WLAN communication link and that are buffered at the first communication device; and in response to determining that packets in the first traffic stream will be transmitted via multiple WLAN communication links, transmitting, by the first communication device, a packet having a second TIM that includes information regarding frames buffered at the first communication device and that are to be transmitted via multiple WLAN communication links, wherein the second TIM includes information regarding frames in the first traffic stream and frames in a second traffic stream that will be transmitted via multiple WLAN communication links.

Embodiment 32: A first communication device, comprising: a wireless network interface device that is configured to communicate via a plurality of WLAN communication links in respective frequency segments. The wireless network interface device includes one or more IC devices configured to: determine whether a specific WLAN communication link has been negotiated with a second communication device for a first traffic stream; in response to determining that the specific WLAN communication link has been negotiated for the first traffic stream, transmitting packets in the first traffic stream only via the specific WLAN communication link; and in response to determining that no WLAN communication link has been negotiated with the second communication device for the first traffic stream, transmitting packets in the first traffic stream via multiple WLAN communication links.

Embodiment 33: The first communication device of embodiment 32, wherein the one or more IC devices are further configured to: in response to determining that no WLAN communication link has been negotiated with the second communication device for the first traffic stream, determine whether all packets in the first traffic stream will be transmitted only via one WLAN communication link; and in response to determining that all packets in the first traffic stream will be transmitted only via one WLAN communication link, transmit packets in the first traffic stream only via the one WLAN communication link; wherein transmitting packets in the first traffic stream via multiple WLAN communication links is further in response to determining that all packets in the first traffic stream will not be transmitted only via the one WLAN communication link.

Embodiment 34: The first communication device of either of embodiments 32 or 33, wherein the one or more IC devices are further configured to: transmit a packet having a single TIM that includes information regarding frames buffered at the first communication device and that are to be transmitted via multiple WLAN communication links.

Embodiment 35: The first communication device of either of embodiments 32 or 33, wherein the one or more IC devices are further configured to: transmit i) a first TIM that includes information regarding frames buffered at the first communication device and that are to be transmitted via only a first WLAN communication link, and ii) a second TIM that includes information regarding frames buffered at the first communication device and that are to be transmitted via only a second WLAN communication link.

Embodiment 36: The first communication device of embodiment 35, wherein the one or more IC devices are further configured to: transmit first TIM and the second TIM via the first WLAN communication link.

Embodiment 37: The first communication device of embodiment 36, wherein the one or more IC devices are further configured to: transmit the first TIM and the second TIM in respective beacon frames.

Embodiment 38: The first communication device of embodiment 36, wherein the one or more IC devices are further configured to: transmit the first TIM and the second TIM in a single packet.

Embodiment 39: The first communication device of embodiment 38, wherein the one or more IC devices are further configured to: transmit the first TIM and the second TIM in a single beacon frame.

Embodiment 40: The first communication device of embodiment 32, wherein the one or more IC devices are further configured to: in response to determining that the first traffic stream is to be transmitted only via the specific WLAN communication link, transmit a first TIM that includes information regarding only frames that are to be transmitted only via the specific WLAN communication link and that are buffered at the first communication device; and in response to determining that packets in the first traffic stream will be transmitted via multiple WLAN communication links, transmit a packet having a second TIM that includes information regarding frames buffered at the first communication device and that are to be transmitted via multiple WLAN communication links, wherein the second TIM includes information regarding frames in the first traffic stream and frames in a second traffic stream that will be transmitted via multiple WLAN communication links.

Embodiment 41: A method for transmitting a group-addressed frame in a wireless local area network (WLAN) that utilizes a plurality of WLAN communication links in respective frequency segments, the method comprising: determining, at a first communication device, whether the group-addressed frame is to be transmitted via multiple WLAN communication links among the plurality of WLAN communication links, the group addressed frame intended for a plurality of second communication devices in the WLAN; in response to determining that the group-addressed frame is to be transmitted via the multiple WLAN communication links, transmitting, by the first communication device, multiple instances of the group-addressed frame via respective WLAN communication links among the multiple WLAN communication links, including: transmitting a first instance of the group-addressed frame via a first WLAN communication link among the plurality of WLAN communication links, the first instance of the group-addressed frame having a sequence number set to a value, and transmitting a second instance of the group-addressed frame via a second WLAN communication link among the plurality of WLAN communication links, the second instance of the group-addressed frame having a sequence number set to the value; and in response to determining that the group-addressed frame is to be transmitted via only a single WLAN communication link among the plurality of WLAN communication links, transmitting, by the first communication device, the group-addressed frame only via the single WLAN communication link.

Embodiment 42: The method of embodiment 41, wherein determining whether the group-addressed frame is to be transmitted via multiple WLAN communication links comprises: determining, at the first communication device, whether all of the second communication devices in the plurality of second communication devices are in an active mode with respect to the single WLAN communication link; and in response to determining that all of the second communication devices in the plurality of second communication devices are not in the active mode with respect to the single WLAN communication link, determining that the group-addressed frame is to be transmitted via the multiple WLAN communication links.

Embodiment 43: The method of embodiment 42, wherein determining whether the group-addressed frame is to be transmitted via multiple WLAN communication links further comprises: in response to determining that all of the second communication devices in the plurality of second communication devices are in the active mode with respect to the single WLAN communication link, determining that the group-addressed frame is to be transmitted via only the single WLAN communication link.

Embodiment 44: The method of embodiment 41, wherein determining whether the group-addressed frame is to be transmitted via multiple WLAN communication links comprises: determining, at the first communication device, whether all of the second communication devices in the plurality of second communication devices are in at least one of i) an active mode with respect to the single WLAN communication link, or ii) a wake mode with respect to the single WLAN communication link; and in response to determining that all of the second communication devices in the plurality of second communication devices are not in at least one of i) the active mode with respect to the single WLAN communication link, and ii) the wake mode with respect to the single WLAN communication link, determining that the group-addressed frame is to be transmitted via the multiple WLAN communication links.

Embodiment 45: The method of embodiment 44, wherein determining whether the group-addressed frame is to be transmitted via multiple WLAN communication links further comprises: in response to determining that all of the second communication devices in the plurality of second communication devices are in at least one of i) the active mode with respect to the single WLAN communication link, and ii) the wake mode with respect to the single WLAN communication link, determining that the group-addressed frame is to be transmitted via only the single WLAN communication link.

Embodiment 46: A first communication device, comprising: a wireless network interface device that is configured to communicate via a plurality of WLAN communication links in respective frequency segments. The wireless network interface device includes one or more IC devices configured to: determine whether the group-addressed frame is to be transmitted via multiple WLAN communication links among the plurality of WLAN communication links, the group addressed frame intended for a plurality of second communication devices in the WLAN; and in response to determining that the group-addressed frame is to be transmitted via the multiple WLAN communication links, transmit multiple instances of the group-addressed frame via respective WLAN communication links among the multiple WLAN communication links, including: transmitting a first instance of the group-addressed frame via a first WLAN communication link among the plurality of WLAN communication links, the first instance of the group-addressed frame having a sequence number set to a value, and transmitting a second instance of the group-addressed frame via a second WLAN communication link among the plurality of WLAN communication links, the second instance of the group-addressed frame having a sequence number set to the value. The one or more IC devices are further configured to: in response to determining that the group-addressed frame is to be transmitted via only a single WLAN communication link among the plurality of WLAN communication links, transmit the group-addressed frame only via the single WLAN communication link.

Embodiment 47: The first communication device of embodiment 46, wherein the one or more IC devices are further configured to: determine whether all of the second communication devices in the plurality of second communication devices are in an active mode with respect to the single WLAN communication link; and in response to determining that all of the second communication devices in the plurality of second communication devices are not in the active mode with respect to the single WLAN communication link, determine that the group-addressed frame is to be transmitted via the multiple WLAN communication links.

Embodiment 48: The first communication device of embodiment 47, wherein the one or more IC devices are further configured to: in response to determining that all of the second communication devices in the plurality of second communication devices are in the active mode with respect to the single WLAN communication link, determine that the group-addressed frame is to be transmitted via only the single WLAN communication link.

Embodiment 49: The first communication device of embodiment 46, wherein the one or more IC devices are further configured to: determine whether all of the second communication devices in the plurality of second communication devices are in at least one of i) an active mode with respect to the single WLAN communication link, or ii) a wake mode with respect to the single WLAN communication link; and in response to determining that all of the second communication devices in the plurality of second communication devices are not in at least one of i) the active mode with respect to the single WLAN communication link, and ii) the wake mode with respect to the single WLAN communication link, determine that the group-addressed frame is to be transmitted via the multiple WLAN communication links.

Embodiment 50: The first communication device of embodiment 59, wherein the one or more IC devices are further configured to: in response to determining that all of the second communication devices in the plurality of second communication devices are in at least one of i) the active mode with respect to the single WLAN communication link, and ii) the wake mode with respect to the single WLAN communication link, determine that the group-addressed frame is to be transmitted via only the single WLAN communication link.

Embodiment 51: A method for receiving group-addressed frames in a wireless local area network (WLAN) that utilizes a plurality of WLAN communication links in respective frequency segments, the method comprising: receiving, at a first communication device, a first group-addressed frame via a first WLAN communication link among the plurality of WLAN communication links, the first group addressed frame intended for the first communication device and one or more second communication devices in the WLAN; setting, at the first communication device, a stored group-addressed sequence number to a sequence number in the first group-addressed frame; receiving, at the first communication device, a second group-addressed frame via a second WLAN communication link among the plurality of WLAN communication links, the second group addressed frame intended for the first communication device and the one or more second communication devices in the WLAN; comparing, at the first communication device, a sequence number in the second group-addressed frame to the stored group-addressed sequence number; and in response to determining that the sequence number in the second group-addressed frame is less than or equal to the stored group-addressed sequence number, discarding, by the first communication device, the second group-addressed frame.

Embodiment 52: The method of embodiment 51, further comprising: prior to setting the stored group-addressed sequence number to the sequence number in the first group-addressed frame, comparing, at the first communication device, the sequence number in the first group-addressed frame to a prior value of the stored group-addressed sequence number; wherein setting the stored group-addressed sequence number to the sequence number in the first group-addressed frame is in response to determining that the sequence number in the first group-addressed frame is greater than the prior value of the stored group-addressed sequence number.

Embodiment 53: The method of embodiment 51, wherein: receiving the first group-addressed frame via the first WLAN communication link comprises receiving a first instance of a same group-addressed frame via the first WLAN communication link; and receiving the second group-addressed frame via the second WLAN communication link comprises receiving a second instance of the same group-addressed frame via the second WLAN communication link.

Embodiment 54: A first communication device, comprising: a wireless network interface device that is configured to communicate via a plurality of WLAN communication links in respective frequency segments. The wireless network interface device having one or more IC devices configured to: receive a first group-addressed frame via a first WLAN communication link among the plurality of WLAN communication links, the first group addressed frame intended for the first communication device and one or more second communication devices in a WLAN; set a stored group-addressed sequence number to a sequence number in the first group-addressed frame; receive a second group-addressed frame via a second WLAN communication link among the plurality of WLAN communication links, the second group addressed frame intended for the first communication device and the one or more second communication devices in the WLAN; compare a sequence number in the second group-addressed frame to the stored group-addressed sequence number; and in response to determining that the sequence number in the second group-addressed frame is less than or equal to the stored group-addressed sequence number, discard the second group-addressed frame.

Embodiment 55: The first communication device of embodiment 54, wherein the one or more IC devices are further configured to: prior to setting the stored group-addressed sequence number to the sequence number in the first group-addressed frame, compare the sequence number in the first group-addressed frame to a prior value of the stored group-addressed sequence number; wherein setting the stored group-addressed sequence number to the sequence number in the first group-addressed frame is in response to determining that the sequence number in the first group-addressed frame is greater than the prior value of the stored group-addressed sequence number.

Embodiment 56: The first communication device of embodiment 54, wherein the one or more IC devices are further configured to: receive the first group-addressed frame via the first WLAN communication link as a first instance of a same group-addressed frame received via the first WLAN communication link; and receive the second group-addressed frame via the second WLAN communication link as a second instance of the same group-addressed frame received via the second WLAN communication link.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for communicating in a wireless local area network (WLAN) that utilizes a plurality of WLAN communication links in respective frequency segments, the method comprising:
    determining, at a first communication device, whether a second communication device is in a power save mode with respect to a first WLAN communication link among the plurality of WLAN communication links, wherein the power save mode with respect to the first WLAN communication link includes a wake state and a doze state;
    determining, at the first communication device, whether the second communication device is in a power save mode with respect to a second WLAN communication link among the plurality of WLAN communication links, wherein the power save mode with respect to the second WLAN communication link includes a wake state and a doze state, wherein the second communication device is permitted to be in the power save mode with respect to the second WLAN communication link when the second communication device is not in the power save mode with respect to the first WLAN communication link, and wherein the second communication device is permitted to be in the power save mode with respect to the first WLAN communication link when the second communication device is not in the power save mode with respect to the second WLAN communication link;
    communicating, by the first communication device, with the second communication device with at least one of i) the first WLAN communication link and ii) the second WLAN communication link, including communicating with the second communication device accordance with i) determining whether the second communication device is in the power save mode with respect to the first WLAN communication link, and ii) determining whether the second communication device is in the power save mode with respect to the second WLAN communication link; and
    negotiating, by the first communication device, a target wake time (TWT) schedule with the second communication device for the second WLAN communication link, including receiving, at the first communication device, a frame from the second communication device via the first WLAN communication link, the frame corresponding to the negotiation of the TWT schedule, the frame including an indication that the TWT schedule is for the second WLAN communication link.

2. The method of claim 1, further comprising:
    in response to determining that the second communication device is in the power save mode with respect to the first WLAN communication link, determining, at the first communication device, whether the second communication device is in the doze state with respect to the first WLAN communication link; and
    in response to determining that the second communication device is in the power save mode with respect to the second WLAN communication link, determining, at the first communication device, whether the second communication device is in the doze state with respect to the second WLAN communication link, wherein whether the second communication device is in the doze state with respect to the second WLAN communication link is independent of whether the second communication device is in the doze state with respect to the first WLAN communication link;
    wherein communicating with the second communication device is further in accordance with i) when the second communication device is in the power save mode with respect to the first WLAN communication link, determining whether the second communication device is in the doze state with respect to the first WLAN communication link, and ii) when the second communication device is in the power save mode with respect to the second WLAN communication link, determining whether the second communication device is in the doze state with respect to the second WLAN communication link.

3. The method of claim 2, wherein determining whether the second communication device is in the doze state with respect to the second WLAN communication link comprises:
    receiving, at the first communication device, a packet transmitted by the second communication device via only the first WLAN communication link, wherein the packet includes information indicating whether the second communication device is in the doze state with respect to the second WLAN communication link.

4. The method of claim 2, further comprising, when the second communication device is in the doze state with respect to the second WLAN communication link:
    transmitting, by the first communication device, a packet to the second communication device via only the first WLAN communication link, wherein the packet includes information to prompt the second communication device transition to an awake state with respect to the second WLAN communication link.

5. The method of claim 1, wherein determining whether the second communication device is in the power save mode with respect to the second WLAN communication link comprises:
    receiving, at the first communication device, a packet transmitted by the second communication device via only the first WLAN communication link, wherein the packet includes information indicating whether the second communication device is in the power save mode with respect to the second WLAN communication link.

6. The method of claim 1, further comprising, when the first communication determines that the second communication device is in the power save mode with respect to the second WLAN communication link:
    transmitting, by the first communication device, a packet to the second communication device via the first WLAN communication link, wherein the packet includes information requesting that the second communication device transition to an active mode with respect to the second WLAN communication link.

7. The method of claim 1, further comprising:
determining, at the first communication device, that the second communication device is in an OFF state with respect to the second WLAN communication link; and
transmitting, by the first communication device, a packet to the second communication device via the first WLAN communication link, wherein the packet includes information requesting that the second communication device transition to an ON state with respect to the second WLAN communication link.

8. The method of claim 1, wherein:
the frame includes a bitmap, wherein respective bit positions in the bitmap correspond to respective WLAN communication links, and wherein a bit position corresponding to the second WLAN communication link in the bitmap is set to indicate that the TWT schedule is for the second WLAN communication link.

9. The method of claim 8, wherein:
the frame further includes one or more parameters corresponding to the TWT schedule.

10. A first communication device, comprising:
a wireless network interface device that is configured to communicate via a plurality of wireless local area network (WLAN) communication links in respective frequency segments, the wireless network interface device having one or more integrated circuit (IC) chips configured to:
   determine whether a second communication device is in a power save mode with respect to a first WLAN communication link among the plurality of WLAN communication links, wherein the power save mode with respect to the first WLAN communication link includes a wake state and a doze state,
   determine whether the second communication device is in a power save mode with respect to a second WLAN communication link among the plurality of WLAN communication links, wherein the power save mode with respect to the second WLAN communication link includes a wake state and a doze state, wherein whether the second communication device is in the power save mode with respect to the second WLAN communication link is independent of whether the second communication device is in the power save mode with respect to the first WLAN communication link, and
   communicate with the second communication device with at least one of i) the first WLAN communication link and ii) the second WLAN communication link, including communicating with the second communication device accordance with i) determining whether the second communication device is in the power save mode with respect to the first WLAN communication link, and ii) determining whether the second communication device is in the power save mode with respect to the second WLAN communication link, and
   negotiate a target wake time (TWT) schedule with the second communication device for the second WLAN communication link, including receiving a frame from the second communication device via the first WLAN communication link, the frame corresponding to the negotiation of the TWT schedule, the frame including an indication that the TWT schedule is for the second WLAN communication link.

11. The first communication device of claim 10, wherein the one or more IC chips are further configured to:
   in response to determining that the second communication device is in the power save mode with respect to the first WLAN communication link, determine whether the second communication device is in the doze state with respect to the first WLAN communication link;
   in response to determining that the second communication device is in the power save mode with respect to the second WLAN communication link, determine whether the second communication device is in the doze state with respect to the second WLAN communication link, wherein whether the second communication device is in the doze state with respect to the second WLAN communication link is independent of whether the second communication device is in the doze state with respect to the first WLAN communication link; and
   communicate with the second communication device further in accordance with i) when the second communication device is in the power save mode with respect to the first WLAN communication link, determining whether the second communication device is in the doze state with respect to the first WLAN communication link, and ii) when the second communication device is in the power save mode with respect to the second WLAN communication link, determining whether the second communication device is in the doze state with respect to the second WLAN communication link.

12. The first communication device of claim 11, wherein the one or more IC chips are further configured to:
   receive a packet transmitted by the second communication device via only the first WLAN communication link, wherein the packet includes information indicating whether the second communication device is in the doze state with respect to the second WLAN communication link; and
   determine whether the second communication device is in the doze state with respect to the second WLAN communication link using the information in the packet.

13. The first communication device of claim 11, wherein the one or more IC chips are further configured to, when the second communication device is in the doze state with respect to the second WLAN communication link:
   transmit a packet to the second communication device via only the first WLAN communication link, wherein the packet includes information to prompt the second communication device transition to an awake state with respect to the second WLAN communication link.

14. The first communication device of claim 10, wherein the one or more IC chips are further configured to:
   receive a packet transmitted by the second communication device via only the first WLAN communication link, wherein the packet includes information indicating whether the second communication device is in the power save mode with respect to the second WLAN communication link; and
   determine whether the second communication device is in the power save mode with respect to the second WLAN communication link using the information in the packet.

15. The first communication device of claim 10, wherein the one or more IC chips are further configured to, when the first communication device determines that the second communication device is in the power save mode with respect to the second WLAN communication link:
   transmit a packet to the second communication device via the first WLAN communication link, wherein the packet includes information requesting that the second communication device transition to an active mode with respect to the second WLAN communication link.

16. The first communication device of claim 10, wherein the one or more IC chips are further configured to:
- determine that the second communication device is in an OFF state with respect to the second WLAN communication link; and
- transmit a packet to the second communication device via the first WLAN communication link, wherein the packet includes information requesting that the second communication device transition to an ON state with respect to the second WLAN communication link.

17. The first communication device of claim 10, wherein the wireless network interface device comprises one or more transceivers implemented at least partially on the one or more IC chips.

18. The first communication device of claim 17, further comprising:
one or more antennas coupled to the one or more transceivers.

19. The first communication device of claim 18, further comprising:
a host processor coupled to the wireless network interface device.

20. The first communication device of claim 10, wherein:
the frame includes a bitmap, wherein respective bit positions in the bitmap correspond to respective WLAN communication links, and wherein a bit position corresponding to the second WLAN communication link in the bitmap is set to indicate that the TWT schedule is for the second WLAN communication link.

21. The first communication device of claim 20, wherein:
the frame further includes one or more parameters corresponding to the TWT schedule.

* * * * *